US008368767B2

(12) United States Patent
Ogasawara et al.

(10) Patent No.: US 8,368,767 B2
(45) Date of Patent: Feb. 5, 2013

(54) SOLID-STATE IMAGE PICKUP DEVICE, OPTICAL APPARATUS, SIGNAL PROCESSING APPARATUS, AND SIGNAL PROCESSING SYSTEM

(75) Inventors: Hidehiko Ogasawara, Chiba (JP); Toshiyuki Sekiya, Tokyo (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 12/572,773

(22) Filed: Oct. 2, 2009

(65) Prior Publication Data

US 2010/0091153 A1 Apr. 15, 2010

(30) Foreign Application Priority Data

Oct. 10, 2008 (JP) ................................. 2008-264580

(51) Int. Cl.
*H04N 5/232* (2006.01)
(52) U.S. Cl. .............. 348/211.1; 348/231.9; 348/207.99
(58) Field of Classification Search .................... 348/65, 348/67, 68, 76, 11.1, 211.2, 211.4, 211.14, 348/211.99, 294, 296, 211.1, 207.1, 207.99, 348/222.1, 231.9; 359/237, 245, 279, 295, 359/298, 300, 303, 317, 315, 318
See application file for complete search history.

(56) References Cited

U.S. PATENT DOCUMENTS

| | | | | |
|---|---|---|---|---|
| 4,064,434 A * | 12/1977 | Waksberg | ...................... | 398/170 |
| 4,983,021 A * | 1/1991 | Fergason | ........................... | 349/1 |
| 5,524,076 A * | 6/1996 | Rolland et al. | ..................... | 385/8 |
| 5,778,113 A * | 7/1998 | Yu | ...................................... | 385/3 |
| 5,835,646 A | 11/1998 | Yoshimura et al. | | |
| 6,188,262 B1 * | 2/2001 | Sutherland | .................... | 327/295 |
| 6,954,093 B2 * | 10/2005 | Haringer et al. | .............. | 327/158 |
| 2001/0013967 A1 * | 8/2001 | Tsumura | ....................... | 359/170 |
| 2002/0070739 A1 * | 6/2002 | Dishongh et al. | .............. | 324/752 |
| 2002/0101528 A1 * | 8/2002 | Lee et al. | ....................... | 348/304 |
| 2002/0131665 A1 * | 9/2002 | Sriram et al. | ..................... | 385/2 |
| 2002/0149830 A1 * | 10/2002 | Cottrell et al. | ................. | 359/280 |

(Continued)

FOREIGN PATENT DOCUMENTS

JP 56-6468 1/1981
JP 60-209717 10/1985

(Continued)

OTHER PUBLICATIONS

G. C. Gilbreath et al., "Large-aperture multiple quantum well modulating retroreflector for free-space optical data transfer on unmanned aerial vehicles", Opt. Eng. 40, 1348 (2001).*

(Continued)

*Primary Examiner* — Aung S Moe
*Assistant Examiner* — Chriss Yoder, III
(74) *Attorney, Agent, or Firm* — Oblon, Spivak, McClelland, Maier & Neustadt, L.L.P.

(57) ABSTRACT

A solid-state image pickup device includes a pixel unit configured to convert light into an electrical signal, an A/D converter configured to convert a signal read from the pixel unit into a digital signal, a light modulation unit configured to modulate an externally input light beam using the signal digitized by the A/D converter and output a signal light beam based on the signal read from the pixel unit, a timing generation unit configured to generate a synchronization signal used for synchronizing input and output of signals of the pixel unit, the A/D converter, and the light modulation unit, and a controller configured to control readout of the signal.

13 Claims, 40 Drawing Sheets

U.S. PATENT DOCUMENTS

| | | | |
|---|---|---|---|
| 2006/0216023 A1* | 9/2006 | Tokiwa et al. | 396/532 |
| 2006/0268158 A1* | 11/2006 | Ishiyama et al. | 348/373 |
| 2008/0303564 A1* | 12/2008 | Feng | 327/153 |
| 2009/0003841 A1* | 1/2009 | Ghidini et al. | 398/186 |
| 2009/0202254 A1* | 8/2009 | Majumdar et al. | 398/140 |

FOREIGN PATENT DOCUMENTS

| | | |
|---|---|---|
| JP | 10-150604 | 6/1998 |
| JP | 2004-112422 | 4/2004 |
| JP | 2004-219882 | 8/2004 |
| JP | 2006-191465 | 7/2006 |
| JP | 2006-196972 | 7/2006 |
| JP | 2008-5142 | 1/2008 |

OTHER PUBLICATIONS

W.S. Rabinovich et al., Cat's eye quantum well modulating retro-reflectors for freespace optical communications, Proceedings of SPIE vol. 4975 (2003).*

U.S. Appl. No. 12/747,404, filed Jun. 10, 2010, Ogasawara, et al.

European Search Report dated Sep. 27, 2012, in European Patent Application No. 09172453.4 filed Oct. 7, 2009.

Office Action dated Oct. 5, 2012, in European Patent Application No. 09172453.4 filed Oct. 7, 2009.

Office Action dated Oct. 11, 2012, in Japanese Patent Application No. 2008-264580 filed Oct. 10, 2008.

* cited by examiner

SOLID-STATE IMAGE PICKUP DEVICE, OPTICAL APPARATUS, SIGNAL PROCESSING APPARATUS, AND SIGNAL PROCESSING SYSTEM

BACKGROUND OF THE INVENTION

1. Field of the Invention

The present invention relates to a solid-state image pickup device, an optical apparatus including the solid-state image pickup device, a signal processing apparatus to which the optical apparatus is connected, and a signal processing system including the optical apparatus and the signal processing apparatus. In particular, the present invention relates to a solid-state image pickup device, an optical apparatus, a signal processing apparatus, and a signal processing system capable of modulating an externally input light beam using a pixel signal read from the solid-state image pickup device and outputting a modulated light signal.

2. Description of the Related Art

As the processing speed and the packaging density of circuit boards have increased, problems of a signal delay and the occurrence of EMI (electromagnetic interference) have arisen. Accordingly, optical interconnection technology that solves signal delay and signal degradation occurring in electrical interconnections and electromagnetic interference noise radiated from electrical interconnections and that allows high-speed transmission has received a significant amount of attention recently.

As one of high-speed signal transmission technologies using a light beam in a board, a technology called optical interconnection has been developed (refer to, for example, Japanese Unexamined Patent Application Publication No. 2004-219882). In Japanese Unexamined Patent Application Publication No. 2004-219882, a two-dimensional optical waveguide layer, a semiconductor laser that can switch an oscillation mode, and an optical path switching structure that switches an optical path of a light beam emitted from a semiconductor laser are used.

The optical path switching structure changes an output angle in an optical waveguide layer in accordance with switching of the oscillation mode of a semiconductor laser so that an output beam propagates in the optical waveguide layer. In this way, a propagation state of a light transmission signal in the two-dimensional optical waveguide layer can be selected. Accordingly, the layout of a light-emitting element and a light receiving element can be freely determined and, therefore, the light signal transmission configuration can be flexibly reconfigured.

In particular, recently, flat displays have been increased in body size and screen size and, therefore, signals have been delayed. Accordingly, a signal transmission technology using a light beam is one of the solutions. The above-described optical interconnection technology can be applied to TFTs used for driving a flat display.

In addition, a technology in which a solid-state image pickup device is incorporated in a lens unit that is removable from a camera body and a signal output from the solid-state image pickup device can be transmitted to the camera body using a light beam has been developed (refer to, for example, Japanese Unexamined Patent Application Publication No. 2006-196972).

SUMMARY OF THE INVENTION

However, in the technology described in Japanese Unexamined Patent Application Publication No. 2006-196972, a light emitting element is mounted on a board including the image pickup device mounted thereon. Accordingly, the image pickup device may receive a negative impact from heat generated by the light emitting element.

Accordingly, the present invention provides a solid-state image pickup device capable of modulating an externally input light beam using a pixel signal read from a pixel unit and outputting a modulated light signal, an optical apparatus including the solid-state image pickup device, a signal processing apparatus to which the optical apparatus is connected, and a signal processing system including the optical apparatus and the signal processing apparatus.

According to an embodiment of the present invention, a solid-state image pickup device includes a pixel unit configured to convert light into an electrical signal, an A/D converter configured to convert a signal read from the pixel unit into a digital signal, a light modulation unit configured to modulate an externally input light beam using the signal digitized by the A/D converter and output a signal light beam based on the signal read from the pixel unit, a timing generation unit configured to generate a synchronization signal used for synchronizing input and output of signals of the pixel unit, the A/D converter, and the light modulation unit, and a controller configured to control readout of the signal.

According to another embodiment of the present invention, an optical apparatus includes a solid-state image pickup device configured to convert light incident thereon into an electrical signal and an optical element configured to allow light to be incident on the solid-state image pickup device. The solid-state image pickup device includes a pixel unit configured to convert light into an electrical signal, an A/D converter configured to convert a signal read from the pixel unit into a digital signal, a light modulation unit configured to modulate an externally input light beam using the signal digitized by the A/D converter and output a signal light beam based on the signal read from the pixel unit, a timing generation unit configured to generate a synchronization signal used for synchronizing input and output of signals of the pixel unit, the A/D converter, and the light modulation unit, and a controller configured to control readout of the signal. The pixel unit, the A/D converter, the light modulation unit, the timing generation unit, and the controller are formed on the same substrate and are integrated into one chip.

According to still another embodiment of the present invention, a signal processing apparatus to which an optical apparatus is connected is provided. The optical apparatus includes a solid-state image pickup device configured to convert light incident thereon into an electrical signal and an optical element configured to allow light to be incident on the solid-state image pickup device. The solid-state image pickup device includes a pixel unit configured to convert light into an electrical signal, an A/D converter configured to convert a signal read from the pixel unit into a digital signal, a light modulation unit configured to modulate an externally input light beam using the signal digitized by the A/D converter and output a signal light beam based on the signal read from the pixel unit, a timing generation unit configured to generate a synchronization signal used for synchronizing input and output of signals of the pixel unit, the A/D converter, and the light modulation unit, and a controller configured to control readout of the signal. The signal processing apparatus includes a light emitting unit configured to output the light beam input to the light modulation unit of the solid-state image pickup device, a light receiving unit configured to receive the signal light beam output from the light modulation unit of the solid-state image pickup device, a readout control unit configured to control readout of the signal output from the pixel unit of the solid-state image pickup device, and a signal processing unit configured to process the signal read from the pixel unit and input from the solid-state image pickup device through optical communication.

According to yet still another embodiment of the present invention, a signal processing system includes an optical apparatus and a signal processing apparatus to which the optical apparatus is connected. The optical apparatus includes a solid-state image pickup device configured to convert light incident thereon into an electrical signal and an optical element configured to allow light to be incident on the solid-state image pickup device. The solid-state image pickup device includes a pixel unit configured to convert light into an electrical signal, an A/D converter configured to convert a signal read from the pixel unit into a digital signal, a light modulation unit configured to modulate an externally input light beam using the signal digitized by the A/D converter and output a signal light beam based on the signal read from the pixel unit, a timing generation unit configured to generate a synchronization signal used for synchronizing input and output of signals of the pixel unit, the A/D converter, and the light modulation unit, and a controller configured to control readout of the signal. The signal processing apparatus includes a light emitting unit configured to output the light beam input to the light modulation unit of the solid-state image pickup device, a light receiving unit configured to receive the signal light output from the light modulation unit of the solid-state image pickup device, a readout control unit configured to control readout of the signal output from the pixel unit of the solid-state image pickup device, and a signal processing unit configured to process the signal read from the pixel unit and input from the solid-state image pickup device through optical communication.

According to the embodiments of the present invention, an electrical signal photoelectrically converted from light input to the solid-state image pickup device is read from the pixel unit in synchronization with a synchronization signal generated by the timing generation unit and is input to the A/D converter. The signal input to the A/D converter is converted into a digital signal. The digital signal is output in synchronization with a synchronization signal generated by the timing generation unit and is input to the light modulation unit. The light modulation unit modulates light having a constant intensity and input from the signal processing apparatus to the solid-state image pickup device using the digital signal output from the A/D converter. Thus, a signal light beam generated in accordance with the pixel signal read from the pixel unit is output in synchronization with a synchronization signal generated by the timing generation unit.

According to the present invention, since the solid-state image pickup device is provided with a light modulation unit that modulates an externally input light beam using a pixel signal read from the pixel unit, the solid-state image pickup device can output a signal through optical communication without including a light emitting element. In addition, by synchronizing the input and output of the signal with a synchronization signal, the solid-state image pickup device can convert an electrical signal photoelectrically converted from light input to the pixel unit into an optical signal and output the optical signal. In this way, generation of heat caused by optical communication can be prevented and, therefore, a negative impact of heat on the pixel unit can be reduced. In addition, power consumption for the optical communication can be reduced.

Since a negative impact of heat can be reduced, a signal read from the solid-state image pickup device can be transmitted at high speed. In addition, by integrating the elements into one chip, the space necessary for mounting the solid-state image pickup device can be reduced. Furthermore, the design process of the solid-state image pickup device can be facilitated. Since the length of the transmission path of an electrical signal can be reduced, high-speed transmission can be easily achieved.

According to the present invention, the optical apparatus includes the above-described solid-state image pickup device. Therefore, an image of light captured by the solid-state image pickup device can be transmitted at high speed. In addition, according to the present invention, the signal processing apparatus to which the above-described optical apparatus is connected is provided. Therefore, an image of light captured by the solid-state image pickup device can be input to the signal processing apparatus at high speed. As a result, the signal processing apparatus can acquire a large amount of data.

According to the present invention, the signal processing system includes the above-described optical apparatus and the signal processing apparatus. Therefore, an image of light captured by the solid-state image pickup device can be transmitted at high speed. As a result, the signal processing system can process a large amount of transmission data even when the number of pixels of the solid-state image pickup device or the frame rate is increased.

BRIEF DESCRIPTION OF THE DRAWINGS

FIG. 7 is a flowchart of a processing flow of when the power is turned on;

DESCRIPTION OF THE PREFERRED EMBODIMENTS

A solid-state image pickup device, an optical apparatus including the solid-state image pickup device, a signal processing apparatus to which the optical apparatus is connected, and a signal processing system including the optical apparatus and the signal processing apparatus according to an embodiment of the present embodiment are described below with reference to the accompanying drawings.

Outline of Solid-State Image Pickup Device of First Embodiment

Figure 1:
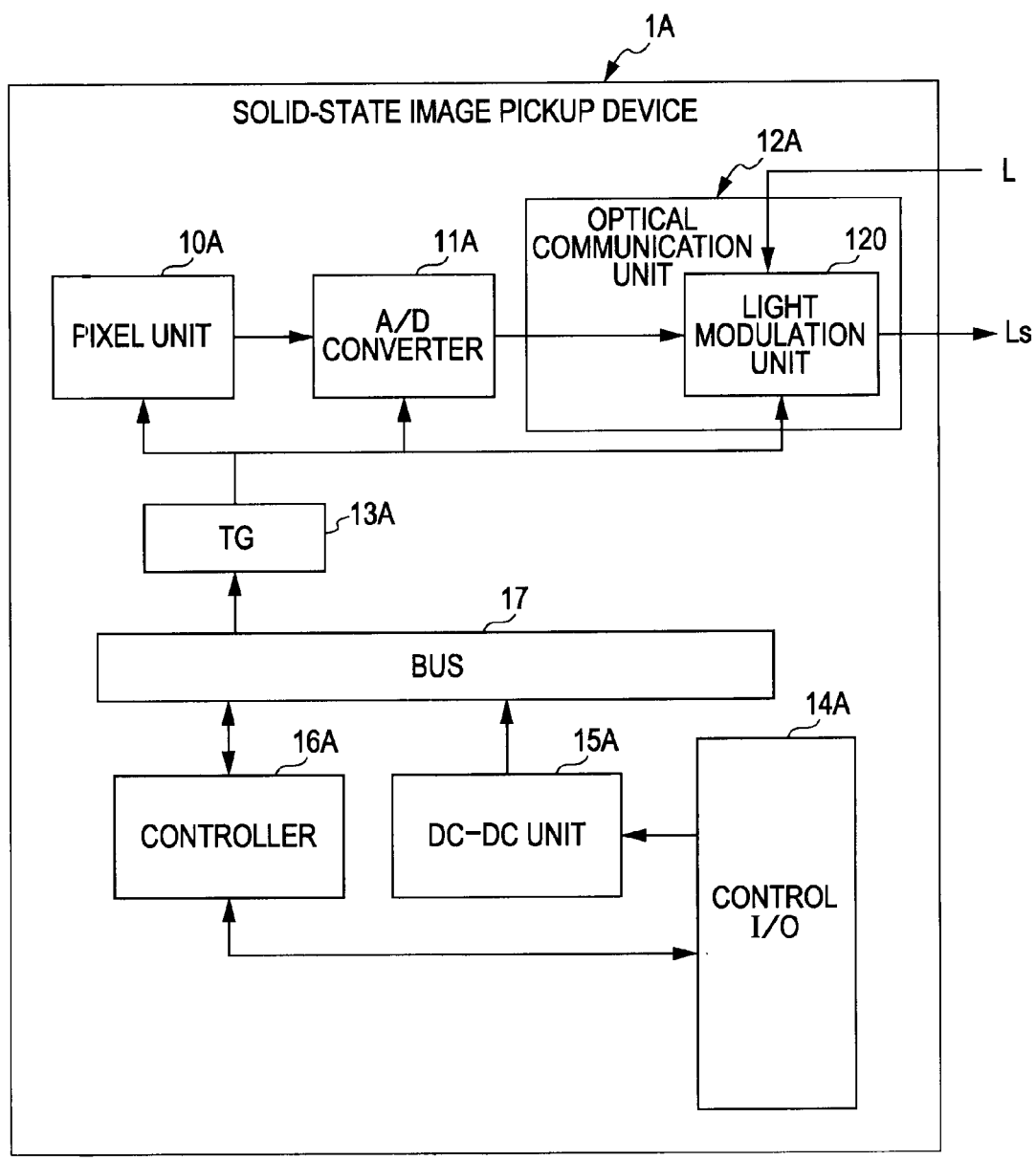
FIG. 1 is a functional block diagram schematically illustrating an exemplary solid-state image pickup device according to a first embodiment of the present invention.

FIG. 1 is a functional block diagram of a solid-state image pickup device according to a first embodiment of the present invention. According to the present embodiment, a solid-state image pickup device 1A is formed from a complementary metal oxide semiconductor (CMOS) image sensor or a charge coupled device (CCD) image sensor. The solid-state image pickup device 1A includes a pixel unit 10A that converts a light beam into an electrical signal and outputs the electrical signal and an A/D converter 11A that converts the electrical signal output from the pixel unit 10A into a digital signal. The pixel unit 10A includes pixels arranged two-dimensionally or one-dimensionally. The pixels convert light into electrical signals. The pixel unit 10A outputs an electrical signal in accordance with the intensity of incident light.

The solid-state image pickup device 1A includes an optical communication unit 12A. The optical communication unit 12A converts the digital electrical signal output from the A/D converter 11A into a light signal and outputs the light signal. The optical communication unit 12A includes a light modulation unit 120 that modulates an externally input light beam L and outputs a signal light beam Ls. That is, the light modulation unit 120 modulates an externally input light beam that passes therethrough or that is reflected thereby in accordance with a change in an electrical signal (e.g., a voltage signal).

In the optical communication unit 12A, the externally input light beam L having a constant intensity is input to the light modulation unit 120. In addition, a digital electrical signal converted by the A/D converter 11A is input to the light modulation unit 120. Thereafter, the light modulation unit 120 modulates the externally input light beam L on the basis of the electrical signal input from the A/D converter 11A.

Thus, the signal light beam Ls based on pixel data read from the pixel unit 10A is output from the optical communication unit 12A.

The solid-state image pickup device 1A includes a timing generator (TG) 13A. The TG 13A generates a drive clock (CLK) in accordance with an operation mode and supplies the drive clock to the following functional block: the pixel unit 10A, the A/D converter 11A, and the optical communication unit 12A. In addition, the solid-state image pickup device 1A includes a control I/O 14A through which input and output of a control signal are performed, a DC-DC unit 15A that supplies electrical power, and a controller 16A that controls readout of pixel data. The controller 16A, the DC-DC unit 15A, and the timing generator 13A are connected to a bus 17. Thus, a control signal and data are transmitted and received. Since the solid-state image pickup device 1A transmits a pixel signal through optical communication, an electrode for externally transmitting the pixel signal is not necessary. Accordingly, an electrode (not shown) connected to the control I/O 14A can be formed from at least the following three lines: a power line, a GND line, and a control line.

The controller 16A controls the DC-DC unit 15A that switches between power-on and power-off of the solid-state image pickup device 1A. In addition, the controller 16A generates a drive clock using the timing generator 13A and supplies the drive clock to the pixel unit 10A, the A/D converter 11A, and the optical communication unit 12A. In this way, the controller 16A causes the pixel unit 10A, the A/D converter 11A, and the optical communication unit 12A to operate in synchronization with the drive clock.

The pixel unit 10A, the A/D converter 11A, and the optical communication unit 12A synchronize input and output of a signal with the drive clock supplied from the timing generator 13A. The pixel unit 10A reads pixel data formed in accordance with an image of incident light in the form of an electrical signal. The A/D converter 11A receives the pixel data read by the pixel unit 10A, converts the pixel data into a digital signal, and outputs the digital signal. The optical communication unit 12A receives the digital electrical signal converted by the A/D converter 11A, modulates the light beam L externally input to the light modulation unit 120 on the basis of the electrical signal read by the pixel unit 10A, and outputs the signal light beam Ls.

Outline of Optical Apparatus of First Embodiment

Figure 2:
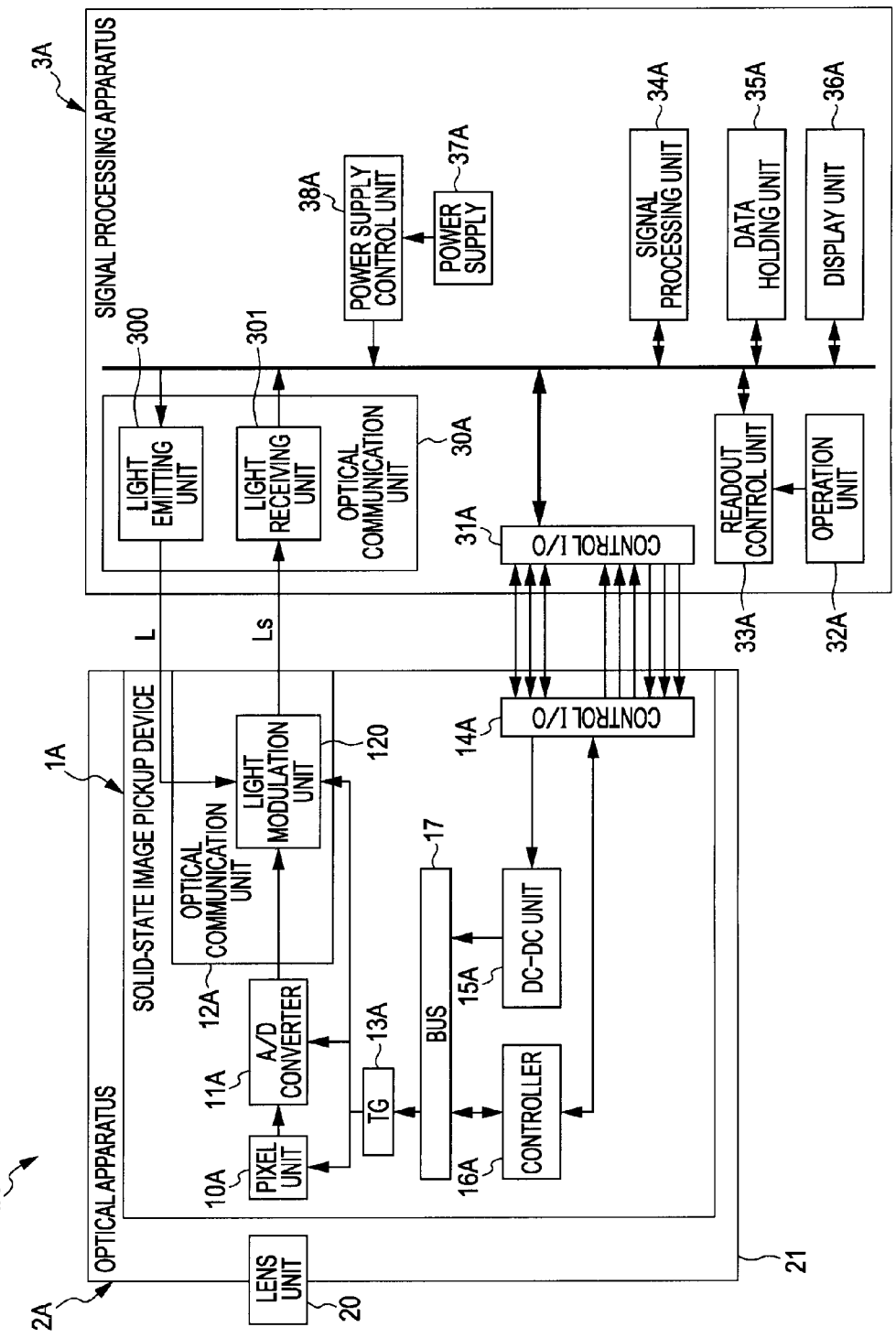
FIG. 2 is a functional block diagram schematically illustrating an exemplary signal processing system including an optical apparatus and a signal processing apparatus.

FIG. 2 is a functional block diagram of an exemplary signal processing system including an optical apparatus and a signal processing apparatus. The outline of an optical apparatus including the solid-state image pickup device is described first. According to the first embodiment, an optical apparatus 2A includes a housing 21. The housing 21 includes the solid-state image pickup device 1A and a lens unit 20 mounted therein. The lens unit 20 is an example of an optical element. The lens unit 20 includes a single lens or a combination of a plurality of lenses.

The optical apparatus 2A is configured so that the pixel unit 10A of the solid-state image pickup device 1A is disposed at a focus position of the lens unit 20. The image of light incident through the lens unit 20 is focused on the pixel unit 10A of the solid-state image pickup device 1A.

In order to position the focus of the lens unit 20 on the pixel unit 10A of the solid-state image pickup device 1A regardless of the distance between the optical apparatus 2A and an object to be imaged, the optical apparatus 2A includes, for example, a focusing mechanism that moves the lens unit 20 relative to the solid-state image pickup device 1A in an optical axis direction.

Outline of Signal Processing Apparatus of First Embodiment

The signal processing apparatus is described next with reference to FIG. 2. According to the first embodiment, a signal processing apparatus 3A includes an optical communication unit 30A that converts a light signal into an electrical signal and a control I/O 31A through which signals (e.g., a control signal) are input and output. The signal processing apparatus 3A is connected to the optical apparatus 2A. When the optical apparatus 2A is connected to the signal processing apparatus 3A, the optical communication unit 30A of the signal processing apparatus 3A is optically connected to the optical communication unit 12A of the solid-state image pickup device 1A. In addition, the control I/O 31A is connected to the control I/O 14A of the solid-state image pickup device 1A.

The signal processing apparatus 3A includes an operation unit 32A that receives user operation and a readout control unit 33A that instructs the solid-state image pickup device 1A of the optical apparatus 2A to read out pixel data.

The signal processing apparatus 3A instructs, from the control I/O 31A, the solid-state image pickup device 1A of the optical apparatus 2A to read out pixel data. Thereafter, the signal processing apparatus 3A acquires the image data from the solid-state image pickup device 1A through optical communication performed between the optical communication unit 30A of the signal processing apparatus 3A and the optical communication unit 12A of the solid-state image pickup device 1A.

The optical communication unit 30A includes a light emitting unit 300 that emits the light beam L to be input to the light modulation unit 120 of the solid-state image pickup device 1A and a light receiving unit 301 that receives the signal light beam Ls output from the light modulation unit 120. The light emitting unit 300 includes a light-emitting element, such as a semiconductor laser (LD). The light emitting unit 300 emits the light beam L having a constant, continuous intensity. The light receiving unit 301 includes a light receiving element, such as a photodiode (PD). The light receiving unit 301 receives the signal light beam Ls generated by modulating the light beam L output from the light emitting unit 300 of the signal processing apparatus 3A using the light modulation unit 120 of the solid-state image pickup device 1A. Subsequently, the light receiving unit 301 converts pixel data input in the form of an optical signal into an electrical signal and outputs the electrical signal.

The signal processing apparatus 3A includes a signal processing unit 34A. The signal processing unit 34A performs predetermined signal processing on the pixel data acquired through optical communication with the solid-state image pickup device 1A and generates image data. The signal processing apparatus 3A further includes a data holding unit 35A that holds the pixel data acquired from the solid-state image pickup device 1A and a display unit 36A that displays an image using the image data generated by the signal processing unit 34A.

The signal processing apparatus 3A includes a power supply 37A and a power supply control unit 38A. The power supply 37A supplies electrical power to the signal processing apparatus 3A and the optical apparatus 2A. The power supply control unit 38A controls the supplied power. That is, the power supply control unit 38A performs power supply control so that start and stop of supply of the power to the signal processing apparatus 3A and the optical apparatus 2A are switched in a predetermined order in response to power-on and power-off operations of the signal processing apparatus 3A.

Outline of Signal Processing System of First Embodiment

The outline of the signal processing system is described next with reference to FIG. 2. According to the first embodiment, a signal processing system 4A includes the optical apparatus 2A and the signal processing apparatus 3A. For example, the optical apparatus 2A is removable from the signal processing apparatus 3A and is interchangeable.

In the signal processing system 4A, when the optical apparatus 2A is connected to the signal processing apparatus 3A, the optical communication unit 30A of the signal processing apparatus 3A is optically connected to the optical communication unit 12A of the solid-state image pickup device 1A of the optical apparatus 2A. In addition, the control I/O 31A of the signal processing apparatus 3A is connected to the control I/O 14A of the solid-state image pickup device 1A.

In this way, in the signal processing system 4A, the optical communication unit 12A of the solid-state image pickup device 1A and the optical communication unit 30A of the signal processing apparatus 3A allow data to be communicated between the optical apparatus 2A and the signal processing apparatus 3A using a light signal.

In addition, in the signal processing system 4A, the control I/O 31A of the signal processing apparatus 3A and the control I/O 14A of the solid-state image pickup device 1A allow a control signal to be communicated between the signal processing apparatus 3A and the optical apparatus 2A.

In the signal processing system 4A, the operation unit 32A of the signal processing apparatus 3A receives a user operation. When triggered by a user operation through the operation unit 32A, the readout control unit 33A of the signal processing apparatus 3A outputs a control signal which initiates readout of pixel data.

In the signal processing system 4A, the control signal which initiates readout of pixel data is input to the solid-state image pickup device 1A of the optical apparatus 2A via the control I/O 31A of the signal processing apparatus 3A and the control I/O 14A of the optical apparatus 2A.

In the signal processing system 4A, when the control signal which initiates readout of pixel data is input to the solid-state image pickup device 1A of the optical apparatus 2A, the controller 16A of the solid-state image pickup device 1A generates a drive clock using the timing generator 13A.

The drive clock generated by the timing generator 13A is supplied to the pixel unit 10A, the A/D converter 11A, and the optical communication unit 12A. The pixel unit 10A reads the pixel data in the form of an electrical signal. The A/D converter 11A receives the pixel data read by the pixel unit 10A, converts the pixel data into a digital signal, and outputs the digital signal. The optical communication unit 12A receives the digital electrical signal converted by the A/D converter 11A. The external light beam L input to the light modulation unit 120 is modulated on the basis of the electrical signal read out of the pixel unit 10A. Thus, the signal light beam Ls is output.

In the signal processing system 4A, the pixel data read from the solid-state image pickup device 1A is input to the signal processing apparatus 3A using optical communication between the optical communication unit 12A of the solid-state image pickup device 1A and the optical communication unit 30A of the signal processing apparatus 3A.

In the signal processing system 4A, when the pixel data read by the solid-state image pickup device 1A is input to the signal processing apparatus 3A through optical communication, the optical communication unit 30A of the signal processing apparatus 3A converts the pixel data in the form of a light signal into an electrical signal and outputs the electrical signal.

In the signal processing system 4A, the signal processing unit 34A of the signal processing apparatus 3A performs predetermined signal processing on the pixel data in the form of an electrical signal converted by the optical communication unit 30A of the signal processing apparatus 3A. Thus, an image data is generated. For example, the image data is displayed on the display unit 36A.

Figure 3:
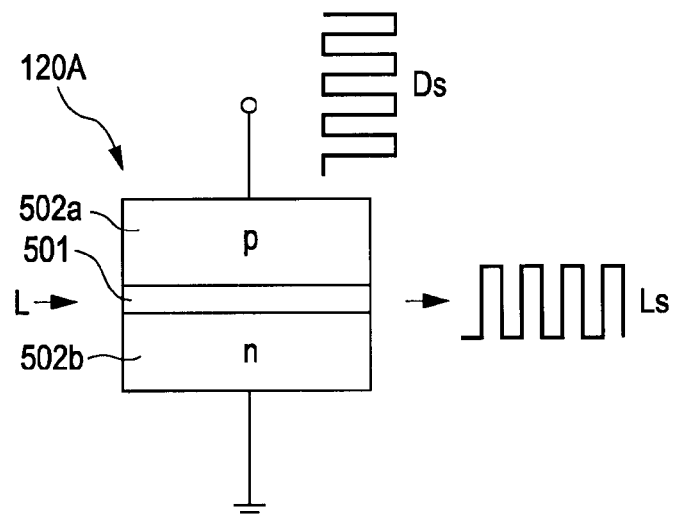
FIG. 3 is a diagram illustrating an exemplary configuration of an optical communication unit of the solid-state image pickup device.
Figure 4:
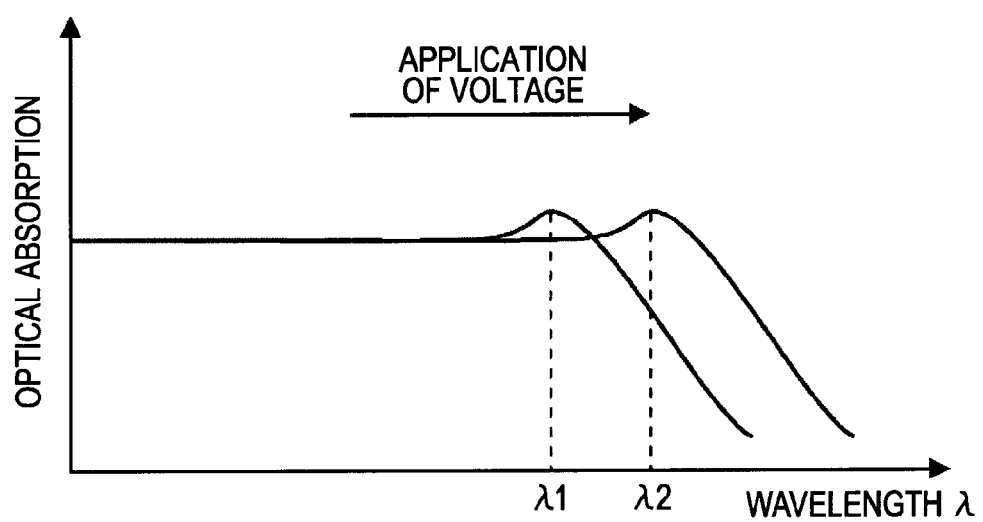
FIG. 4 is a graph illustrating a relationship between an applied voltage and the optical absorption.

Exemplary Configuration of Optical Communication Unit of Solid-State Image Pickup Device FIG. 3 is a diagram illustrating an exemplary configuration of the optical communication unit of the solid-state image pickup device. FIG. 4 is a graph illustrating a relationship between an applied voltage and the optical absorption. The optical communication unit 12A of the solid-state image pickup device 1A includes an electric-field absorption optical modulator 120A serving as the light modulation unit 120. The electric-field absorption optical modulator 120A uses a phenomenon in which, when an electric field is applied to a semiconductor microstructure called a quantum well, the band structure of the semiconductor is changed and, therefore, the optical absorption is changed.

The electric-field absorption optical modulator 120A has a structure in which a waveguide layer 501 is disposed between a P layer 502a and an N layer 502b. As shown in FIG. 4, the optical absorption band of the waveguide layer 501 of the electric-field absorption optical modulator 120A is shifted in accordance with a bias voltage. Accordingly, for example, when light having a wavelength of $\lambda 2$ is input to the waveguide layer 501 and if an applied voltage is present, the light is absorbed by the waveguide layer 501. However, if an applied voltage is not present, the light passes through the waveguide layer 501. In this way, since the loss of light input to the waveguide layer 501 is changed in accordance with the applied voltage, the intensity of the light can be modulated.

The solid-state image pickup device 1A provides optical modulation by applying a voltage in accordance with the electrical signal output from the A/D converter 11A to the electric-field absorption optical modulator 120A. Accordingly, the optical communication unit 12A of the solid-state image pickup device 1A is configured so that, when the optical apparatus 2A is connected to the signal processing apparatus 3A, the light beam L output from the light emitting unit 300 of the signal processing apparatus 3A is input to the waveguide layer 501 of the electric-field absorption optical modulator 120A. In addition, the optical communication unit 12A is configured so that, the signal light beam Ls that has been modulated by passing through the waveguide layer 501 of the electric-field absorption optical modulator 120A is input to the light receiving unit 301 of the signal processing apparatus 3A. Furthermore, the optical communication unit 12A is configured so that the voltage of the digital electrical signal converted and output by the A/D converter 11A is applied to the P layer 502a and the N layer 502b of the electric-field absorption optical modulator 120A.

In this way, the optical communication unit 12A of the solid-state image pickup device 1A modulates the light beam L emitted from the light emitting unit 300 of the signal processing apparatus 3A to the electric-field absorption optical modulator 120A on the basis of a digitized electrical signal Ds read from the pixel unit 10A. Thereafter, the optical communication unit 12A outputs the modulated light beam L as the signal light beam Ls.

Figure 5:
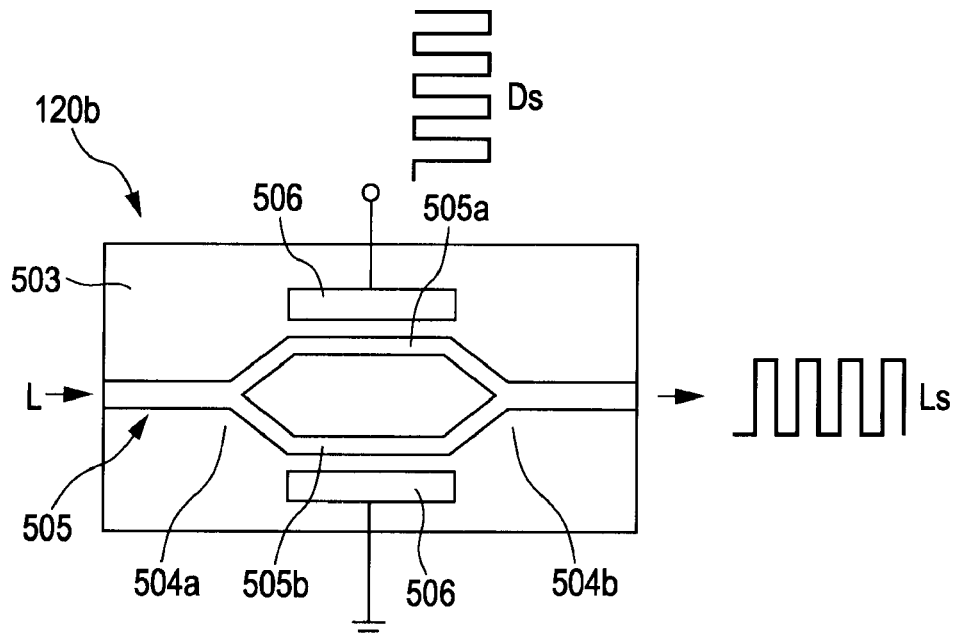
FIG. 5 is a diagram of another example of the configuration of the optical communication unit of the solid-state image pickup device.

FIG. 5 is a diagram of another example of the configuration of the optical communication unit of the solid-state image pickup device. The optical communication unit 12A of the solid-state image pickup device 1A includes a Mach-Zehnder modulator 120B serving as the light modulation unit 120. The mach-Zehnder modulator 120B uses an electro-optic effect called Pockels effect, in which the index of refraction changes in accordance with the applied voltage. Light modulators that use the electro-optic effect can modulate the phase of light in accordance with the applied voltage.

By using the light phase difference caused by the electro-optic effect, the mach-Zehnder modulator 120B generates the optical path length difference between two waveguides that form a mach-Zehnder modulator. Thus, interference of light is caused, and ON/OFF switching of light can be performed.

The mach-Zehnder modulator 120B includes an optical waveguide 505 in a substrate 503 formed of ferroelectric single crystal, such as lithium niobate (LiNbO$_3$) single crystal. By using a branching unit 504$a$ and a joining unit 504$b$, the optical waveguide 505 is branched into a first waveguide 505$a$ and a second waveguide 505$b$, which are joined together again. The mach-Zehnder modulator 120B further includes an electrode 506 used for applying a voltage. Note that the mach-Zehnder modulator 120B may be formed from a semiconductor material, such as gallium arsenide (GaAs) or indium arsenide (InAs). The mach-Zehnder modulator 120B made of a semiconductor material is formed on an InP substrate using a semiconductor process. The mach-Zehnder modulator 120B can be made smaller than the mach-Zehnder modulator 120B made of LiNbO$_3$.

When a voltage V1 that shifts the phase of a light beam passing through the first waveguide 505$a$ from the phase of a light beam passing through the second waveguide 505$b$ by n is applied to the mach-Zehnder modulator 120B, the phase of the light beam branched in the branching unit 504$a$ is shifted by π and is joined with the other light beam in the joining unit 504$b$. The joined light beams having a phase difference of π cancel each other out due to interference. Accordingly, the level of the output is "0".

In contrast, when a voltage V0 that does not cause a difference between the phase of a light beam passing through the first waveguide 505$a$ and the phase of a light beam passing through the second waveguide 505$b$ is applied to the mach-Zehnder modulator 120B, the light beam branched in the branching unit 504$a$ and the other light beam of the same phase are joined together in the joining unit 504$b$. The joined light beams having the same phase increase the intensities of each other due to interference. Accordingly, the level of the output is "1".

In this way, in the mach-Zehnder modulator 120B, by applying a voltage V1 that shifts the phase of a light beam passing through the first waveguide 505$a$ from the phase of a light beam passing through the second waveguide 505$b$ by π, ON/OFF switching of light can be realized.

In the solid-state image pickup device 1A, by applying a voltage in accordance with an electrical signal output from the A/D converter 11A to the mach-Zehnder modulator 120B, optical modulation can be realized. Accordingly, the optical communication unit 12A of the solid-state image pickup device 1A is configured so that, when the optical apparatus 2A is connected to the signal processing apparatus 3A, the light beam L output from the light emitting unit 300 of the signal processing apparatus 3A is input to an input end of the optical waveguide 505 of the mach-Zehnder modulator 120B. In addition, the optical communication unit 12A is configured so that the signal light beam Ls that is modulated when passing through the first waveguide 505$a$ and the second waveguide 505$b$ of the mach-Zehnder modulator 120B and that is output from an output end of the optical waveguide 505 is input to the light receiving unit 301 of the signal processing apparatus 3A. Furthermore, the optical communication unit 12A is configured so that the voltage of the digital electrical signal that is converted by the A/D converter 11A and is output is applied to the electrode 506 of the mach-Zehnder modulator 120B.

In this way, the optical communication unit 12A of the solid-state image pickup device 1A modulates the light beam L emitted from the light emitting unit 300 of the signal processing apparatus 3A to the mach-Zehnder modulator 120B on the basis of the digitized electrical signal Ds read from the pixel unit 10A. Thereafter, the optical communication unit 12A outputs the modulated light beam L as the signal light beam Ls.

Figure 6:
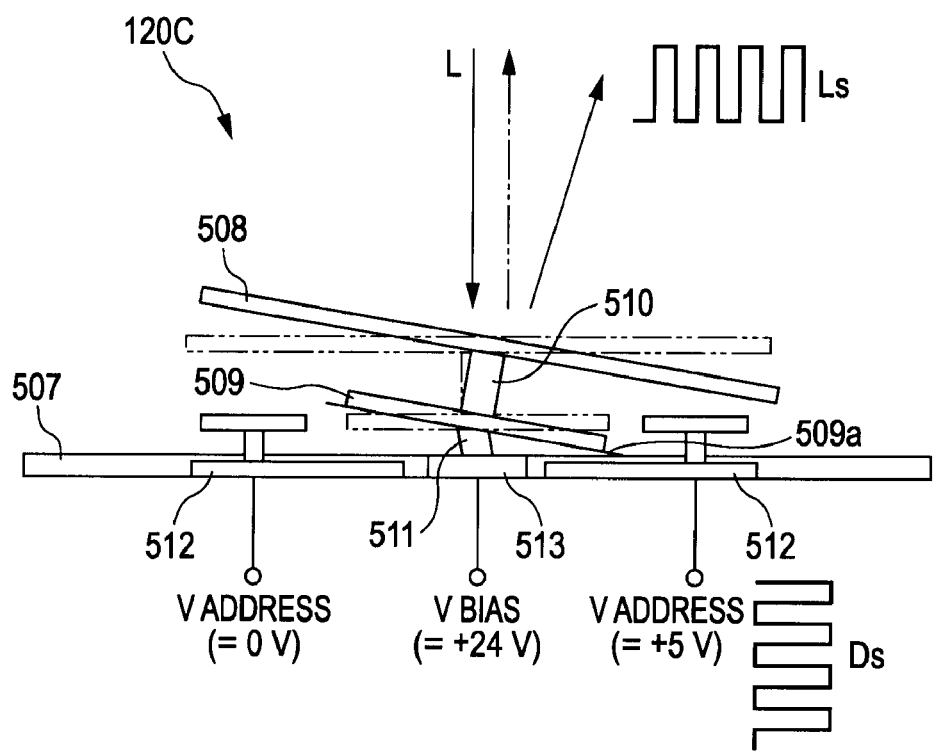
FIG. 6 is a diagram of another example of the configuration of the optical communication unit of the solid-state image pickup device.

FIG. 6 is a diagram of another example of the configuration of the optical communication unit of the solid-state image pickup device. The optical communication unit 12A of the solid-state image pickup device 1A includes a mirror unit 120C serving as the light modulation unit 120. The mirror unit 120C is formed from a digital micromirror device (DMD) generated by using a micro electro mechanical systems (MEMS) technology.

For example, the mirror unit 120C includes, on a silicon (Si) substrate 507, a reflecting mirror 508, a yoke 509 attached to the reflecting mirror 508, and a mirror support host 510 used for securing the reflecting mirror 508 to the yoke 509. The reflecting mirror 508 and the yoke 509 are supported by a hinge 511 on the substrate 507. A shock-absorbing plate 509$a$ is formed on the top end of the yoke 509. The hinge 511 has elasticity that allows deformation and restoration thereof. The substrate 507 has an address electrode 512 formed thereon. The address electrode 512 faces the yoke 509 and the reflecting mirror 508. The yoke 509 and the reflecting mirror 508 are mechanically and electrically connected to a bias reset bus 513.

When a bias voltage is applied to the mirror unit 120C and if a voltage is applied to the address electrode 512, an electrostatic force is exerted between the reflecting mirror 508 and the address electrode 512 and between the yoke 509 and the address electrode 512 so that an electrostatic torque is generated. Accordingly, the reflecting mirror 508 and the yoke 509 rotates until the shock-absorbing plate 509$a$ is brought into contact with the substrate 507 and the movement of the shock-absorbing plate 509$a$ stops. Thus, the reflecting mirror 508 is tilted. If the bias voltage is not applied, the reflecting mirror 508 and the yoke 509 are stably located at horizontal position due to the restorative force of the hinge 511.

In this way, in the mirror unit 120C, the direction in which the light input to the reflecting mirror 508 is reflected is changed in accordance with whether the voltage is applied or not. Thus, the intensity of light on the light receiving side is changed in accordance with the angle of the reflecting mirror 508. As a result, ON/OFF control of light can be realized.

In the solid-state image pickup device 1A, by applying the voltage in accordance with the electrical signal output from the A/D converter 11A to the mirror unit 120C, optical modulation is performed. Accordingly, the optical communication unit 12A of the solid-state image pickup device 1A is configured so that, when the optical apparatus 2A is connected to the signal processing apparatus 3A, the light beam L output from the light emitting unit 300 of the signal processing apparatus 3A is input to the reflecting mirror 508 of the mirror unit 120C. In addition, the optical communication unit 12A is configured so that, by using the angle of the reflecting mirror 508 when the voltage is not applied, the light reflected by the reflecting mirror 508 is input to, for example, the light receiving unit 301 of the signal processing apparatus 3A while, by using the angle of the reflecting mirror 508 when the voltage is applied, the light reflected by the reflecting mirror 508 is not input to the light receiving unit 301. Furthermore, the optical communication unit 12A is configured so that the voltage of the electrical signal that is converted by the A/D converter 11A and is output is applied to the mirror unit 120C.

In this way, the optical communication unit 12A of the solid-state image pickup device 1A modulates the light beam L emitted from the light emitting unit 300 of the signal processing apparatus 3A to the mirror unit 120C on the basis of the digitized electrical signal Ds read from the pixel unit 10A. Thereafter, the optical communication unit 12A outputs the modulated light beam L as the signal light beam Ls.

Figure 7:
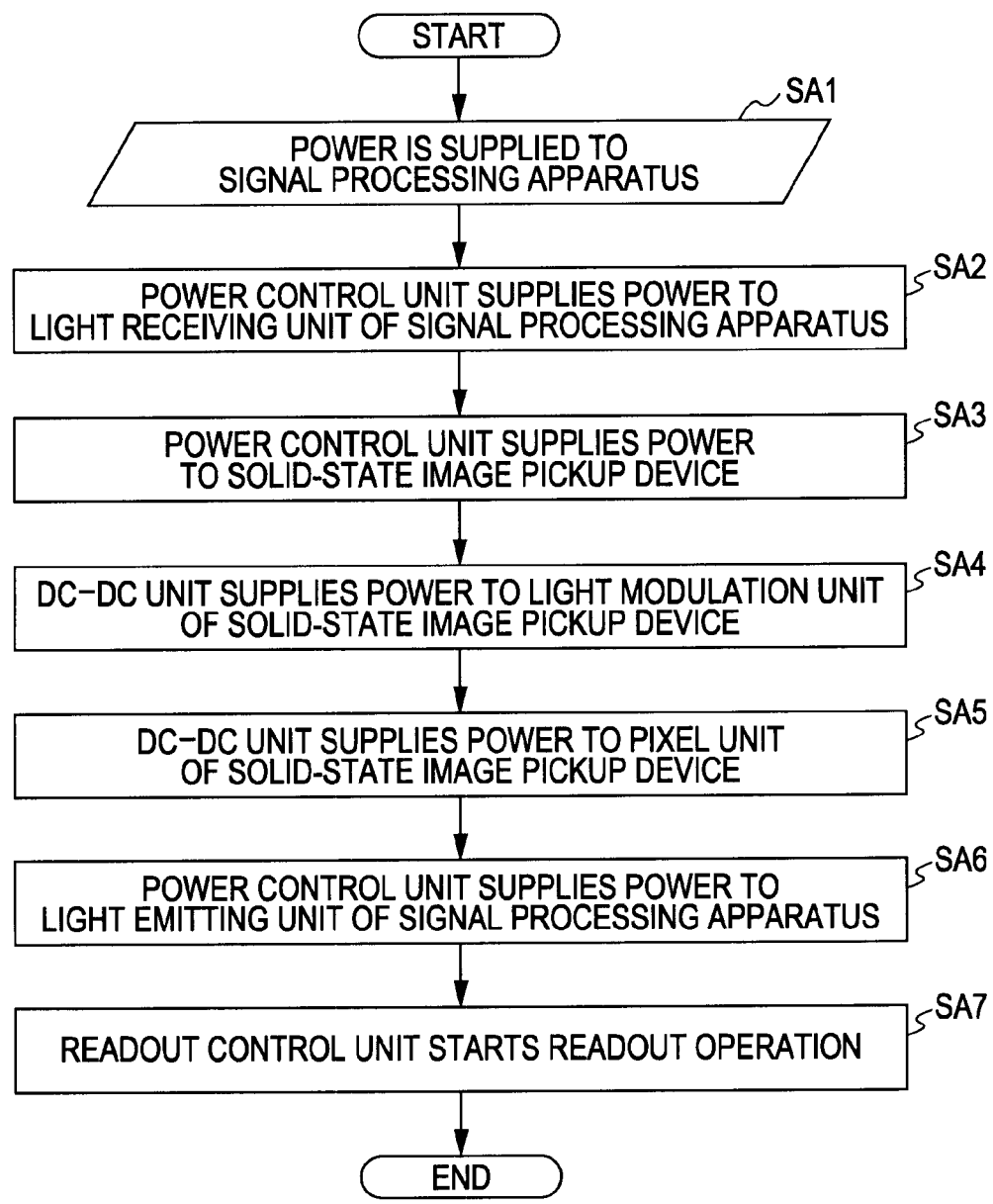
Figure 8:
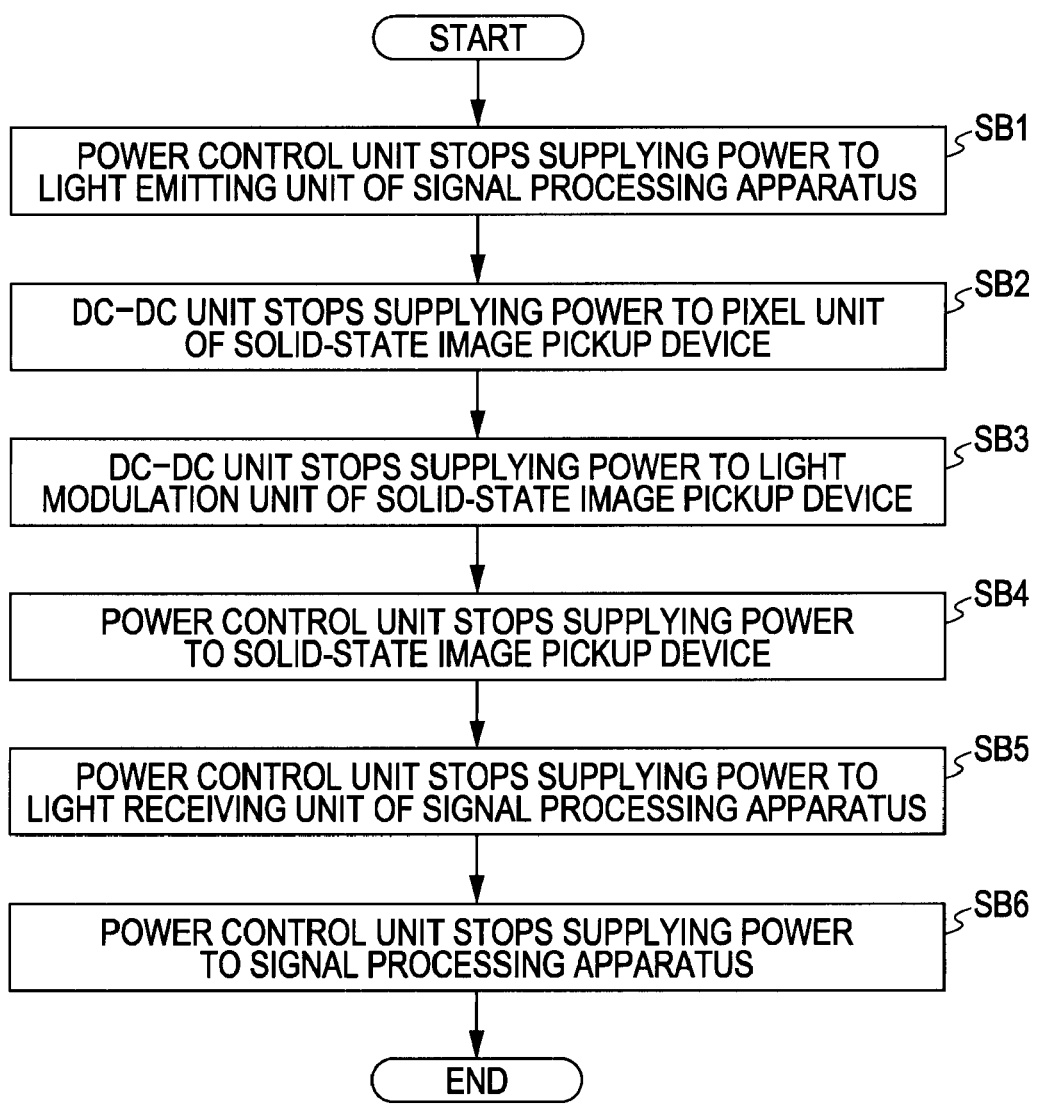
FIG. 8 is a flowchart of a processing flow of when the power is turned off.

Example of Power Supply Control Performed by Signal Processing System of First Embodiment FIG. 7 is a flowchart of a processing flow of when the power is turned on. FIG. 8 is a flowchart of a processing flow of when the power is turned off. An example of power supply control performed when the power is turned on and off is described next.

An exemplary processing performed when the power is turned on is first described with reference to the accompanying drawings. The signal processing system 4A performs power supply control so that, when the power is turned on, the signal processing apparatus 3A is powered on first and, subsequently, the solid-state image pickup device 1A of the optical apparatus 2A is powered on. In addition, in the optical communication unit 30A of the signal processing apparatus 3A, the light receiving unit 301 is powered on first and, subsequently, the light emitting unit 300 is powered on.

That is, when an operation to power on the signal processing system 4A is performed using a power switch (not shown), the power is supplied to the signal processing apparatus 3A in step SA1 shown in FIG. 7. When the power is supplied to the signal processing apparatus 3A, the power supply control unit 38A of the signal processing apparatus 3A supplies the power to the light receiving unit 301 of the signal processing apparatus 3A in step SA2 shown in FIG. 7.

After the power supply control unit 38A of the signal processing apparatus 3A starts supplying power to the light receiving unit 301 of the signal processing apparatus 3A, the power supply control unit 38A supplies power to the solid-state image pickup device 1A of the optical apparatus 2A in step SA3 shown in FIG. 7.

In the signal processing system 4A having the configuration shown in FIG. 2, the power supply 37A is included in the signal processing apparatus 3A. The power is supplied from the signal processing apparatus 3A to the optical apparatus 2A by the control I/O 31A of the signal processing apparatus 3A and the control I/O 14A of the solid-state image pickup device 1A.

Upon receiving the power from the signal processing apparatus 3A, the DC-DC unit 15A of the solid-state image pickup device 1A supplies power to the light modulation unit 120 of the solid-state image pickup device 1A in step SA4 shown in FIG. 7. More specifically, the power is supplied to a drive unit (not shown) of the optical communication unit 12A. Thereafter, the light modulation unit 120 is powered on. In this way, malfunction of an output stage of the drive unit of the light modulation unit 120 caused by supplying power to the output stage in an unstable state can be prevented. Subsequently, in step SA5 shown in FIG. 7, power is supplied to the functional blocks regarding an image capturing operation (e.g., the pixel unit 10A). By following this sequence, when the solid-state image pickup device 1A is powered on, malfunction or damage of an input stage of the drive unit of the optical communication unit 12A occurring when pixel data is input to the optical communication unit 12A before the optical communication unit 12A enters a ready state can be prevented.

When power is supplied to the solid-state image pickup device 1A and, therefore, power is supplied to the light modulation unit 120, the power supply control unit 38A of the signal processing apparatus 3A supplies power to the light emitting unit 300 of the signal processing apparatus 3A in step SA6 shown in FIG. 7.

Thus, the light receiving unit 301 of the signal processing apparatus 3A, the light modulation unit 120 of the solid-state image pickup device 1A, and the light emitting unit 300 of the signal processing apparatus 3A are powered on in that order.

As described above, when these units are sequentially powered on from the side of the light receiving unit to the side of light emitting unit, the readout control unit 33A of the signal processing apparatus 3A outputs a control signal that initiates readout of pixel data in step SA7 shown in FIG. 7. Thus, readout of pixel data from the solid-state image pickup device 1A is started.

A power-off processing is described next with reference to the accompanying drawings. In order to turn off the power, the following power supply control is performed. In the signal processing system 4A, the solid-state image pickup device 1A of the optical apparatus 2A and the signal processing apparatus 3A are powered off in sequence. In addition, in the optical communication unit 30A of the signal processing apparatus 3A, the light emitting unit 300 and the light receiving unit 301 are powered off in sequence.

That is, when the user powers off the signal processing system 4A using a power switch (not shown), the power supply control unit 38A of the signal processing apparatus 3A stops supplying power to the light emitting unit 300 of the signal processing apparatus 3A in step SB1 shown in FIG. 8. After the power supply control unit 38A of the signal processing apparatus 3A stops supplying power to the light emitting unit 300 of the signal processing apparatus 3A, the power supply control unit 38A outputs a control signal that stops supplying power to the solid-state image pickup device 1A of the optical apparatus 2A. Upon receiving the control signal that stops supplying power, the DC-DC unit 15A of the solid-state image pickup device 1A stops supplying power to the functional blocks associated with an image capturing operation (e.g., the pixel unit 10A of the solid-state image pickup device 1A) in step SB2 shown in FIG. 8. After the power supply to the pixel unit 10A is stopped, the DC-DC unit 15A stops supplying power to the light modulation unit 120 of the solid-state image pickup device 1A in step SB3. By following this sequence of when the solid-state image pickup device 1A is powered off, malfunction or damage of an input stage of the drive unit of the optical communication unit 12A occurring when pixel data is input to the optical communication unit 12A after the optical communication unit 12A enters an undriven state can be prevented. In the optical communication unit 12A, after power supply to the light modulation unit 120 is stopped, power supply to the drive unit is stopped. In this way, as in the case in which the power is turned on, malfunction of an output stage of the drive unit of the light modulation unit 120 caused by continuously supplying power to the output stage in an unstable state can be prevented.

After stopping supplying power to the light modulation unit 120 of the solid-state image pickup device 1A, the power supply control unit 38A of the signal processing apparatus 3A stops supplying power to the solid-state image pickup device 1A in step SB4 shown in FIG. 8.

After stopping supplying power to the solid-state image pickup device 1A, the power supply control unit 38A of the signal processing apparatus 3A stops supplying power to the light receiving unit 301 of the signal processing apparatus 3A in step SB5 shown in FIG. 8.

In this way, the power supply to the light emitting unit 300 of the signal processing apparatus 3A, the light modulation unit 120 of the solid-state image pickup device 1A, and the light receiving unit 301 of the signal processing apparatus 3A is sequentially stopped.

As described above, after these units are sequentially powered off from the side of the side of light emitting unit to the light receiving unit, the power supply control unit 38A of the signal processing apparatus 3A stops supplying power to the signal processing apparatus 3A in step SB6 shown in FIG. 8.

Figure 9:
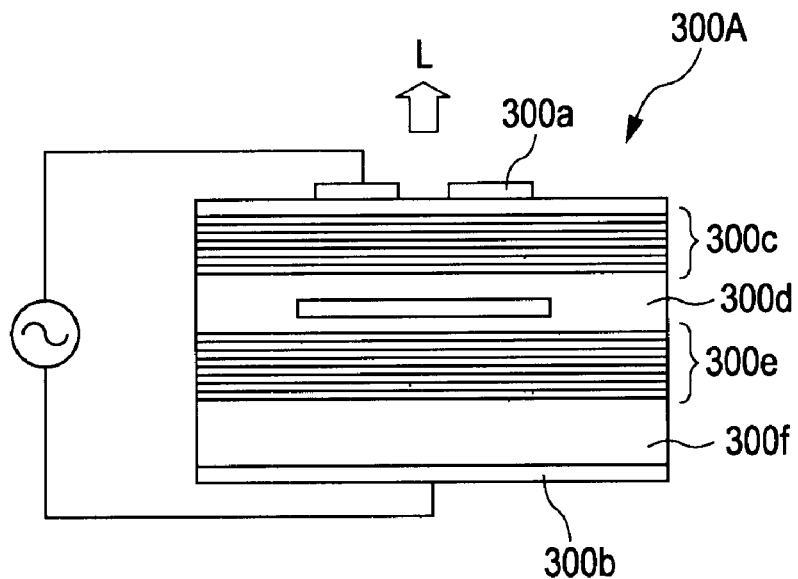
FIG. 9 is a diagram illustrating an exemplary configuration of a light emitting unit.

FIG. 9 is a diagram illustrating an exemplary configuration of the light emitting unit. For example, a vertical cavity surface emitting laser (VCSEL) 300A is used as the light emitting unit 300. The vertical cavity surface emitting laser 300A includes a top Bragg reflecting mirror (DBR mirror) 300c, an active layer 300d, a bottom Bragg reflecting mirror (DBR mirror) 300e, and an n-type semiconductor substrate 300f stacked between a p-type electrode 300a and an n-type electrode 300b. In the vertical cavity surface emitting laser 300A, by forming the top Bragg reflecting mirror 300c and the bottom Bragg reflecting mirror 300e, each made from a dielectric multilayer film, on either side of the active layer 300d, an oscillator is formed between the mirrors.

The principle of the operation of the vertical cavity surface emitting laser 300A is described next.

First, by applying a voltage to the p-type electrode 300a and the n-type electrode 300b and externally passing an electrical current through the vertical cavity surface emitting laser 300A, an inverted population state of the energy level of the active layer 300d is generated.

Secondly, photons having the energy corresponding to an energy gap are emitted in the active layer 300d. The photons cause simulated emission. Thus, the intensity of light is amplified.

Thirdly, the light is reflected by the top and bottom mirrors of the active layer 300d. A portion of light is led into the active layer 300d again and is amplified through simulated emission.

Finally, the amplified portion of light passes through an end surface of the vertical cavity surface emitting laser 300A having the p-type electrode 300a thereon and is emitted to the outside.

As a result, by applying a voltage to the vertical cavity surface emitting laser 300A and, therefore, passing a predetermined electrical current through the vertical cavity surface emitting laser 300A, the continuous constant light beam L can be output. Note that an edge-emitting semiconductor laser may be used as the light emitting unit 300.

When an excessive current is input to the light emitting unit 300 formed from a semiconductor laser, a portion in the vicinity of a mirror is melted or damaged. In addition, for example, in a drive circuit that absorbs an electrical current in order to drive a semiconductor laser, when only the semiconductor laser is powered on and if an undesired current flows in the drive circuit, the drive circuit may be damaged. Accordingly, like the power-on control for the drive unit (not shown) of the light modulation unit 120 of the optical communication unit 12A, in the light emitting unit 300, when the power is turned on in step SA6 shown in FIG. 7, power is supplied to the drive circuit (not shown) first and, subsequently, power is supplied to the semiconductor laser. In addition, like the power-off control for the drive unit (not shown) of the light modulation unit 120 of the optical communication unit 12A, when the power is turned off in step SB1 shown in FIG. 8, supply of the power to the drive unit is stopped after supply of the power to the semiconductor laser is stopped.

Figure 10:
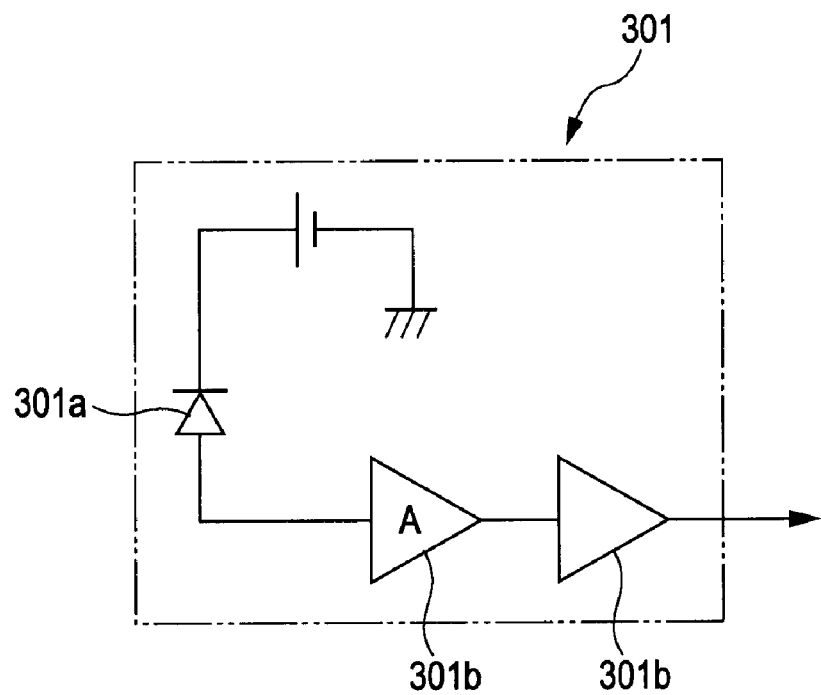
FIG. 10 is an exemplary functional block diagram of the light receiving unit.

FIG. 10 is an exemplary functional block diagram of the light receiving unit. The light receiving unit 301 includes a photodiode 301a, a transformer impedance amplifier 301b functioning as an amplifier, and a limiting amplifier 301c. A voltage (a reverse bias voltage) is applied to the photodiode 301a. The photodiode 301a output an electrical current in accordance with the incident light. The transformer impedance amplifier 301b amplifies a small electrical current signal input from the photodiode 301a and converts the electrical current signal to a voltage signal. The limiting amplifier 301c amplifies the small signal input from the transformer impedance amplifier 301b so that the input voltage signal has a constant voltage amplitude regardless of the original amplitude of the signal. The limiting amplifier 301c then outputs the signal.

In general, the transformer impedance amplifier 301b disposed immediately downstream of the photodiode 301a operates at high speed and has a high sensitivity. Accordingly, the input stage of the transformer impedance amplifier 301b has no protection circuit. In contrast, since a voltage is input to the limiting amplifier 301c, electrostatic protection is provided to the limiting amplifier 301c.

Accordingly, if light having an undesired intensity is input to the photodiode 301a, the transformer impedance amplifier 301b may be destroyed. In addition, if a voltage higher than the specification is applied to the photodiode 301a, the photodiode 301a may be damaged. Therefore, the power-on control and the power-off control illustrated in the flowcharts of FIGS. 7 and 8, respectively, are performed.

In the processing illustrated in FIGS. 7 and 8, when the power is turned on, the signal processing apparatus 3A is powered on first and, subsequently, the solid-state image pickup device 1A is powered on. In addition, in the signal processing apparatus 3A, the control system (e.g., the readout control unit 33A) is powered on first and, subsequently, the optical communication unit 30A is powered on. Furthermore, in the optical communication unit 30A, the light receiving unit 301 is powered on first and, subsequently, the light emitting unit 300 is powered on. Still furthermore, after the light modulation unit 120 of the solid-state image pickup device 1A is powered on, the light emitting unit 300 is powered on. In the light emitting unit 300, the drive circuit (not shown) is powered on first and, subsequently, the semiconductor laser is powered on. Yet still furthermore, in the solid-state image pickup device 1A, the controller 16A is powered on first and, subsequently, the drive unit of the optical communication unit 12A is powered on. Thereafter, the light modulation unit 120 is powered on. Subsequently, the functional blocks regarding an image capturing operation (e.g., the pixel unit 10A) are powered on.

In the processing illustrated in FIGS. 7 and 8, when the power is turned off, the solid-state image pickup device 1A is powered off first and, subsequently, the signal processing apparatus 3A is powered off. In addition, in the signal processing apparatus 3A, the optical communication unit 30A is powered off first and, subsequently, the readout control unit 33A is powered off. Furthermore, in the optical communication unit 30A, the light emitting unit 300 is powered off first and, subsequently, the light receiving unit 301 is powered off. Still furthermore, before the light modulation unit 120 of the solid-state image pickup device 1A is powered off, the light emitting unit 300 is powered off. In the light emitting unit 300, the semiconductor laser is powered off first and, subsequently, the drive circuit is powered off. Yet still furthermore, in the solid-state image pickup device 1A, the functional blocks regarding an image capturing operation (e.g., the pixel unit 10A) are powered off and, subsequently, the optical communication unit 12A is powered off. In the optical communication unit 12A, the light modulation unit 120 is powered off first and, subsequently, the drive unit is powered off. Subsequently, after the optical communication unit 12A is powered off, the controller 16A is powered off.

In this way, in the signal processing apparatus 3A, if the optical communication unit 30A is not in a controllable state, the power is not supplied to the optical communication unit 30A. In addition, if the light receiving unit 301 is not in a light receivable state, the light emitting unit 300 is not driven. Furthermore, if the light modulation unit 120 of the solid-state image pickup device 1A is not in a controllable state, the light emitting unit 300 is not driven.

Accordingly, in the optical communication unit 30A of the signal processing apparatus 3A, undesired current flow in the semiconductor laser occurring when only the semiconductor laser is powered on first can be prevented. Thus, damage of the semiconductor laser can be prevented. In addition, in the optical communication unit 30A of the signal processing apparatus 3A, damage of the amplifier caused by input of a light beam having an undesired intensity to the photodiode of the light receiving unit 301 can be prevented. Furthermore, damage of the photodiode caused by application of a voltage higher than that of the specification can be prevented.

Example of Solid-State Image Pickup Device of First Embodiment

Figure 11:
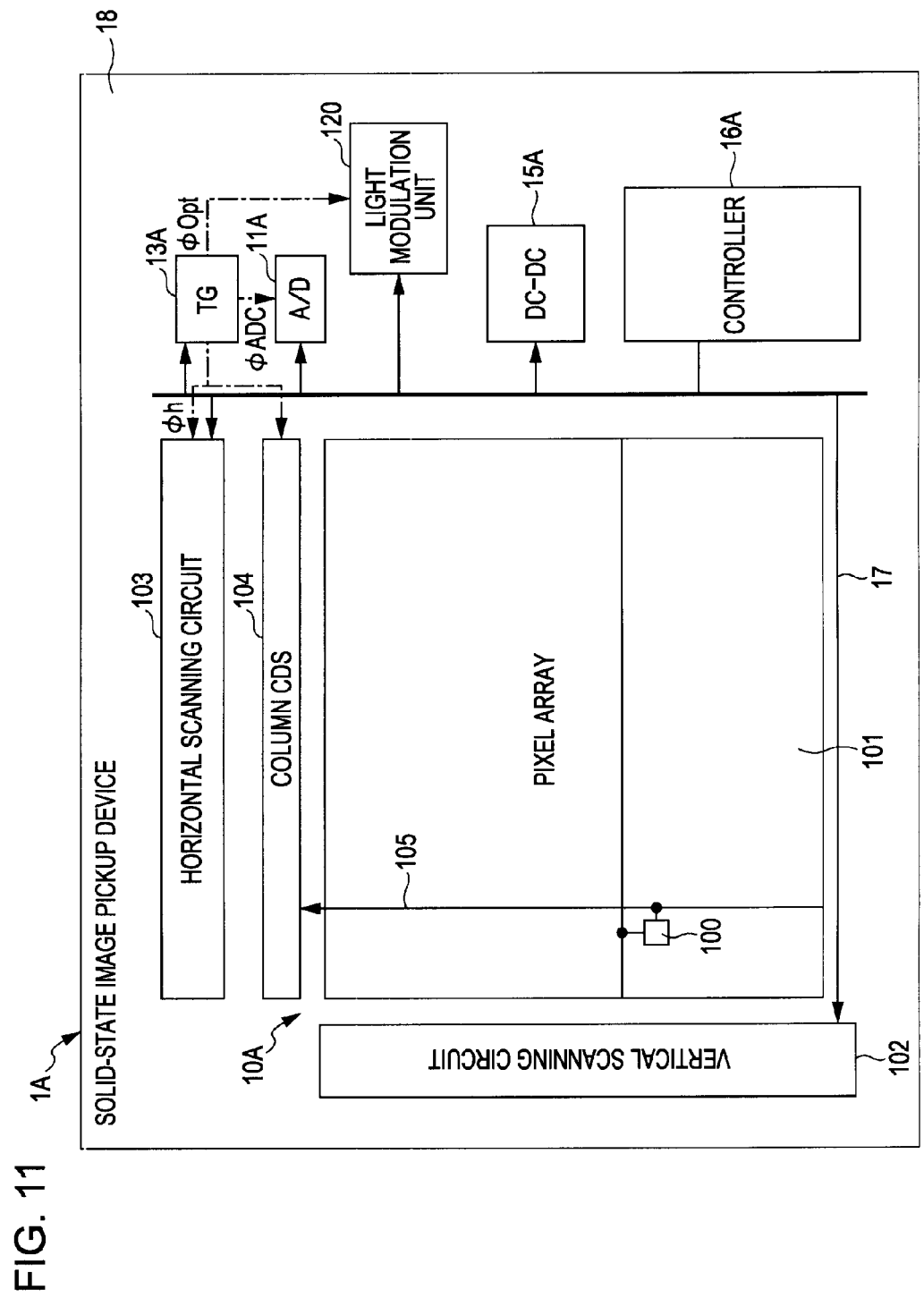
FIG. 11 is a functional block diagram illustrating an example of the solid-state image pickup device according to the first embodiment.

FIG. 11 is a functional block diagram illustrating an example of the solid-state image pickup device according to the first embodiment. In the following description, the solid-state image pickup device 1A is formed from a CMOS image sensor.

The pixel unit 10A of the solid-state image pickup device 1A serving as a CMOS image sensor includes a pixel array 101, a vertical scanning circuit 102, and a horizontal scanning circuit 103. The pixel array 101 includes two-dimensionally arranged pixels 100. The vertical scanning circuit 102 and the horizontal scanning circuit 103 selects, using an XY addressing method, one of the pixels 100 from which the pixel data is to be read out.

The vertical scanning circuit (a row decoder/driver) 102 selects one of the pixels 100 from which the pixel data is to be read out in a row direction of the pixel array 101. In addition, the vertical scanning circuit 102 generates a row selection pattern for each of the operation modes and selects, on the basis of the generated row selection patterns, the pixels 100 from which the pixel data is to be read out.

The horizontal scanning circuit (a column decoder/driver) 103 selects one of the pixels 100 from which the pixel data is to be read out in a column direction of the pixel array 101. In addition, the horizontal scanning circuit 103 generates a column selection pattern for each of the operation modes and selects, on the basis of the generated column selection patterns, the pixels 100 from which the pixel data is to be read out. Furthermore, the horizontal scanning circuit 103 performs computation, such as addition of pixel values in the horizontal direction, so as to convert the arrangement of signals output from the pixels 100 from a parallel format to a serial format.

The solid-state image pickup device 1A includes a column correlated double sampling (column CDS) circuit 104. The column CDS circuit 104 removes noise from pixel data. More specifically, the column CDS circuit 104 samples a reference (reset) level and a signal level contained in a signal, performs subtraction, and computes the difference between the two levels. The column CDS circuit 104 removes a variance in amplitudes for the pixels 100 using a CDS circuit connected to a column signal line 105 that outputs pixel data from the pixel array 101. The column CDS circuit 104 processes analog signals.

In the solid-state image pickup device 1A, the vertical scanning circuit 102 and the horizontal scanning circuit 103 of the pixel unit 10A are connected to the bus 17. In addition, the A/D converter 11A, the light modulation unit 120, the timing generator 13A, the DC-DC unit 15A, and the controller 16A are connected to the bus 17.

A drive clock φh generated by the timing generator 13A is supplied to the horizontal scanning circuit 103 and the column CDS circuit 104. In addition, a drive clock φADC is supplied to the A/D converter 11A. Furthermore, a drive clock φOpt is supplied to the light modulation unit 120.

In the solid-state image pickup device 1A, the pixel unit 10A, the A/D converter 11A, the light modulation unit 120, the timing generator 13A, the DC-DC unit 15A, and the controller 16A are integrated on a substrate 18. The substrate 18 is formed of, for example, silicon. These components are integrated using a semiconductor fabrication process into a one-chip IC. Thus, the solid-state image pickup device 1A is formed. In addition, in the solid-state image pickup device 1A, electrodes (not shown) are formed on an upper surface or a lower surface of the substrate 18. The electrodes are connected to the control I/O 14A illustrated in FIG. 1.

Figure 12:
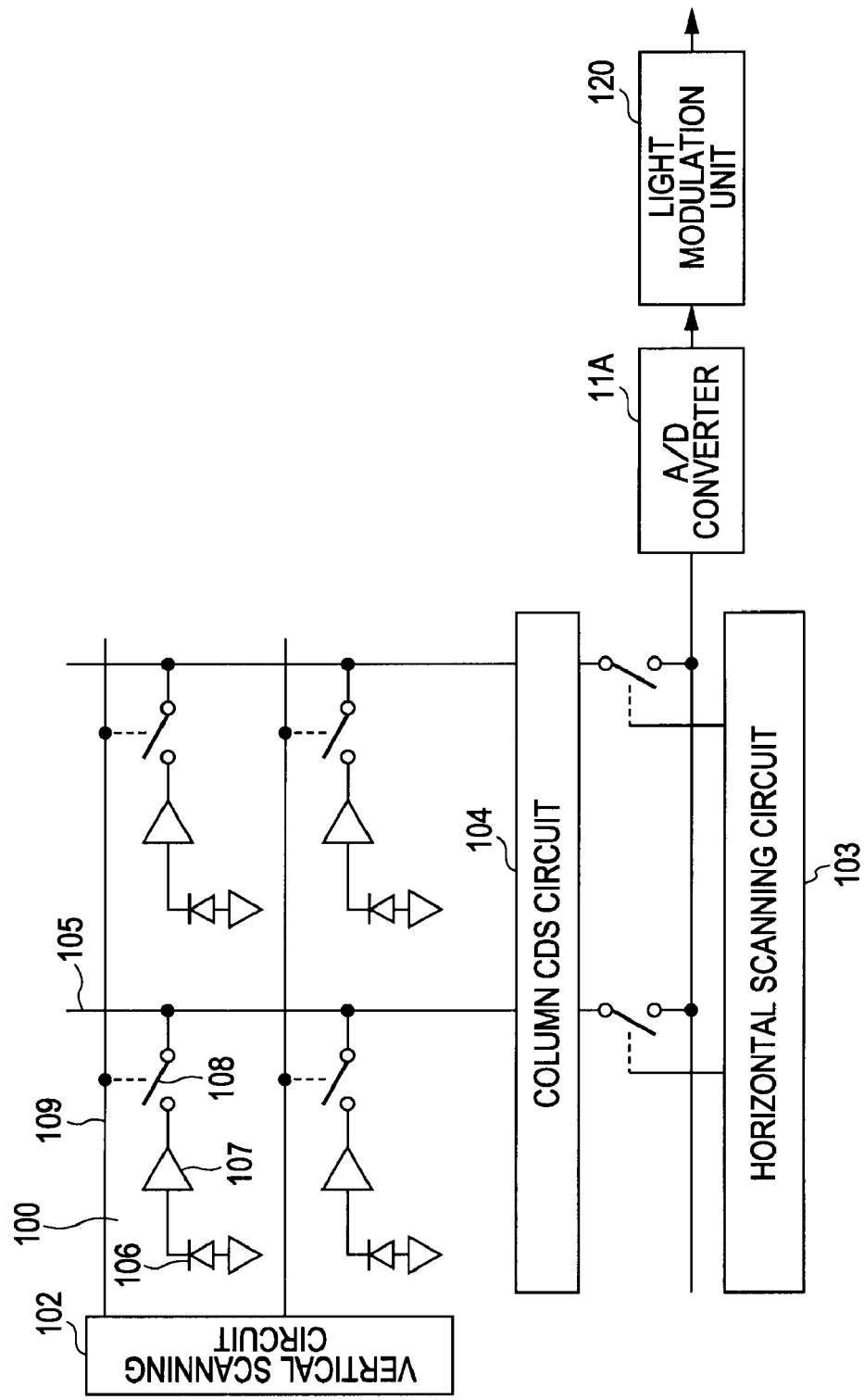
FIG. 12 is a circuit configuration diagram of an exemplary pixel array.
Figure 13:
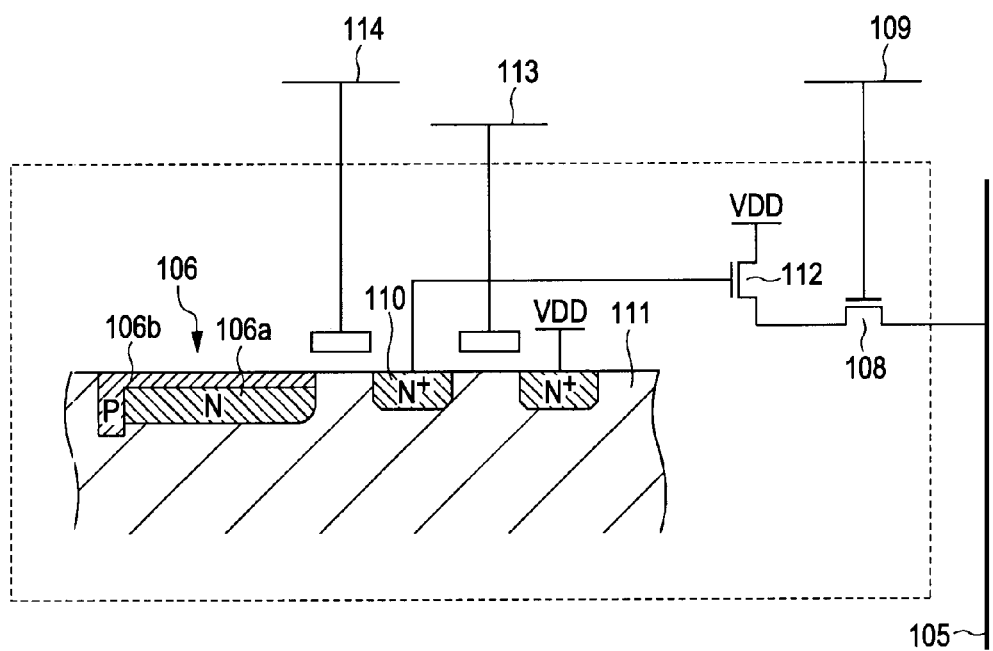
FIG. 13 is a cross-sectional structure diagram illustrating an exemplary structure model of each pixel.

FIGS. 12 and 13 illustrate an exemplary structure of each of the pixels and an exemplary structure for reading a pixel signal. More specifically, FIG. 12 is a circuit configuration diagram of an exemplary pixel array. FIG. 13 is a cross-sectional structure diagram illustrating an exemplary structure model of each of the pixels. Each of the pixels 100 includes a photodiode (PD) 106 that converts light into electricity (signal electrical charge), an FD amplifier 107 that amplifies an electrical signal, and a row selection transistor (Tr) 108 serving as a row selection switch. In each of the pixels 100, the row selection transistor 108 is turned on or off by the vertical scanning circuit 102 using a row selection line 109. Thus, an electric signal amplified by the FD amplifier 107 is output to the column signal line 105.

The FD amplifier 107 includes an electrical charge detection unit (FD) 110, a reset transistor 111, and an amplifying transistor 112. The FD amplifier 107 amplifies a photoelectrically converted electrical charge during an accumulation period.

That is, upon completion of an accumulation period, the electrical charge detection unit 110 of the FD amplifier 107 is reset using a reset line 113 that forms a reset gate (Rst) before a signal is output. Since the voltage of the electrical charge detection unit 110 that is reset is connected to a gate of the amplifying transistor 112, a reset level indicating a non-signal state is output from a source of the amplifying transistor 112 to the column signal line 105.

Soon after that, the signal charge is read from a photodiode 106 to the electrical charge detection unit 110 using a row readout line 114 that forms a readout gate (Rd). When the transfer is completed and the row readout line 114 is closed, the voltage of the electrical charge detection unit 110 is changed by a value corresponding to the intensity of light made incident on the photodiode 106. Accordingly, a signal level representing a signal state is output from the amplifying transistor 112 to the column signal line 105.

Note that the photodiode 106 shown in FIG. 13 has a structure called a buried photodiode structure in which a P-layer region 106b is formed on a surface of an N-layer region 106a. The P-layer region 106b prevents the occurrence of a dark current. Accordingly, fixed pattern noise (FPN) caused by dark current is reduced.

Exemplary Signal Processing System of First Embodiment

Figure 14:
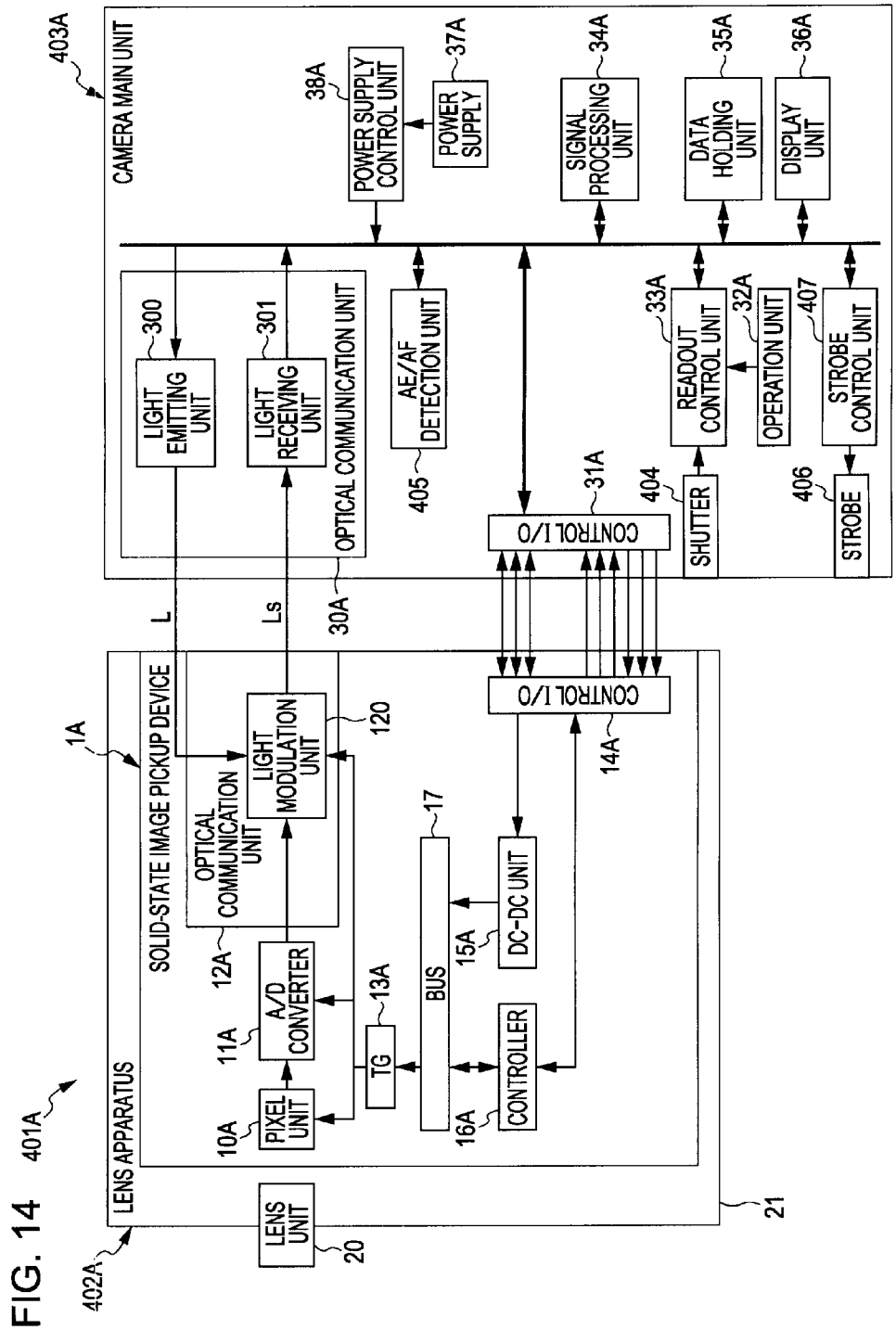
FIG. 14 is a functional block diagram illustrating an example of the signal processing system according to the first embodiment.

FIG. 14 is a functional block diagram illustrating an example of the signal processing system according to the first embodiment. A camera system 401A is configured as the signal processing system 4A that uses a CMOS image sensor as the solid-state image pickup device 1A.

The camera system 401A includes a lens apparatus 402A serving as the optical apparatus 2A illustrated in FIG. 2. The camera system 401A further includes a camera main unit 403A serving as the signal processing apparatus 3A. The camera main unit 403A includes the configuration illustrated in FIG. 2. The camera main unit 403A further includes a shutter 404, an AE/AF detection unit 405 that performs a metering operation and a ranging operation, a strobe 406 that emits assistance light, and a strobe control unit 407. In the camera system 401A, the signal processing unit 34A of the camera main unit 403A performs demosaic processing and camera signal processing.

Pixel Signal Readout Operation of Camera System

An exemplary pixel signal readout operation performed by the camera system 401A is described next with reference to the accompanying drawings.

The following steps of the pixel signal readout operation are performed:

(1) An image of light made incident on the lens apparatus 402A is formed by the lens unit 20 and is made incident on the pixel unit 10A of the solid-state image pickup device 1A.

(2) When the light is made incident on the pixels 100 of the pixel unit 10A, a photoelectric conversion is performed, and accumulation of electrical charge is started.

(3) Accumulation time is controlled in accordance with exposure time controlled by an electronic shutter or a mechanical shutter.

(4) The row selection line 109 that reads out a signal using the vertical scanning circuit 102 is selected.

(5) A reset level is read by resetting the electrical charge detection unit 110 using the reset line 113. The readout reset level is amplified by the FD amplifier 107.

(6) The reset level is held by the column CDS circuit 104.

(7) The signal charge is read from the photodiode 106 into the electrical charge detection unit 110 using the row readout line 114. The readout signal charge is amplified by the FD amplifier 107.

(8) A signal level is held by the column CDS circuit 104.

(9) The reset level is subtracted from the signal level in the column CDS circuit 104.

(10) By sequentially selecting a column using the horizontal scanning circuit 103, a pixel signal is acquired from the column CDS circuit 104 for each of the columns.

(11) The acquired pixel signal is A/D-converted by the A/D converter 11A and is transferred to the optical communication unit 12A of the solid-state image pickup device 1A.

(12) In the optical communication unit 12A of the solid-state image pickup device 1A, the light beam L input from the camera main unit 403A to the light modulation unit 120 is modulated in accordance with the digital signal input from the A/D converter 11A, and the signal light beam Ls is output.

By sequentially performing the above-described steps (4) to (12) for each of the rows using the vertical scanning circuit 102, an image (a still image) can be obtained from the image of light made incident on the solid-state image pickup device 1A.

Examples of Operation Mode of Camera System

Figure 15:
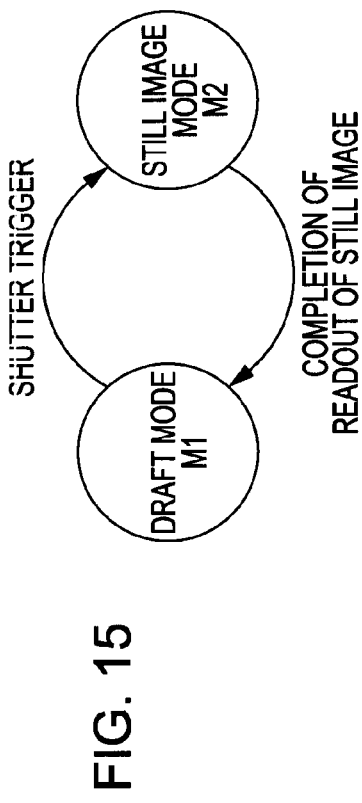
FIG. 15 is a state transition diagram illustrating an example of the operation mode of a camera system.

FIG. 15 is a state transition diagram illustrating an example of the operation mode of the camera system. Examples of the operation modes include a draft mode and a still image mode (described in more detail below). In addition, examples of the operation modes include pixel computation mode in which computation is performed on several neighboring pixels. In the pixel computation mode, derivation and integration can be performed. In addition, the pixel computation mode can be used for feature extraction, counting, and measuring. Examples of the operation modes further include a pixel addition mode used in place of dumped pixel selection, a frame addition mode, and a recognition mode in which recognition parameters of, for example, face recognition are computed. Hereinafter, the operation modes of the camera system 401A are described with reference to the draft mode and the still image mode. The camera system 401A has a draft mode M1 in which a low-resolution moving image is output and a still image mode M2 in which a high-resolution still image is output. When an operation for finding a good composition before taking a picture is performed, the camera system 401A enters the draft mode M1. When triggered by a shutter press, the camera system 401A enters the still image mode M2. Thus, transition from the draft mode M1 to the still image mode M2 occurs. An image is captured in the still image mode M2. After the capture still image is acquired, the camera system 401A enters the draft mode M1. Thus, transition from the still image mode M2 to the draft mode M1 occurs.

Example of Operation in Draft Mode

Figure 16:
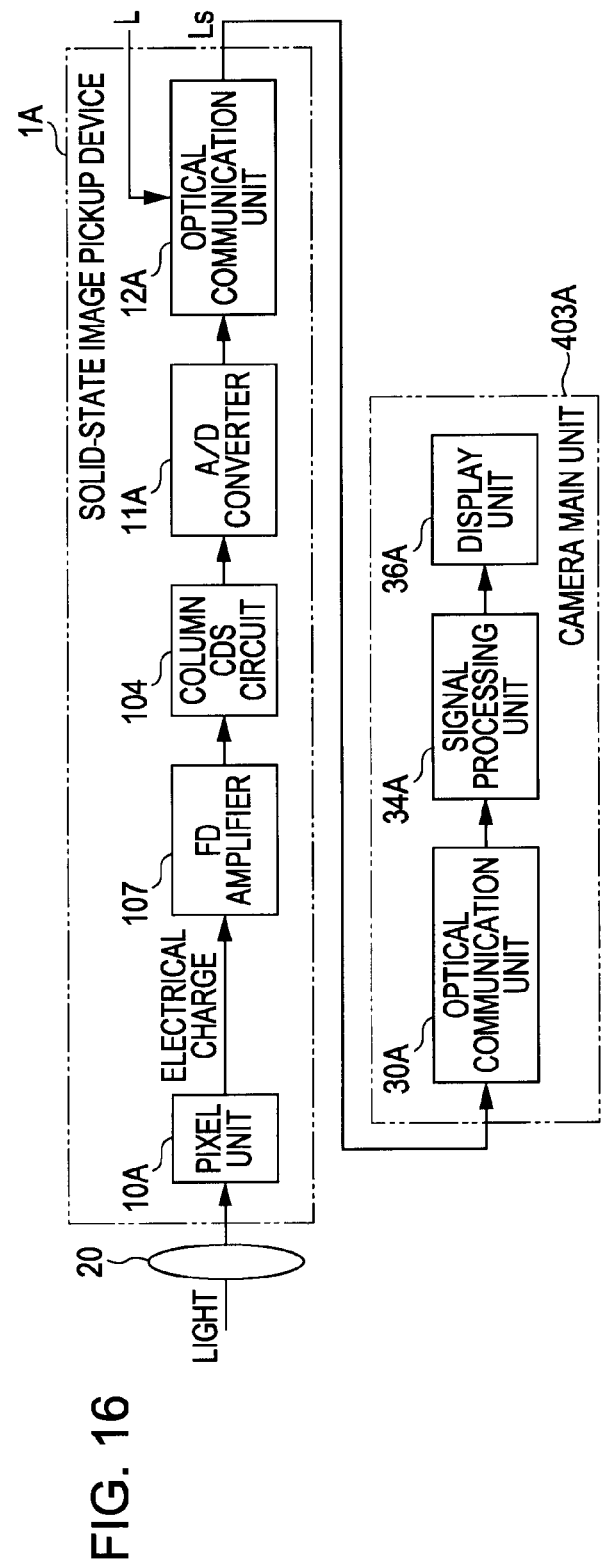
FIG. 16 is a data flow diagram illustrating data flow in a draft mode.
Figure 17:
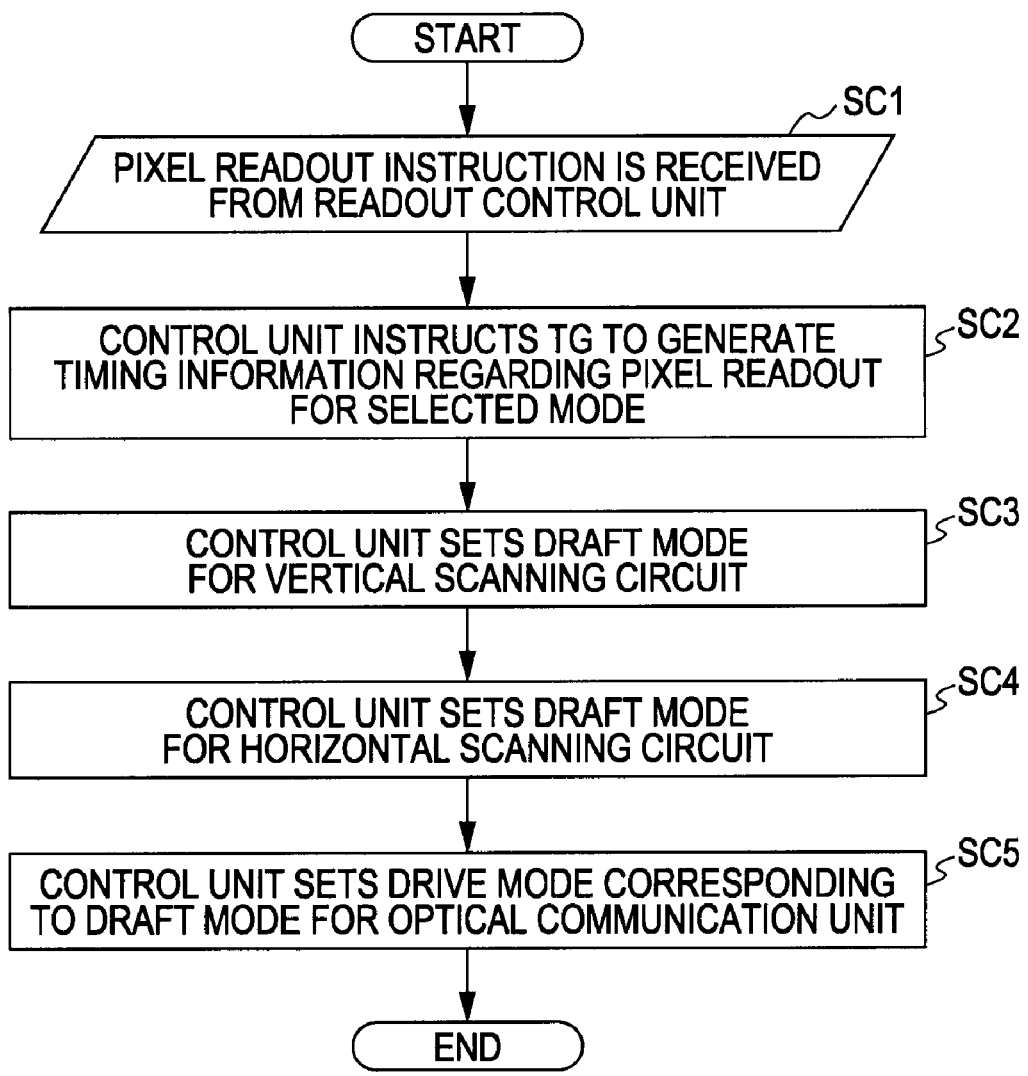
FIG. 17 is a flowchart illustrating exemplary processing performed by the solid-state image pickup device in the draft mode.

FIG. 16 is a data flow diagram illustrating data flow in the draft mode. FIG. 17 is a flowchart illustrating exemplary processing performed by the solid-state image pickup device in the draft mode. The draft mode is described in detail next.

Data flow in the draft mode is described first. The camera system 401A selects a predetermined pixel from among all of the pixels and starts readout of the pixel data. The pixel unit 10A of the solid-state image pickup device 1A performs photoelectric conversion on an image of light made incident through the lens unit 20. Signal charge read from the selected pixel is amplified by the FD amplifier 107. Noise in the signal charge is removed by the column CDS circuit 104. The pixel data read from the pixel unit 10A is A/D-converted by the A/D converter 11A. The light beam L input from the light emitting unit 300 of the camera main unit 403A to the light modulation unit 120 of the solid-state image pickup device 1A is modulated using the digital signal output from the A/D converter 11A. Thus, the signal light beam Ls generated in accordance with the pixel data is output.

Optical data communication is performed between the solid-state image pickup device 1A and the camera main unit 403A through the optical communication unit 12A and the optical communication unit 30A. The signal light beam Ls modulated by the light modulation unit 120 of the solid-state image pickup device 1A is input to the light receiving unit 301 of the camera main unit 403A.

A light signal of the pixel data input to the light receiving unit 301 of the camera main unit 403A is converted into an electrical signal. Thereafter, the signal processing unit 34A performs demosaic processing and camera signal processing on the electrical signal. Subsequently, an image based on the electrical signal is displayed on the display unit 36A.

Exemplary processing performed by the solid-state image pickup device 1A in the draft mode is described next. In step SC1 shown in FIG. 17, the solid-state image pickup device 1A receives, from the readout control unit 33A of the camera main unit 403A, an instruction to read a pixel value in draft mode.

In step SC2 shown in FIG. 17, the controller 16A of the solid-state image pickup device 1A instructs the timing generator 13A to generate timing information regarding pixel readout for the selected mode. In step SC3 shown in FIG. 17, the controller 16A sets the operation mode of the vertical scanning circuit 102 to a draft mode. In step SC4 shown in FIG. 17, the controller 16A sets the operation mode of the horizontal scanning circuit 103 to a draft mode.

In steps SC3 and SC4, setting, such as dump of pixels and addition of pixels, is performed. The vertical scanning circuit 102 generates a selection pattern of the rows from which pixel data are read in the draft mode. Thus, the pixels from which the pixel data are read are selected using the generated selection pattern. The horizontal scanning circuit 103 generates a selection pattern of the columns from which pixel data are read in the draft mode. Thus, the pixels from which the pixel data are read are selected using the generated selection pattern.

In step SC5 shown in FIG. 17, the controller 16A sets a drive method of the optical communication unit 12A to a drive method corresponding to the draft mode. In the solid-state image pickup device 1A, if the draft mode is set, the total number of pixels from which pixel data are read is significantly changed. Accordingly, during horizontal scanning, the bit rate of output data is sequentially changed. Therefore, drive setting of the light modulation unit 120 is performed in accordance with the sequentially changed bit rate.

Example of Operation in Still Image Mode

Figure 18:
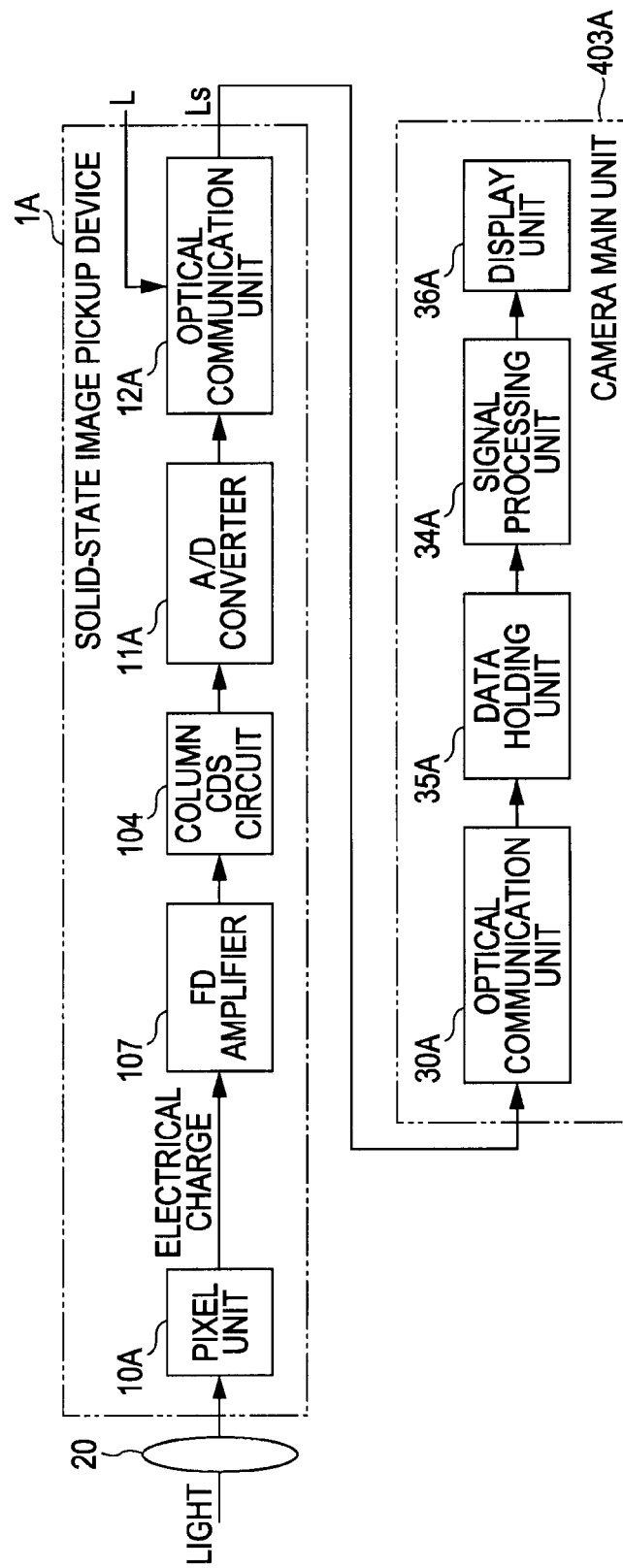
FIG. 18 is a data flow diagram illustrating data flow in a still image mode.
Figure 19:
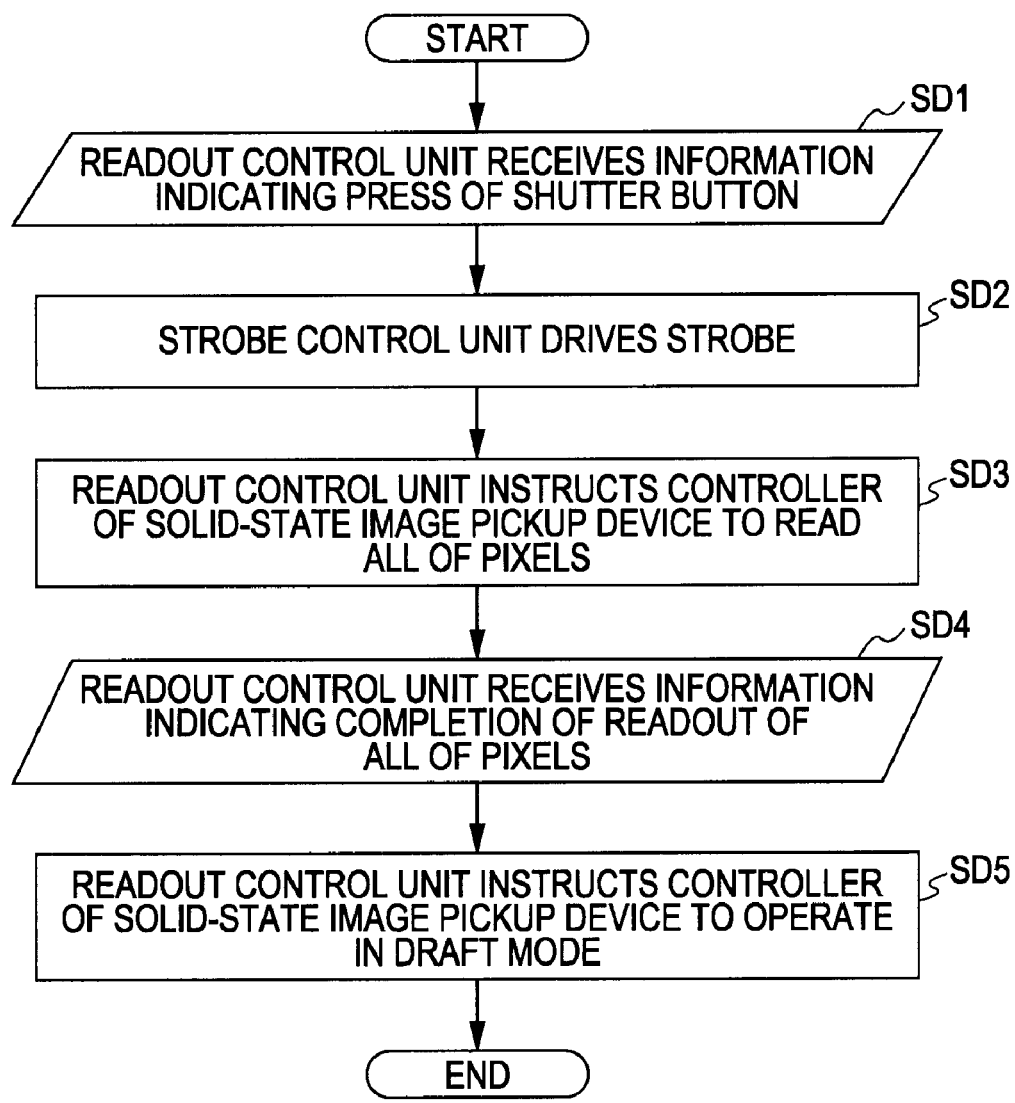
FIG. 19 is a flowchart illustrating exemplary processing performed by a camera main unit in the still image mode.
Figure 20:
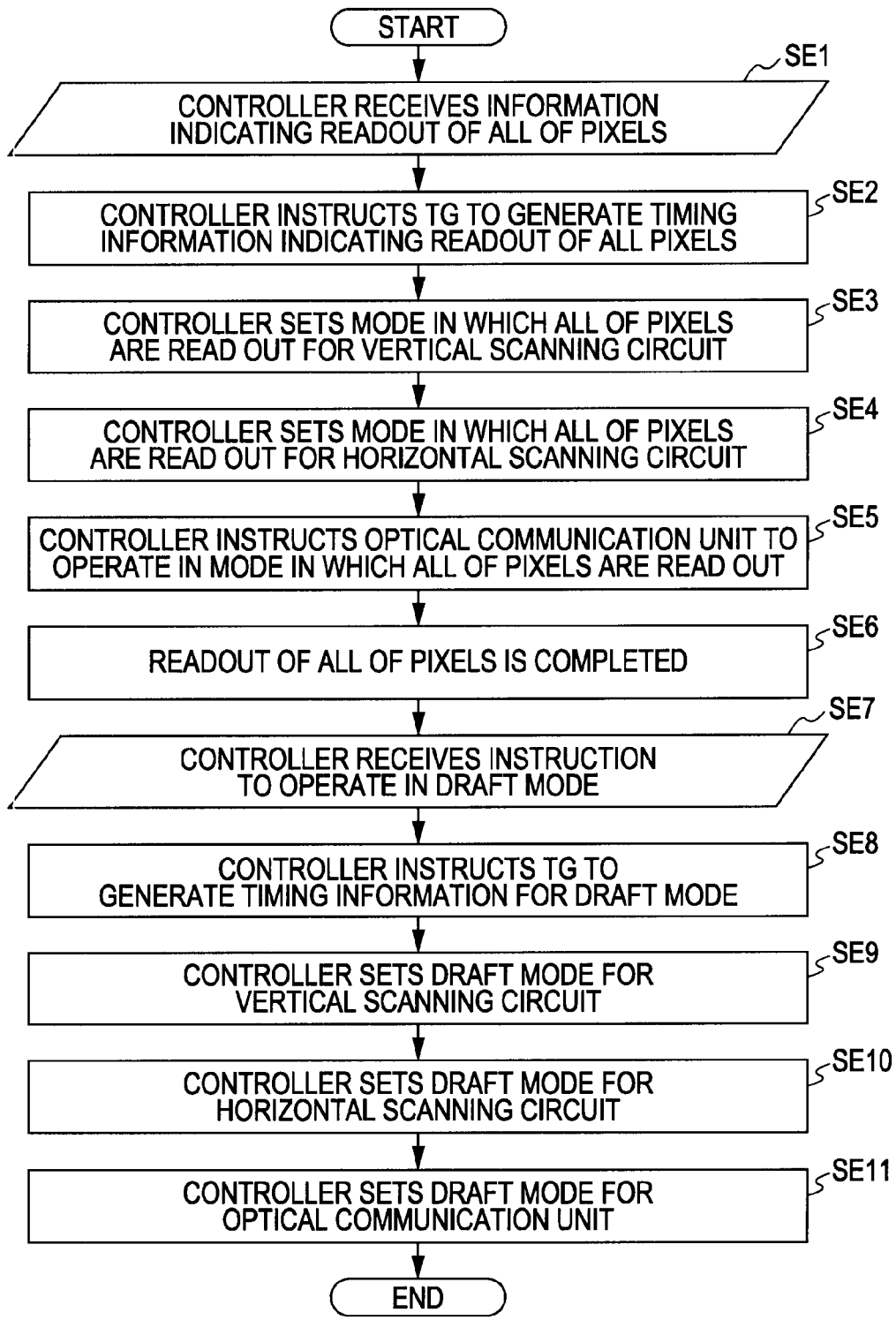
FIG. 20 is a flowchart illustrating exemplary processing performed by the solid-state image pickup device in the still image mode.

FIG. 18 is a data flow diagram illustrating data flow in the still image mode. FIG. 19 is a flowchart illustrating exemplary processing performed by the camera main unit in the still image mode. FIG. 20 is a flowchart illustrating exemplary processing performed by the solid-state image pickup device in the still image mode. The still image mode is described in detail next.

Data flow in the still image mode is described first. The camera system 401A selects all of the pixels in a predetermined order and instructs the pixel unit 10A to read the pixel data. The pixel unit 10A of the solid-state image pickup device 1A photoelectrically converts the image of light made incident from the lens unit 20. Signal charge read from the selected pixel is amplified by the FD amplifier 107. Noise in the signal charge is removed by the column CDS circuit 104. The pixel data read from the pixel unit 10A is A/D-converted by the A/D converter 11A. The light beam L input from the light emitting unit 300 of the camera main unit 403A to the light modulation unit 120 of the solid-state image pickup device 1A is modulated using the digital signal output from the A/D converter 11A. Thus, the signal light beam Ls generated in accordance with the pixel data is output.

The signal light beam Ls modulated by the light modulation unit 120 of the solid-state image pickup device 1A is input to the optical communication unit 30A of the camera main unit 403A. The signal light beam Ls is then converted into an electrical signal by the light receiving unit 301 and is held by a data holding unit 35. Pixel data held by the data holding unit 35 for one screen is subjected to demosaic processing and camera signal processing in the signal processing unit 34A. Thereafter, an image based on the pixel data is displayed on the display unit 36A.

Exemplary processing performed by the camera main unit 403A in the still image mode is described next. In step SD1 shown in FIG. 19, the readout control unit 33A of the camera main unit 403A receives information indicating that the shutter 404 is pressed. At that time, while the shutter 404 is pressed halfway down, the AE/AF detection unit 405 performs metering and ranging so that setting of camera parameters and control are performed. Thereafter, in accordance with shutter timing, exposure is controlled, and readout of all of the pixel data is started.

In step SD2 shown in FIG. 19, the strobe control unit 407 of the camera main unit 403A drives the strobe 406 on the basis of the metering result. Note that if a mode in which emission of light from the strobe 406 is inhibited is set, the processing in step SD2 is not performed.

In step SD3 shown in FIG. 19, the readout control unit 33A of the camera main unit 403A instructs the controller 16A of the solid-state image pickup device 1A to enter the still image mode and read all of the pixels. In step SD4 shown in FIG. 19, the readout control unit 33A of the camera main unit 403A receives, from the controller 16A of the solid-state image pickup device 1A, information indicating completion of readout of all of the pixels. Upon receiving, from the solid-state image pickup device 1A, the information indicating completion of readout of all of the pixels, the readout control unit 33A of the camera main unit 403A instructs the controller 16A of the solid-state image pickup device 1A to enter a draft mode in step SD5 shown in FIG. 19.

Exemplary processing performed by the solid-state image pickup device 1A in the still image mode is described next. In step SE1 shown in FIG. 20, the solid-state image pickup device 1A receives an instruction to read all of the pixels in the still image mode. The instruction was sent from the readout control unit 33A of the camera main unit 403A in step SD3 shown in FIG. 19.

In step SE2 shown in FIG. 20, the controller 16A of the solid-state image pickup device 1A informs the timing generator 13A of timing at which all of the pixels are to be read. In step SE3 shown in FIG. 20, the controller 16A changes the setting of the vertical scanning circuit 102 so that the vertical scanning circuit 102 reads all of the pixels. In addition, in step SE4 shown in FIG. 20, the controller 16A changes the setting of the horizontal scanning circuit 103 so that the horizontal scanning circuit 103 reads all of the pixels.

In step SE5 shown in FIG. 20, the controller 16A changes the setting of the optical communication unit 12A so that the optical communication unit 12A operates to read all of the pixels. In this way, in the solid-state image pickup device 1A, pixel data is read from each of the pixels of the pixel unit 10A in a predetermined order. In step SE6 shown in FIG. 20, readout of all of the pixels is completed.

If the solid-state image pickup device 1A completes readout of all of the pixels, information indicating completion of readout of all of the pixels is sent to the readout control unit 33A of the camera main unit 403A in step SD4 shown in FIG. 19. Thus, in step SD5 shown in FIG. 19, the readout control unit 33A instructs the controller 16A to enter a draft mode.

In step SE7 shown in FIG. 20, the solid-state image pickup device 1A receives an instruction to read the pixels in the draft mode. The instruction was sent from the readout control unit 33A of the camera main unit 403A in step SD5 shown in FIG. 19.

In step SE8 shown in FIG. 20, the controller 16A of the solid-state image pickup device 1A informs the timing generator 13A of timing at which the pixels are to be read. In step SE9 shown in FIG. 20, the controller 16A changes the setting of the vertical scanning circuit 102 so that the vertical scanning circuit 102 operates in the draft mode. In addition, in step SE10 shown in FIG. 20, the controller 16A changes the setting of the horizontal scanning circuit 103 so that the horizontal scanning circuit 103 operates in the draft mode. Furthermore, in step SE11 shown in FIG. 20, the controller 16A changes the setting of the optical communication unit 12A so that the optical communication unit 12A operates in the draft mode.

Example of Signals in Two Operation Modes

FIGS. 21A to 21D are timing diagrams of the signals in the draft mode and the still image mode. FIGS. 22A to 22E are timing diagrams of the signals in the draft mode. FIGS. 23A to 23E are timing diagrams of the signals in the still image mode.

In the draft mode M1, the controller 16A instructs the timing generator 13A to operate in a draft mode. In this way, the timing generator 13A generates a vertical synchronization signal shown in FIG. 21A and a horizontal signal shown in FIG. 21B. In addition, the controller 16A changes the setting of the vertical scanning circuit 102 and the horizontal scanning circuit 103 to the draft mode. Thus, pixels from which signals are to be read in the order indicated by the pixel numbers shown in FIG. 21C are selected.

Figure 21:
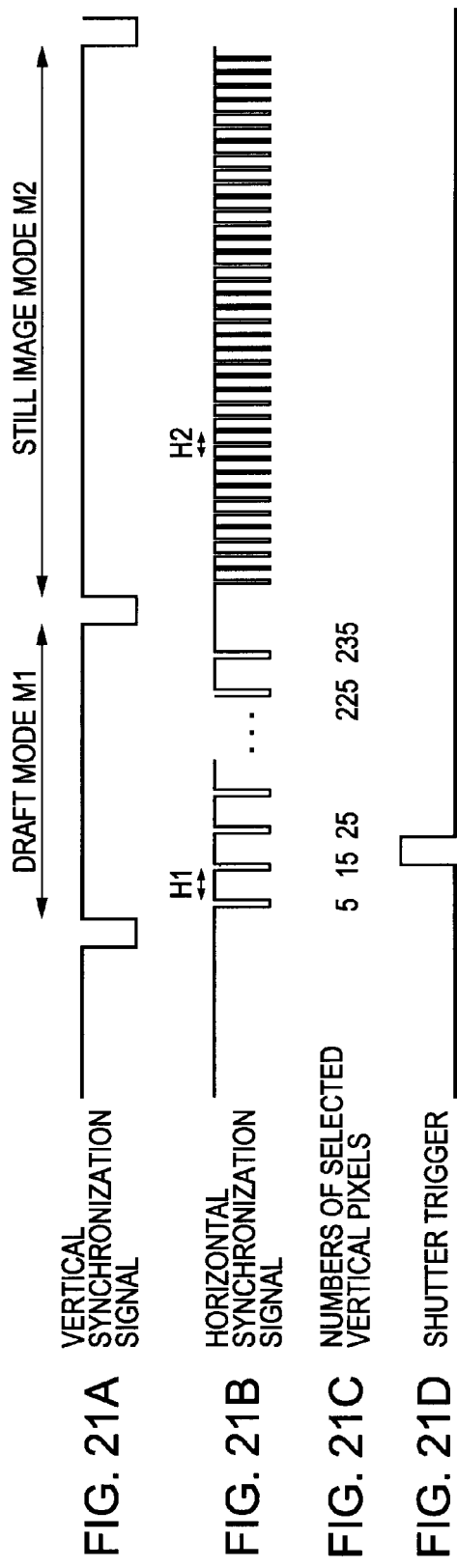
FIGS. 21A to 21D are timing diagrams of the signals in the draft mode and the still image mode.

When a shutter trigger shown in FIG. 21D is input, metering and ranging operations are performed. When readout of the pixels for one screen in the draft mode M1 is completed, the operation in the still image mode M2 is performed. In the still image mode M2, the controller 16A instructs the timing generator 13A to operate in a mode in which all of the pixels are read. Thus, the timing generator 13A generates a vertical synchronization signal shown in FIG. 21A and a horizontal signal shown in FIG. 21B. In addition, the controller 16A changes the setting of the vertical scanning circuit 102 and the horizontal scanning circuit 103 to a mode in which all of the pixels are read.

Figure 22:
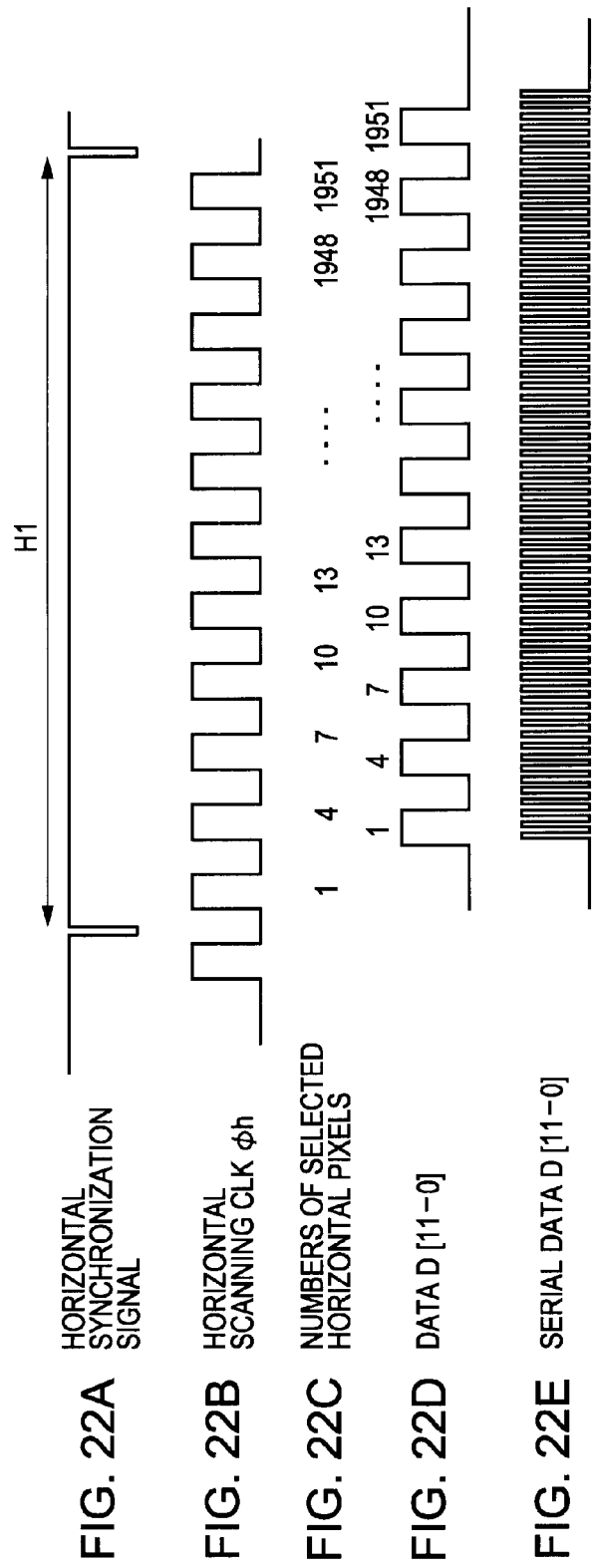
FIGS. 22A to 22E are timing diagrams of the signals in the draft mode.
Figure 23:
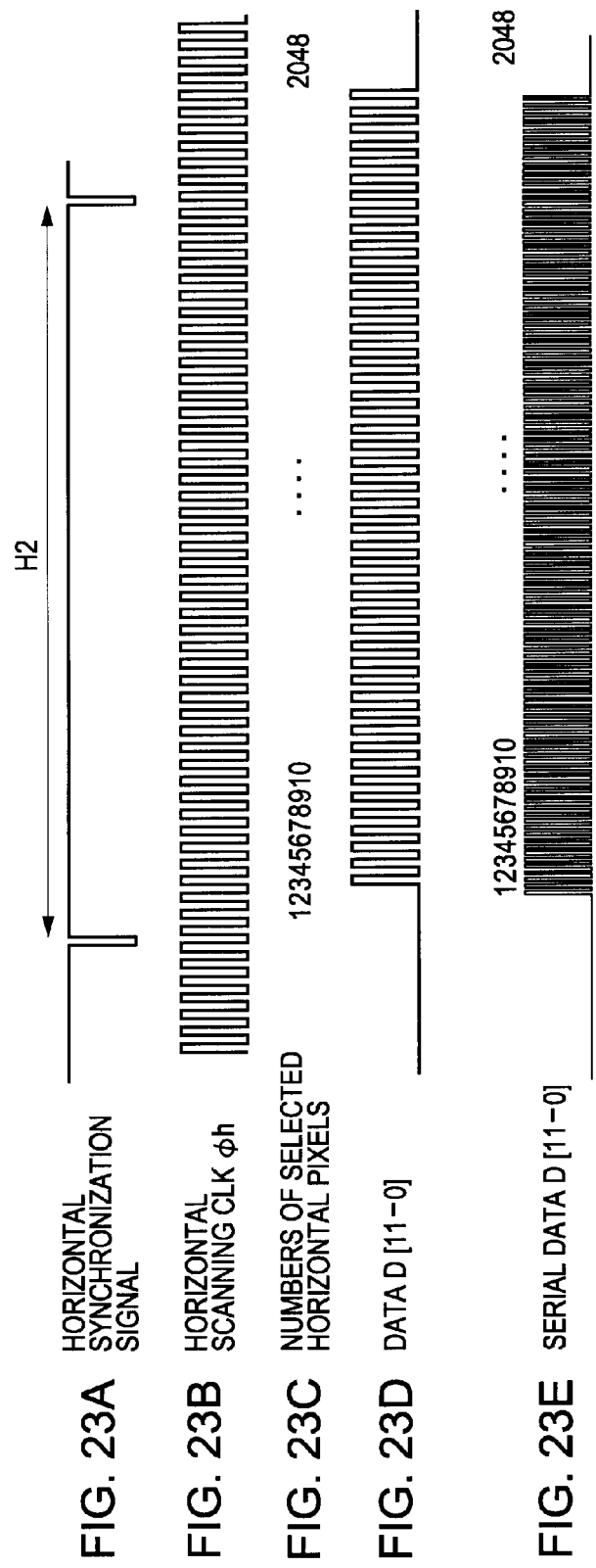
FIGS. 23A to 23E are timing diagrams of the signals in the still image mode.

In the draft mode M1, during a horizontal scanning period H1, a horizontal scanning clock φh shown in FIG. 23B is generated for a horizontal scanning signal shown in FIG. 22A. The horizontal scanning clock φh serves as a drive clock. In addition, pixels from which signals are to be read in the order indicated by the numbers shown in FIG. 22C are selected. In this way, data D shown in FIG. 22D is read out, and serial data shown in FIG. 22E can be obtained.

In the still image mode M2, during a horizontal scanning period H2, a horizontal scanning clock φh shown in FIG. 23B is generated for a horizontal scanning signal shown in FIG. 23A. The horizontal scanning clock φh serves as a drive clock. In addition, pixels from which signals are to be read in the order indicated by the numbers shown in FIG. 23C are selected. In this way, data D shown in FIG. 23D is read out, and serial data shown in FIG. 23E can be obtained. Serialization of data is described in more detail below.

Exemplary Method for Ensuring Synchronization Timing of Pixel Data Readout

A method for ensuring synchronization timing of readout of pixel data for use in electrical operation units, such as an optical communication unit, a pixel unit, and an A/D converter, is described next.

As shown in FIG. 11, in the solid-state image pickup device 1A, the clock generated by the timing generator 13A is supplied to the pixel unit 10A, the A/D converter 11A, and the optical communication unit 12A in accordance with the operation mode. The pixel unit 10A, the A/D converter 11A, and the optical communication unit 12A synchronize the input and output operations of signals thereof with one another using the drive clock supplied from the timing generator 13A.

Figure 24:
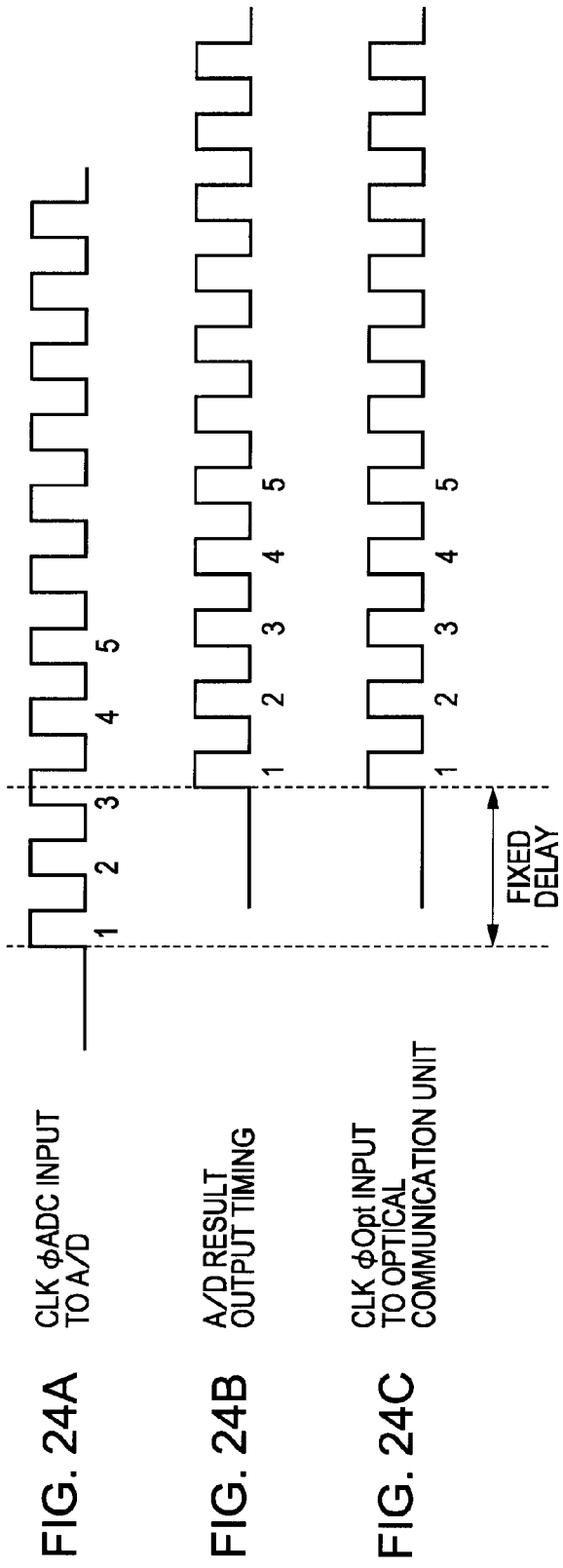
FIGS. 24A to 24C are timing diagrams illustrating a first method for ensuring synchronization timing of readout of pixel data.

FIGS. 24A to 24C are timing diagrams illustrating a first method for ensuring synchronization timing of readout of pixel data. In the first method for ensuring synchronization timing of readout of pixel data, the light modulation unit 120 of the optical communication unit 12A is driven when the A/D converter 11A performs an output operation.

As shown in FIG. 24B, a signal output from the A/D converter 11A lags behind the drive clock φADC (see FIG. 24A) input to the A/D converter 11A. Since the delay of processing performed by the A/D converter 11A is determined by the circuit configuration, the delay is fixed. Accordingly, as shown in FIG. 24C, the timing generator 13A generates the drive clock φOpt being phase shifted by the fixed delay for the A/D converter 11A. Thereafter, the timing generator 13A supplies the drive clock φOpt to the optical communication unit 12A.

Figure 25:
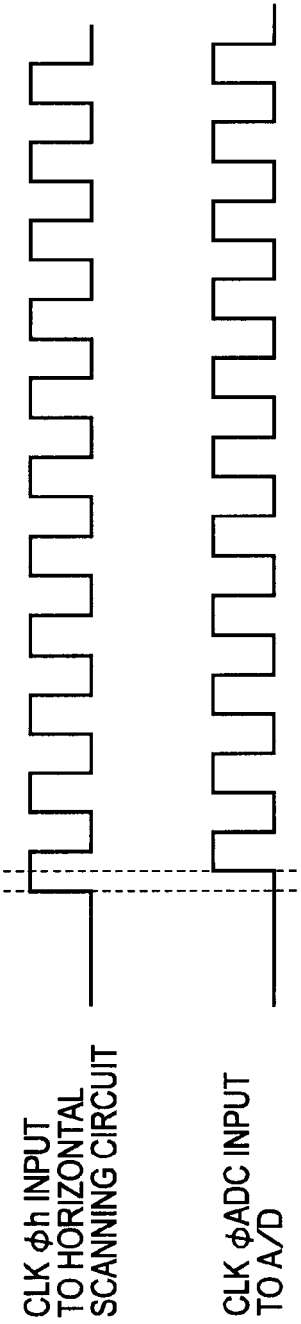
FIGS. 25A and 25B are timing diagrams illustrating a second method for ensuring synchronization timing of readout of pixel data.

FIGS. 25A and 25B are timing diagrams illustrating a second method for ensuring synchronization timing of readout of pixel data. In the second method for ensuring synchronization timing of readout of pixel data, the A/D converter 11A latches the input signal when the horizontal scanning circuit 103 performs horizontal scanning and outputs data.

A signal output from the horizontal scanning circuit 103 lags behind the drive clock φh (see FIG. 25A) input to the horizontal scanning circuit 103. Accordingly, as shown in FIG. 25B, the timing generator 13A generates the drive clock φADC having a timing the same as the timing at which the value of a column of the horizontal scanning circuit 103 is output. Thereafter, the timing generator 13A supplies the drive clock φADC to the A/D converter 11A.

Figure 26:
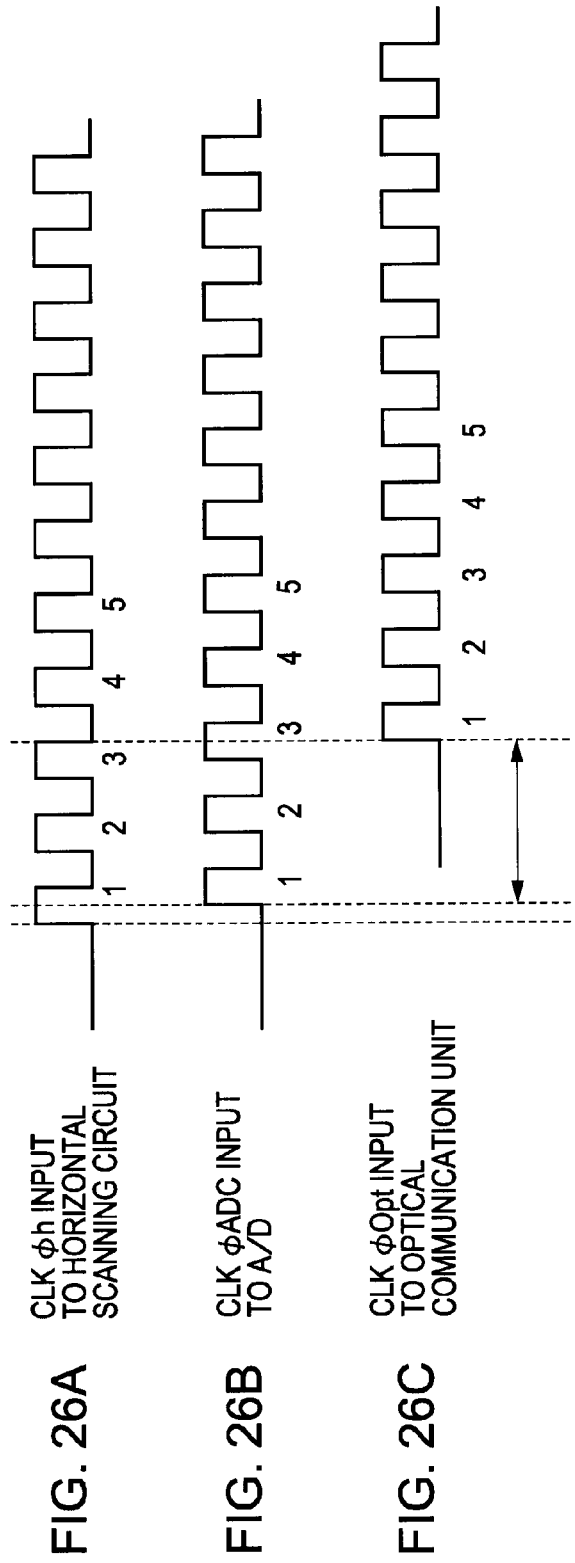
FIGS. 26A to 26C are timing diagrams illustrating a third method for ensuring synchronization timing of readout of pixel data.

FIGS. 26A to 26C are timing diagrams illustrating a third method for ensuring synchronization timing of readout of pixel data. In the third method for ensuring synchronization timing of readout of pixel data, the first method is combined with the second method so as to obtain an optimum method.

When, as shown in FIG. 26A, the drive clock φh is input to the horizontal scanning circuit 103, the timing generator 13A generates the drive clock φADC having a timing the same as the timing at which the horizontal scanning circuit 103 performs an output operation, as shown in FIG. 26B. Thereafter, the timing generator 13A supplies the drive clock φADC to the A/D converter 11A. In addition, as shown in FIG. 26C, the timing generator 13A generates the drive clock φOpt being phase shifted from the drive clock φADC input to the A/D converter 11A by the fixed delay of the A/D converter 11A. Thereafter, the timing generator 13A supplies the drive clock φOpt to the optical communication unit 12A.

In the third method for ensuring synchronization timing of readout of pixel data, since the drive clock φOpt that is supplied to the optical communication unit 12A and that reflects the delays of processing performed by the pixel unit 10A and the A/D converter 11A is generated, the synchronization timing in high-speed modulation in optical communication can be reliably ensured.

Figure 27:
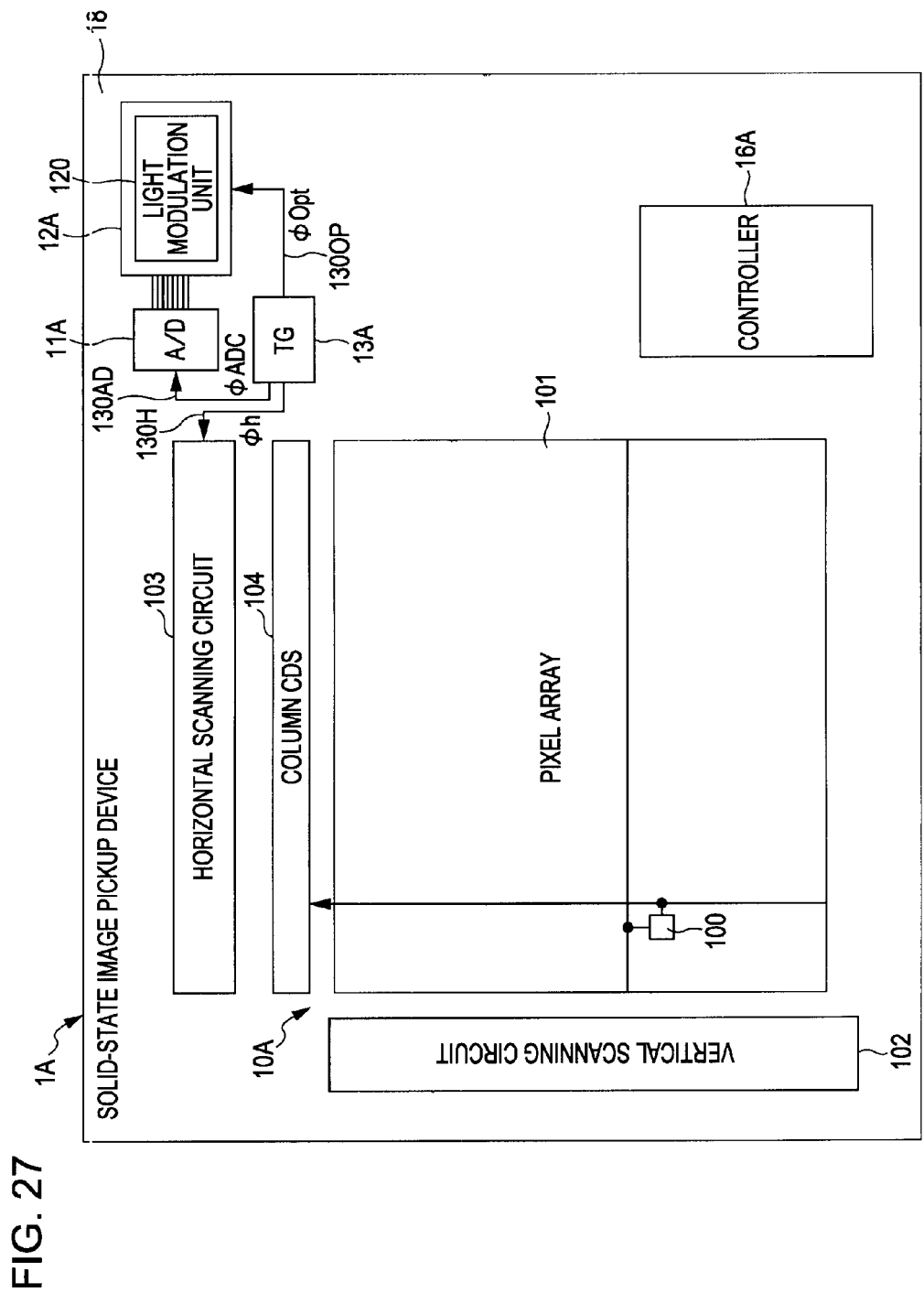
FIG. 27 is a functional block diagram illustrating an exemplary configuration of a solid-state image pickup device in which synchronization timing of readout of pixel data is ensured.

Exemplary Configuration for Ensuring Synchronization Timing of Readout of Pixel Data FIG. 27 is a functional block diagram illustrating an exemplary configuration of a solid-state image pickup device in which synchronization timing of readout of pixel data is ensured. By using the interconnection lines of the same length, the drive clocks generated using the above-described methods illustrated in FIGS. 24 to 26C can be supplied to the functional blocks (i.e., the pixel unit 10A, the A/D converter 11A, and the optical communication unit 12A) without delay.

An interconnection line 130H is used for supplying the drive clock φh from the timing generator 13A to the horizontal scanning circuit 103. An interconnection line 130AD is used for supplying the drive clock φADC from the timing generator 13A to the A/D converter 11A. An interconnection line 130OP is used for supplying the drive clock φOpt from the timing generator 13A to the optical communication unit 12A. By using the interconnection line 130H, the interconnection line 130AD, and the interconnection line 130OP of the same length, the delays of the drive clocks caused by a difference among interconnection line lengths can be prevented.

Figure 28:
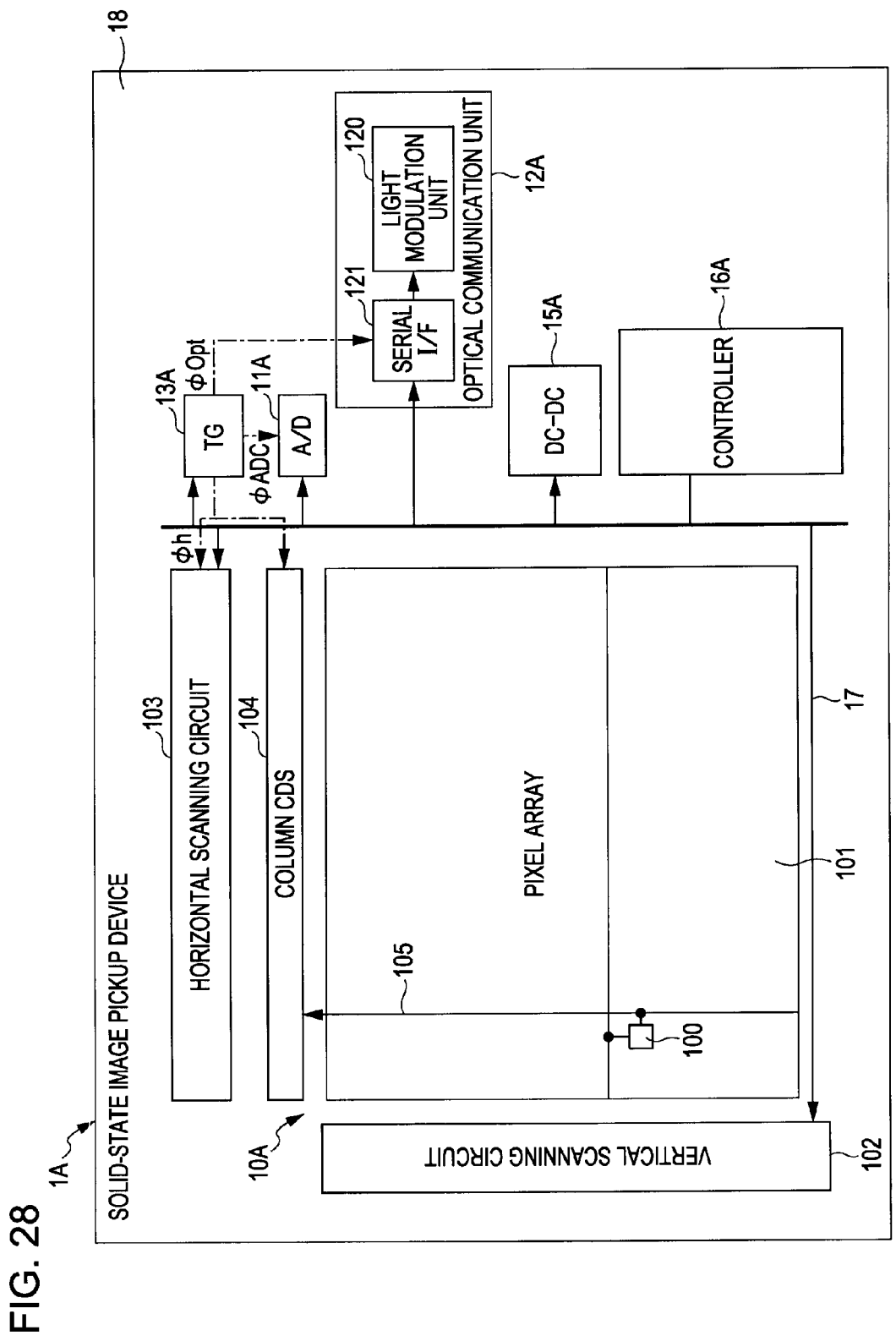
FIG. 28 is a functional block diagram illustrating an exemplary configuration of a solid-state image pickup device including a serial interface.
Figure 29:
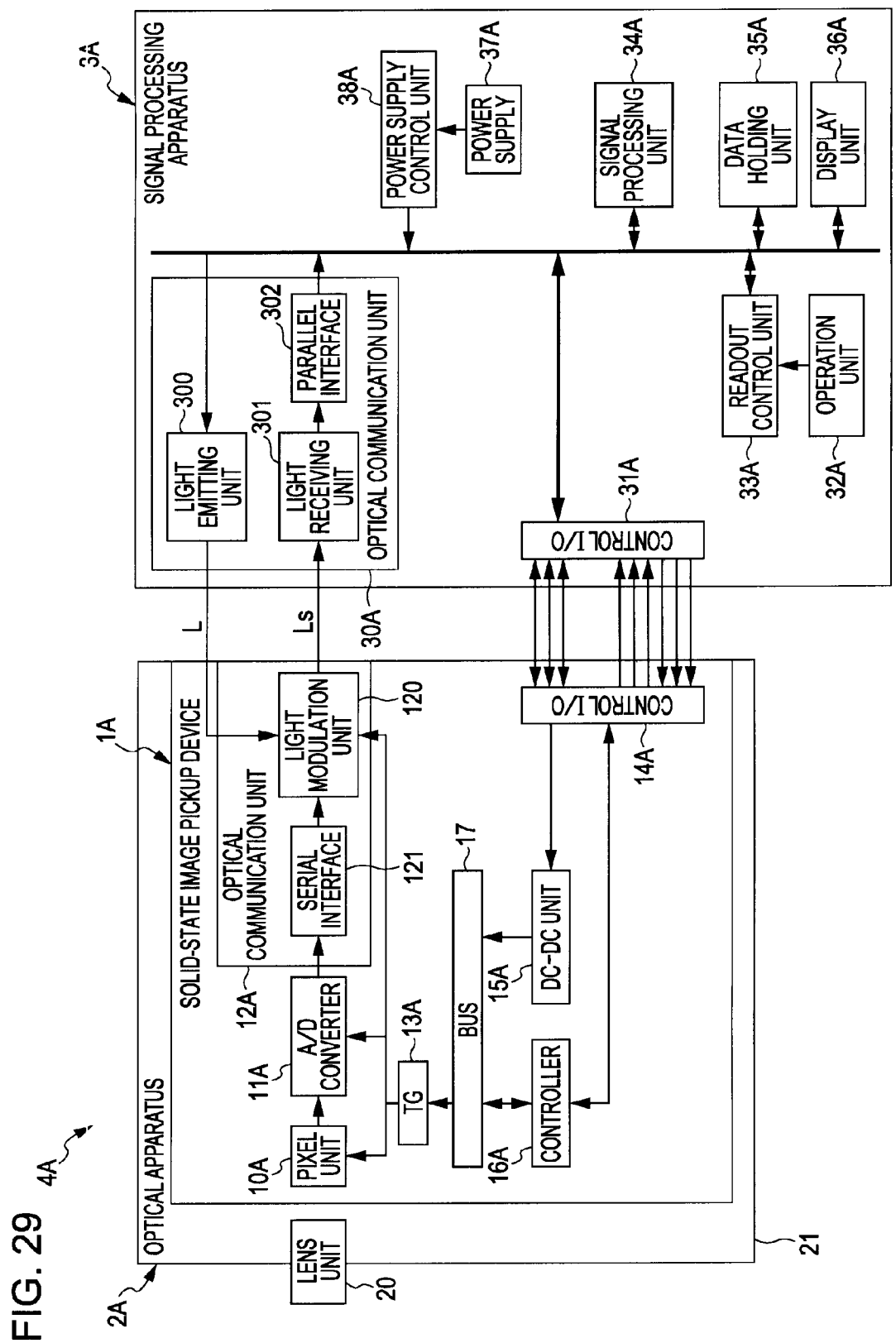
FIG. 29 is a functional block diagram illustrating an exemplary configuration of a signal processing system including a serial interface.
Figure 30:
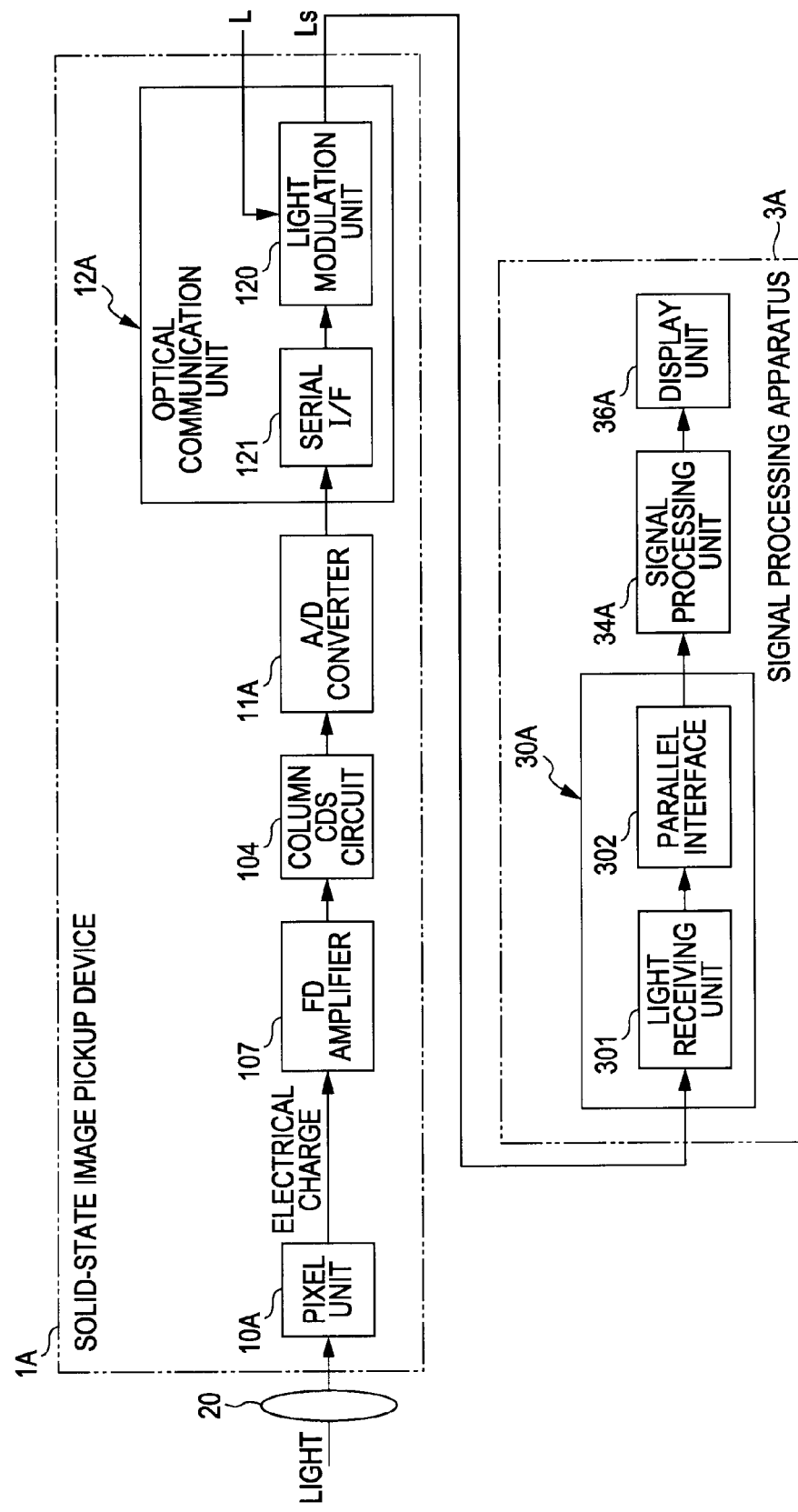
FIG. 30 is a data flow diagram illustrating data flow in the signal processing system including a serial interface.

Exemplary Configuration for Serializing Pixel Data Transmitted Through Optical Communication FIG. 28 is a functional block diagram illustrating an exemplary configuration of a solid-state image pickup device including a serial interface. FIG. 29 is a functional block diagram illustrating an exemplary configuration of a signal processing system including a serial interface. FIG. 30 is a data flow diagram illustrating data flow in the signal processing system including a serial interface.

When pixel data is output from the solid-state image pickup device 1A using optical communication, the pixel data is serialized. In this way, multi-bit data can be transmitted using a single transmission channel or a number of transmission channels less than the number of data bits. Accordingly, the optical communication unit 12A includes a serial interface (I/F) 121 that converts, into serial data, pixel data converted into a digital signal by the A/D converter 11A and input to the light modulation unit 120.

The signal processing apparatus 3A includes a parallel interface (I/F) 302. When a signal light beam of a serial data format is input from the solid-state image pickup device 1A to the signal processing apparatus 3A, the parallel interface 302 detects the pixel data from serial data output from the light receiving unit 301 and converts the pixel data to parallel data. Note that, in the following description, the signal processing apparatus 3A including the parallel interface 302 may serve as the camera main unit 403A.

In the solid-state image pickup device 1A, the image of light made incident through the lens unit 20 is photoelectrically converted by the pixel unit 10A. Signal charge read from a selected pixel is amplified by the FD amplifier 107. Noise in the signal charge is removed by the column CDS circuit 104. The pixel data read from the pixel unit 10A is A/D-converted by the A/D converter 11A and is converted into serial data by the serial interface 121. The light beam L input from the light emitting unit 300 of the camera main unit 403A to the light modulation unit 120 of the solid-state image pickup device 1A is modulated using a digital signal based on the pixel data output from the serial interface 121. Thus, the signal light beam Ls in accordance with the pixel data is output.

The signal light beam Ls modulated by the light modulation unit 120 of the solid-state image pickup device 1A is input to the optical communication unit 30A of the signal processing apparatus 3A. Thereafter, the signal light beam Ls is converted into an electrical signal by the light receiving unit 301. The light receiving unit 301 outputs serial data. The parallel interface 302 detects the pixel data from the serial data and converts the pixel data into parallel data. The signal processing unit 34A performs signal processing on the pixel data. Thereafter, an image based on the pixel data is displayed on the display unit 36A.

Figure 31:
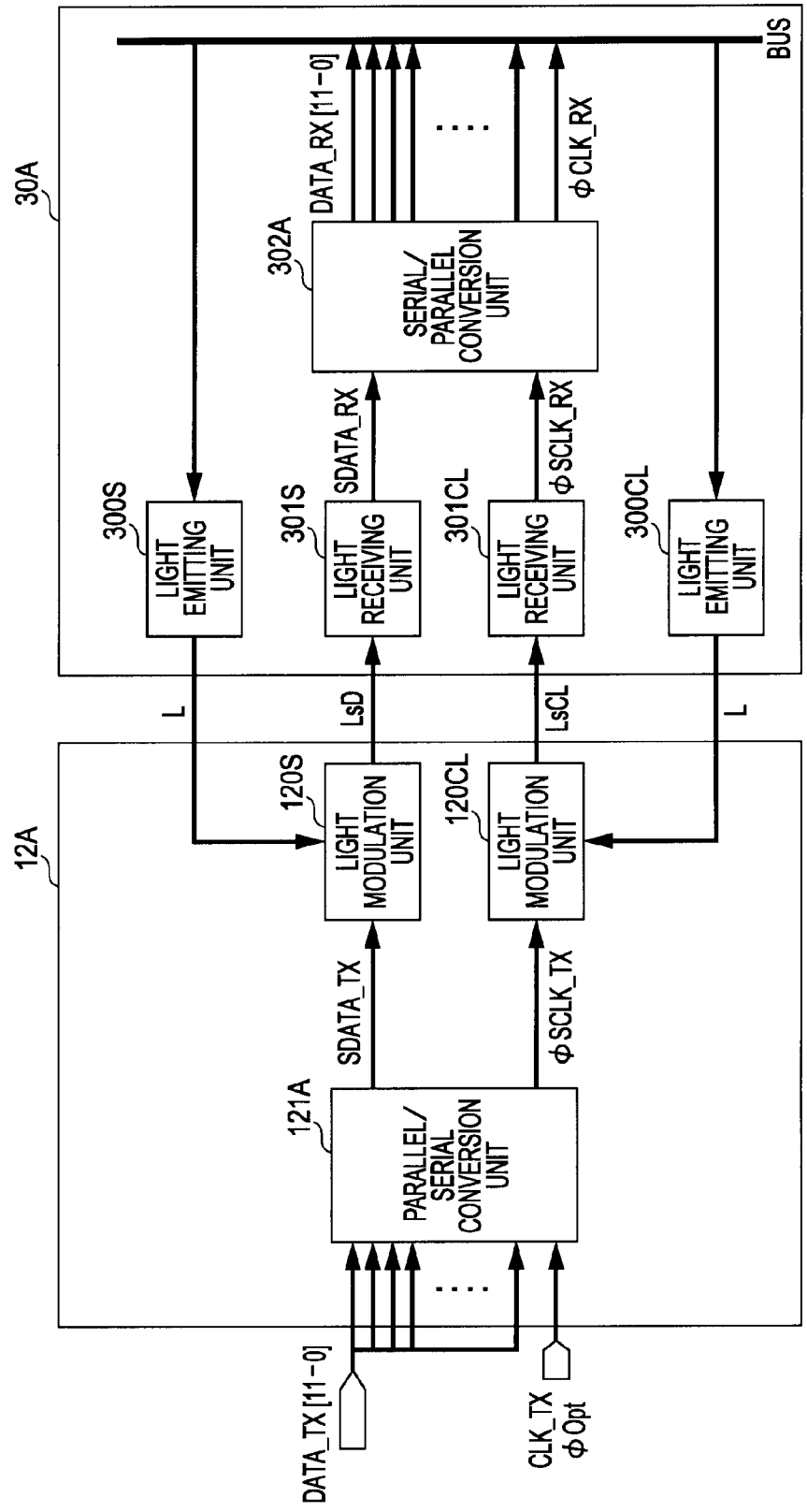
FIG. 31 is a functional block diagram illustrating exemplary optical communication units of the solid-state image pickup device and the signal processing apparatus for serializing pixel data and performing optical communication therebetween.

FIG. 31 is a functional block diagram illustrating exemplary optical communication units of the solid-state image pickup device and the signal processing apparatus for serializing pixel data and performing optical communication therebetween. FIGS. 32A to 32H are timing diagrams illustrating exemplary signal processing performed by the solid-state image pickup device and the signal processing apparatus for serializing pixel data and performing optical communication therebetween. In the example shown in FIG. 31, serialized pixel data and a clock signal are transmitted via different transmission channels.

The optical communication unit 12A of the solid-state image pickup device 1A includes a parallel/serial conversion unit 121A serving as a serial interface. The parallel/serial conversion unit 121A converts pixel data DATA_TX A/D-converted by the A/D converter 11A into serial data.

The optical communication unit 12A further includes a light modulation unit 120S and a light modulation unit 120CL. The light modulation unit 120S modulates the light beam L having a constant intensity input from the signal processing apparatus 3A using serialized pixel data SDATA_TX and outputs the modulated light beam. The light modulation unit 120CL modulates the light beam L using a clock signal φSCLK_TX and outputs the modulated light beam.

The optical communication unit 30A of the signal processing apparatus 3A includes a light emitting unit 300S and a light emitting unit 300CL. The light emitting unit 300S emits the light beam L that is input to the light modulation unit 120S of the solid-state image pickup device 1A. The light emitting unit 300CL emits the light beam L that is input to the light modulation unit 120CL.

The optical communication unit 30A of the signal processing apparatus 3A further includes a light receiving unit 301S. The light receiving unit 301S receives, through optical communication using a data line LsD, the pixel data SDATA_TX that is serialized and converted into a light signal format. The light receiving unit 301S then converts the input light signal into the pixel data SDATA_RX in the form of a serial electrical signal. The optical communication unit 30A further includes a light receiving unit 301CL. The light receiving unit 301CL receives, through optical communication using a clock line LsCL, the clock signal φSCLK_TX that is converted into a light signal format. The light receiving unit 301CL then converts the input light signal into an electrical clock signal φSCLK_RX.

Still furthermore, the optical communication unit 30A includes a serial/parallel conversion unit 302A serving as a parallel interface. The serial/parallel conversion unit 302A detects the pixel data DATA_RX from the pixel data SDATA_RX output from the light receiving unit 301S using the clock signal φSCLK_RX output from the light receiving unit 301CL.

In the solid-state image pickup device 1A, the pixel data DATA_TX A/D-converted by the A/D converter 11A and the drive clock φOpt which is the clock signal CLK_TX generated by the timing generator 13A are input to the parallel/serial conversion unit 121A.

The parallel/serial conversion unit 121A serializes the pixel data DATA_TX (see FIG. 32B) input from the A/D converter 11A using the drive clock φOpt (see FIG. 32A) input from the timing generator 13A. The parallel/serial conversion unit 121A outputs the clock signal φSCLK_TX (see FIG. 32C) and the serialized pixel data SDATA_TX (see FIG. 32D).

The parallel/serial conversion unit 121A outputs the serialized pixel data SDATA_TX to the light modulation unit 120S. In addition, the parallel/serial conversion unit 121A outputs the clock signal φSCLK_TX to the light modulation unit 120CL. The light modulation unit 120S converts the serialized pixel data SDATA_TX into a light signal format by modulating the light beam L input from the signal processing apparatus 3A and outputs the modulated light signal. Furthermore, the light modulation unit 120CL converts the clock signal φSCLK_TX into a light signal format by modulating the light beam L input from the signal processing apparatus 3A and outputs the modulated light signal.

The light signal output from the light modulation unit 120S of the solid-state image pickup device 1A is input to the light receiving unit 301S of the signal processing apparatus 3A. The input light signal is converted into an electrical signal by the light receiving unit 301S. Thus, the serialized pixel data SDATA_RX is output. The light signal output from the light modulation unit 120CL of the solid-state image pickup device 1A is input to the light receiving unit 301CL of the signal processing apparatus 3A. The input light signal is converted into an electrical signal by the light receiving unit 301CL. Thus, the clock signal φSCLK_RX is output.

Figure 32:
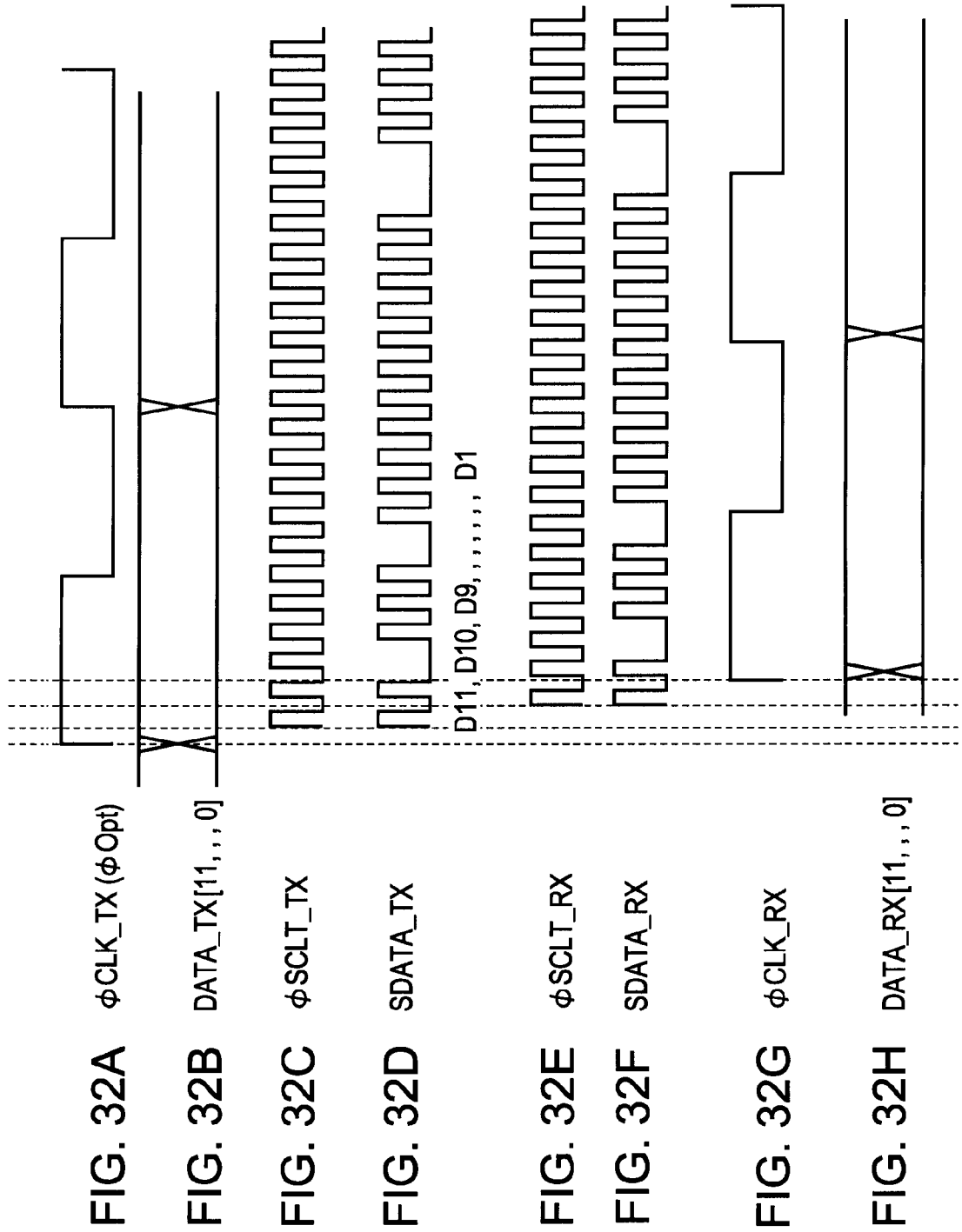
FIGS. 32A to 32H are timing diagrams illustrating exemplary signal processing performed by the solid-state image pickup device and the signal processing apparatus for serializing pixel data and performing optical communication therebetween.

In the signal processing apparatus 3A, the clock signal φSCLK_RX shown in FIG. 32E and the pixel data SDATA_RX shown in FIG. 32F are input to the serial/parallel conversion unit 302A.

The serial/parallel conversion unit 302A detects the pixel data from the pixel data SDATA_RX input from the light receiving unit 301S using the clock signal φSCLK_RX input from the light receiving unit 301CL. Thereafter, the serial/parallel conversion unit 302A outputs the clock signal φCLK_RX shown in FIG. 32G and the pixel data DATA_RX shown in FIG. 32H.

Figure 33:
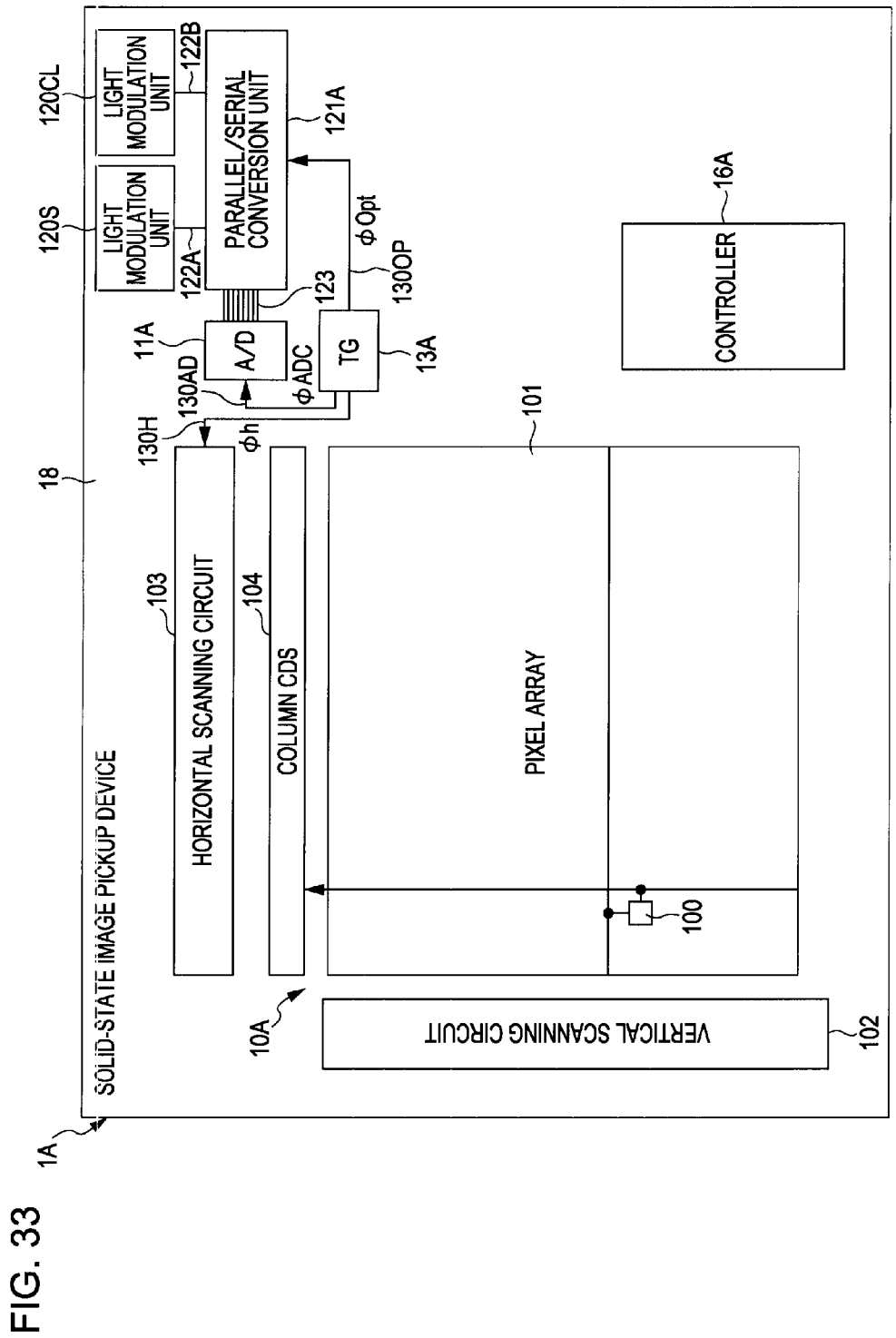
FIG. 33 is a functional block diagram illustrating an exemplary solid-state image pickup device that ensures synchronization timing of readout of pixel data performed by a plurality of light modulation units.

Exemplary Configuration for Ensuring Synchronization Timing of Readout of Pixel Data Performed by Plurality of Light Modulation Units FIG. 33 is a functional block diagram illustrating an exemplary solid-state image pickup device that ensures synchronization timing of readout of pixel data performed by a plurality of light modulation units. The interconnection line 130H is used for supplying the drive clock φh from the timing generator 13A to the horizontal scanning circuit 103. The interconnection line 130AD is used for supplying the drive clock φADC from the timing generator 13A to the A/D converter 11A. The interconnection line 130OP is used for supplying the drive clock φOpt from the timing generator 13A to the parallel/serial conversion unit 121A of the optical communication unit 12A. By using the interconnection line 130H, the interconnection line 130AD, and the interconnection line 130OP of the same length, the delays of the drive clocks caused by a difference among interconnection line lengths can be prevented.

In addition, the length of an interconnection line 122A between the parallel/serial conversion unit 121A and the light modulation unit 120S and the length of an interconnection line 122B between the parallel/serial conversion unit 121A and the light modulation unit 120CL are the same. Furthermore, the length of an interconnection line 123 between the A/D converter 11A and the parallel/serial conversion unit 121A is the same as the length of the interconnection line 122A.

Figure 34:
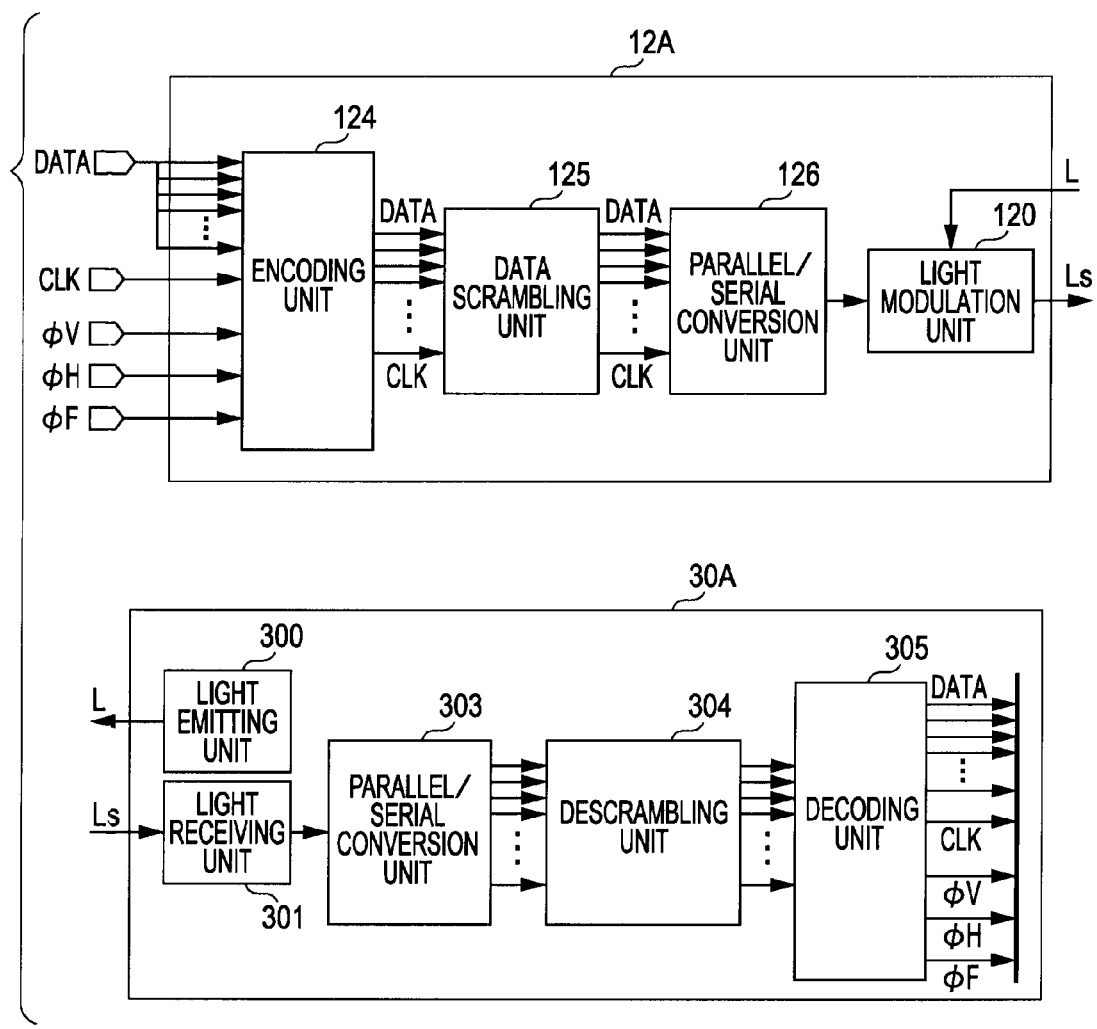
FIG. 34 is a functional block diagram illustrating another example of the optical communication units of the solid-state image pickup device and the signal processing apparatus for serializing pixel data and performing optical communication therebetween.

FIG. 34 is a functional block diagram illustrating another example of the optical communication units of the solid-state image pickup device and the signal processing apparatus for serializing pixel data and performing optical communication therebetween. FIGS. 35A to 35G are timing diagrams of signals serialized and communicated between the solid-state image pickup device and the signal processing apparatus. In the example shown in FIG. 34, a synchronization signal is superposed on the serialized pixel data and is transmitted via a single transmission channel.

The optical communication unit 12A of the solid-state image pickup device 1A includes an encoding unit 124. The encoding unit 124 superposes pixel data DATA A/D-converted by the A/D converter 11A on the synchronization signal generated by the timing generator 13A.

The optical communication unit 12A further includes a data scrambling unit 125 and a parallel/serial conversion unit 126. The data scrambling unit 125 scrambles pixel data having the synchronization signal superposed thereon. The parallel/serial conversion unit 126 converts the scrambled pixel data having the synchronization signal superposed thereon into serial data. Still furthermore, the optical communication unit 12A includes a light modulation unit 120. The light modulation unit 120 modulates the light beam L having a constant intensity input from the signal processing apparatus 3A using the serial data generated by superposing the synchronization signal on the pixel data. Thereafter, the light modulation unit 120 outputs the modulated light beam.

The optical communication unit 30A of the signal processing apparatus 3A includes a light emitting unit 300. The light emitting unit 300 outputs the light beam L, which is input to the light modulation unit 120 of the solid-state image pickup device 1A. The optical communication unit 30A further includes a light receiving unit 301. The light receiving unit 301 receives the signal light beam Ls output from the light modulation unit 120 of the solid-state image pickup device 1A. The signal light beam Ls is modulated using serial data generated by superposing the synchronization signal on the pixel data. Thereafter, the light receiving unit 301 converts the input light signal into an electrical signal.

The optical communication unit 30A further includes a serial/parallel conversion unit 303. The serial/parallel conversion unit 303 reconstructs the clock from the serial data generated by superposing the synchronization signal on the pixel data and detects the pixel data. Still furthermore, the optical communication unit 30A includes a descrambling unit 304 and a decoding unit 305. The descrambling unit 304 descrambles the pixel data having the synchronization signal superposed thereon. The decoding unit 305 detects the synchronization signal.

In the solid-state image pickup device 1A, the vertical scanning circuit 102 is driven by a vertical synchronization signal φV (see FIG. 35A) based on the signal generated by the timing generator 13A. In addition, the horizontal scanning circuit 103 is driven by a horizontal synchronization signal φH (see FIG. 35B).

Figure 35:
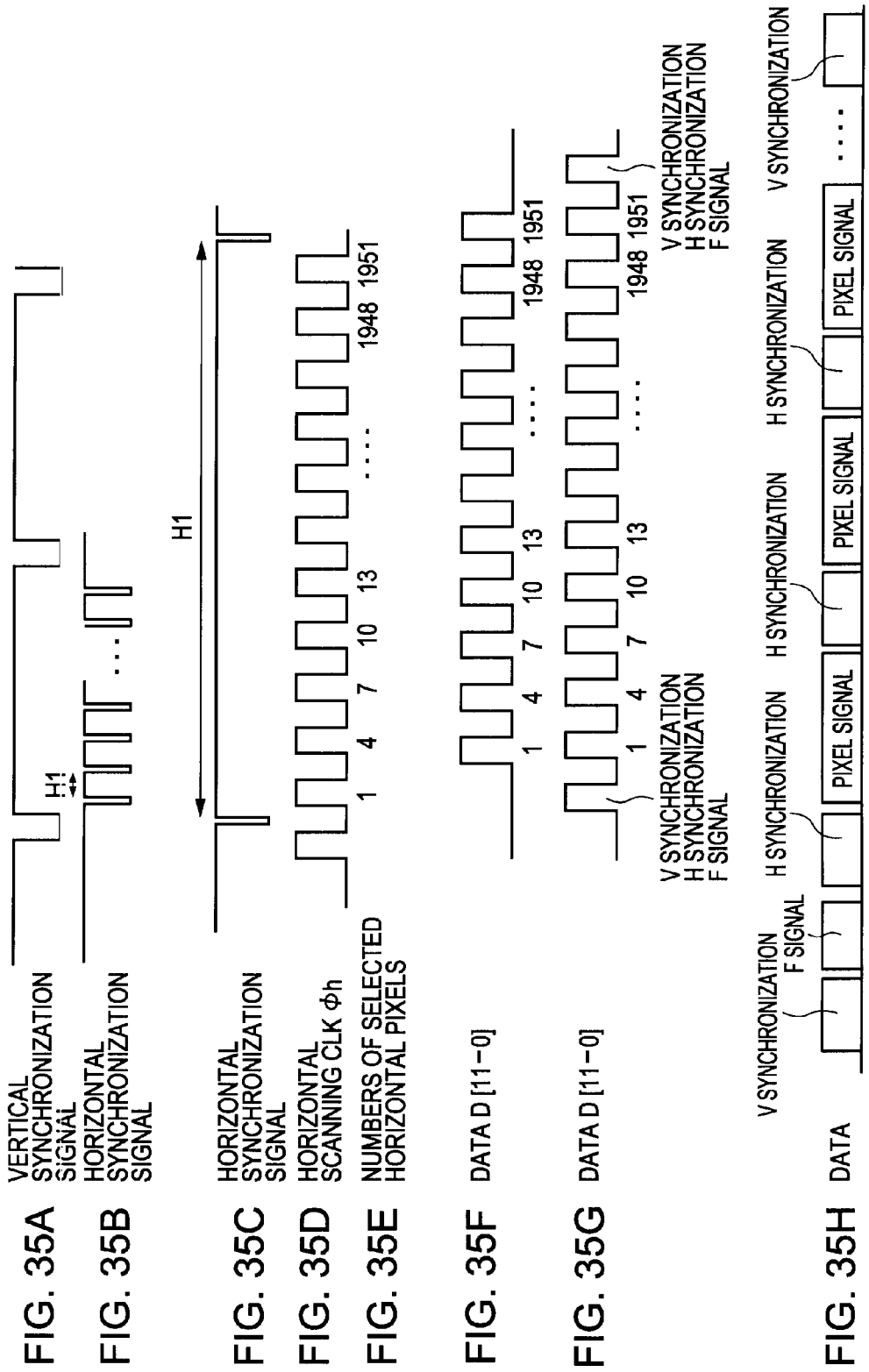
FIGS. 35A to 35H are timing diagrams of signals serialized and communicated between the solid-state image pickup device and the signal processing apparatus.

During a horizontal scanning period H1, a horizontal scanning clock φh (see FIG. 35D) is generated for the horizontal synchronization signal φH (see FIG. 35C). In addition, pixels from which signals are to be read in the order indicated by the pixel numbers shown in FIG. 35E are selected. Thus, data D shown in FIG. 35F is read out.

In the solid-state image pickup device 1A, the pixel data A/D-converted by the A/D converter 11A is input to the encoding unit 124. In addition, the vertical synchronization signal φV driven by the vertical scanning circuit 102, the horizontal synchronization signal φH driven by the horizontal scanning circuit 103, and a field signal F used for selecting a field are input to the encoding unit 124.

As shown in FIGS. 35G and 35H, the encoding unit 124 outputs data indicating the field signal F, the vertical synchronization signal φV, and the horizontal synchronization signal φH during a period E in which no pixel data is output.

Figure 36:
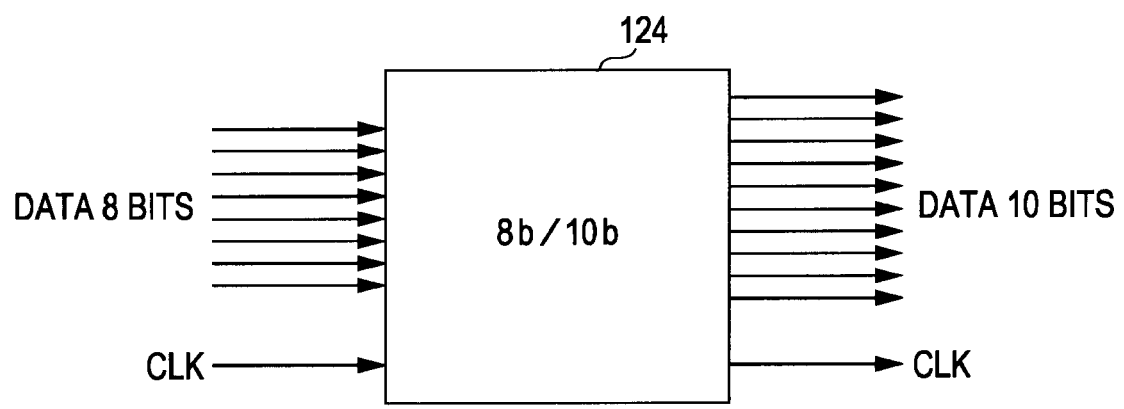
FIG. 36 is a functional block diagram of an exemplary encoding unit.

FIG. 36 is a functional block diagram of an exemplary encoding unit. For example, the encoding unit 124 employs an 8b/10b method. In the 8b/10b method, 8-bit data is converted into 10-bit data using a conversion table so that a clock is superposed on the serial data.

Figure 37:
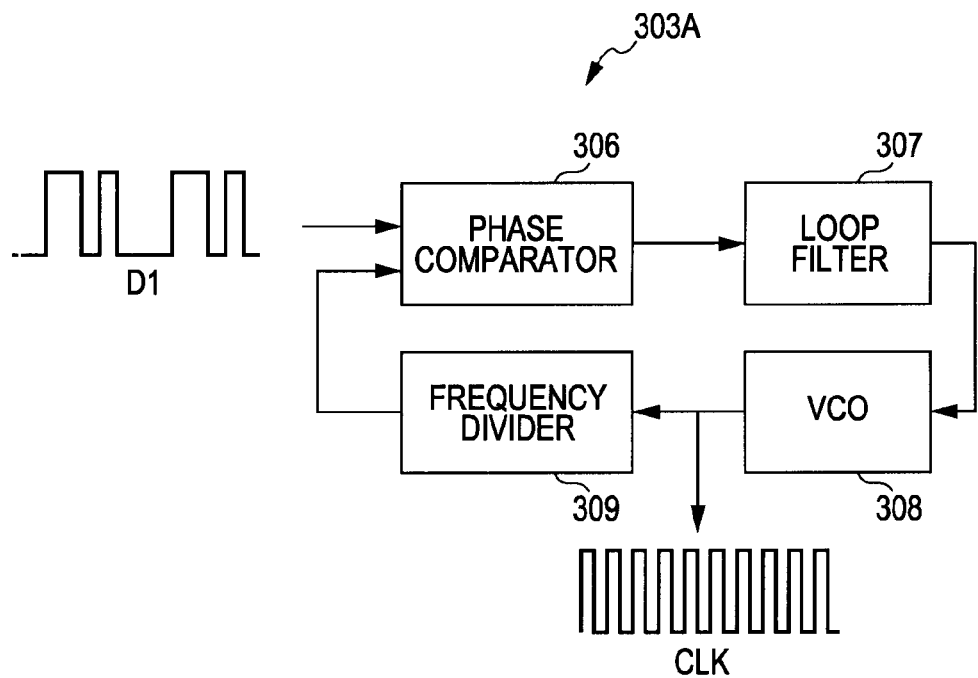
FIG. 37 is a functional block diagram of an exemplary clock reconstructing unit of a serial/parallel conversion unit.

FIG. 37 is a functional block diagram of an exemplary clock reconstructing unit of the serial/parallel conversion unit. For example, a clock reconstructing unit 303A is formed from a phase-locked loop (PLL) circuit. The clock reconstructing unit 303A reconstructs a clock CLK using an edge of input serial data D1.

The clock reconstructing unit 303A includes a phase comparator 306 and a loop filter 307. The phase comparator 306 converts a phase difference between two input signals into a voltage and outputs the voltage. The loop filter 307 performs phase compensation. The clock reconstructing unit 303A further includes a voltage controlled oscillator (VCO) 308 and a frequency divider 309. The VCO 308 controls the frequency of an output pulse in accordance with an input voltage. The frequency divider 309 divides the input frequency by N and outputs the divided frequency.

Figure 38:
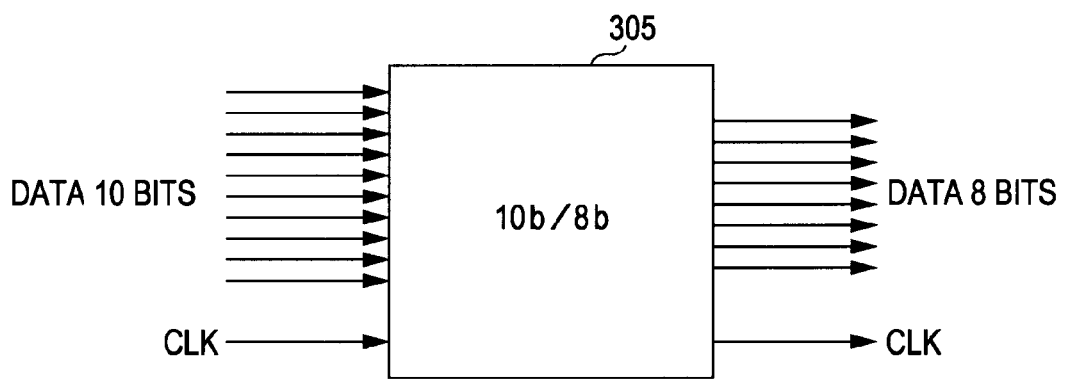
FIG. 38 is a functional block diagram of an exemplary decoding unit.

FIG. 38 is a functional block diagram of an exemplary decoding unit. The decoding unit 305 employs an 8b/10b method, since the encoding unit 124 employs an 8b/10b method. In the 8b/10b method, 10-bit data is converted into the original 8-bit data using a conversion table.

Figure 39:
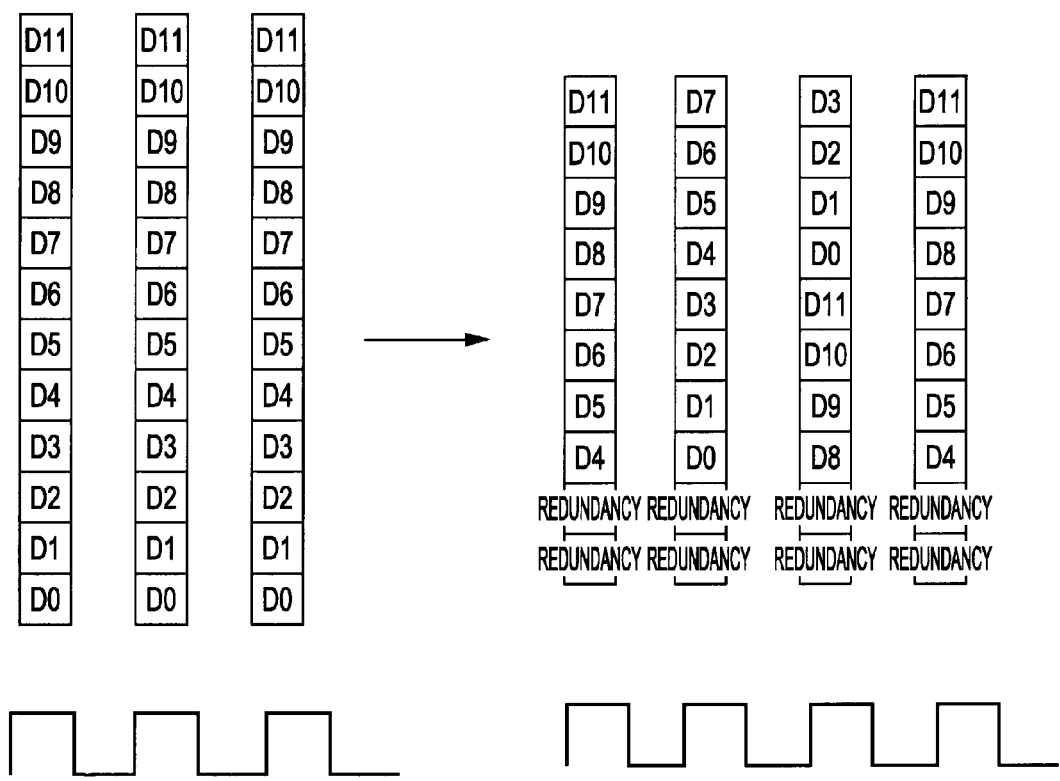
FIG. 39 is a diagram illustrating an exemplary operation for generating data input to an encoding unit of the solid-state image pickup device.

FIG. 39 is a diagram illustrating an exemplary operation for generating data input to the encoding unit of the solid-state image pickup device. A method for generating 8-bit data from the output of the A/D converter 11A when the encoding unit 124 employs the 8b/10b method is described next. In the example shown in FIG. 39, when the A/D converter 11A outputs 8-bit data or data of more bits, 12-bit data D0 to D11 is separated into 8-bit data and 4-bit data, and the two data are output.

Figure 40:
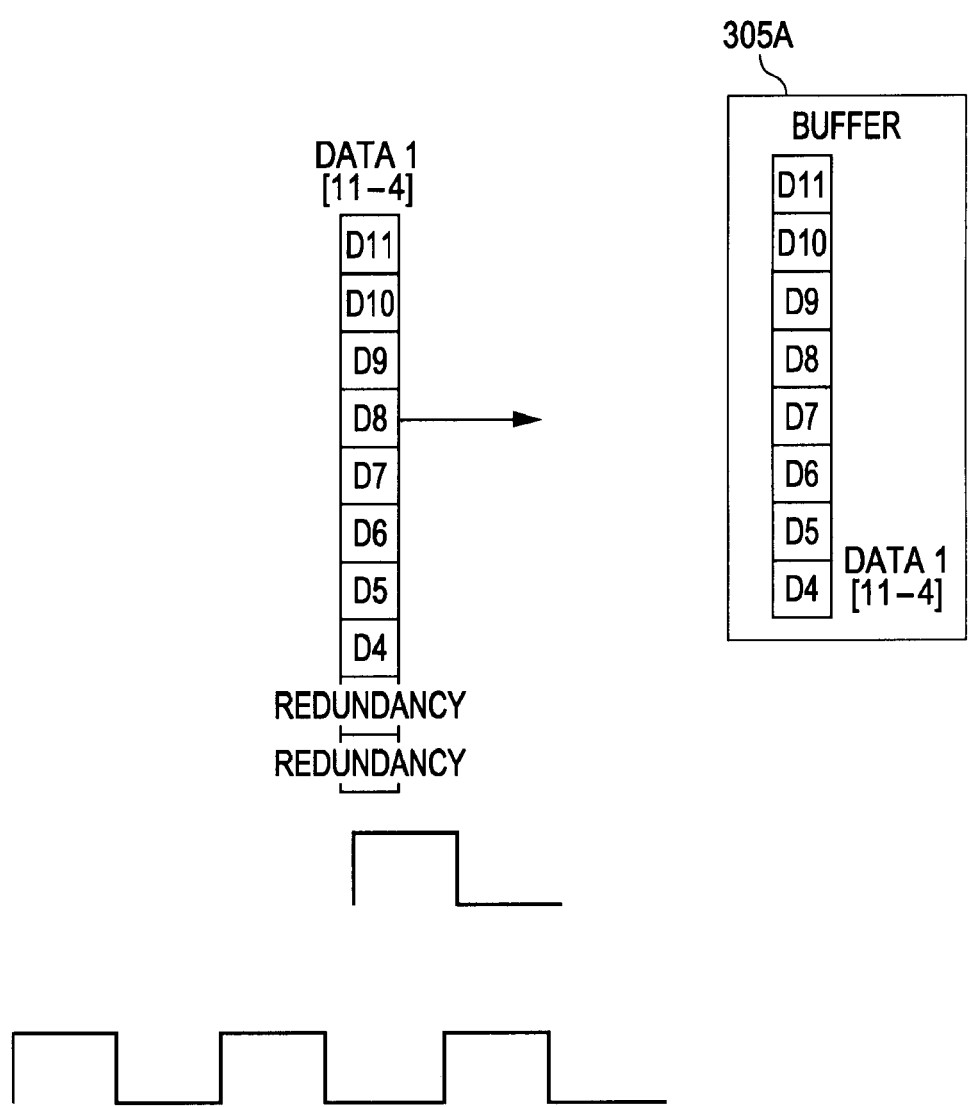
FIG. 40 is a diagram illustrating an exemplary operation for generating data output from a decoding unit of the signal processing apparatus.
Figure 41:
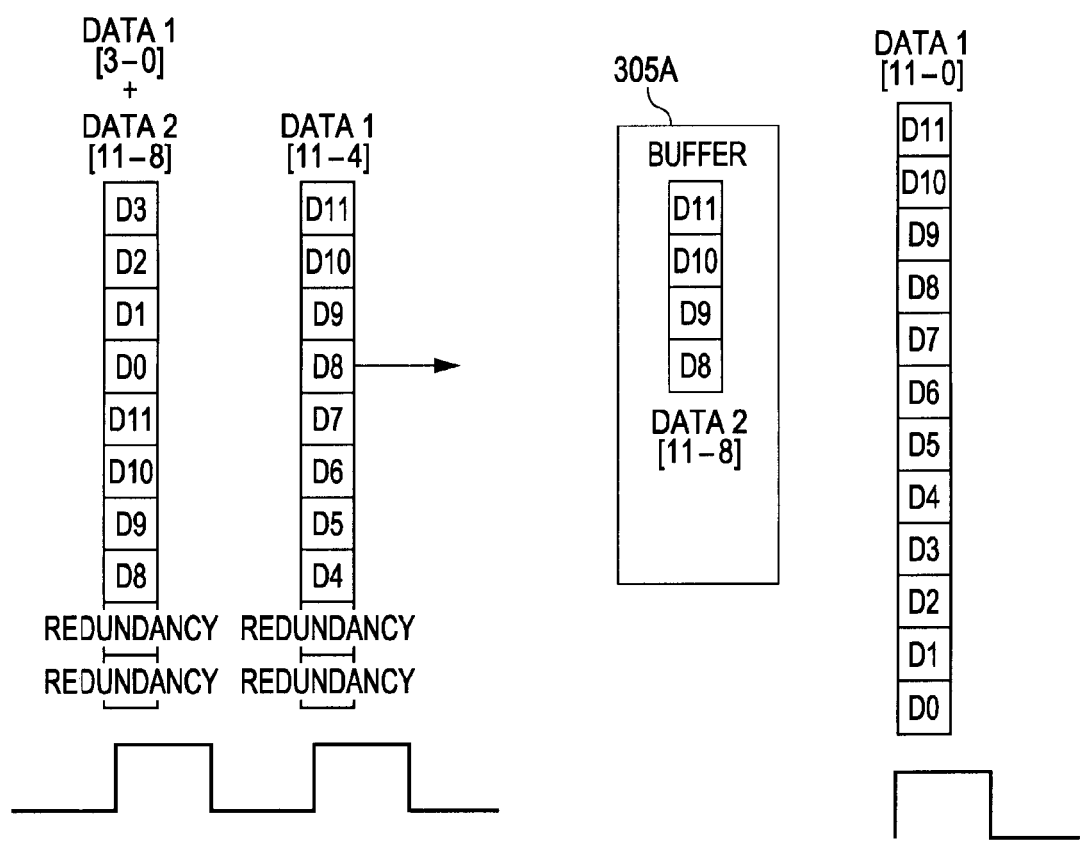
FIG. 41 is a diagram illustrating an exemplary operation for generating data output from a decoding unit of the signal processing apparatus.
Figure 42:
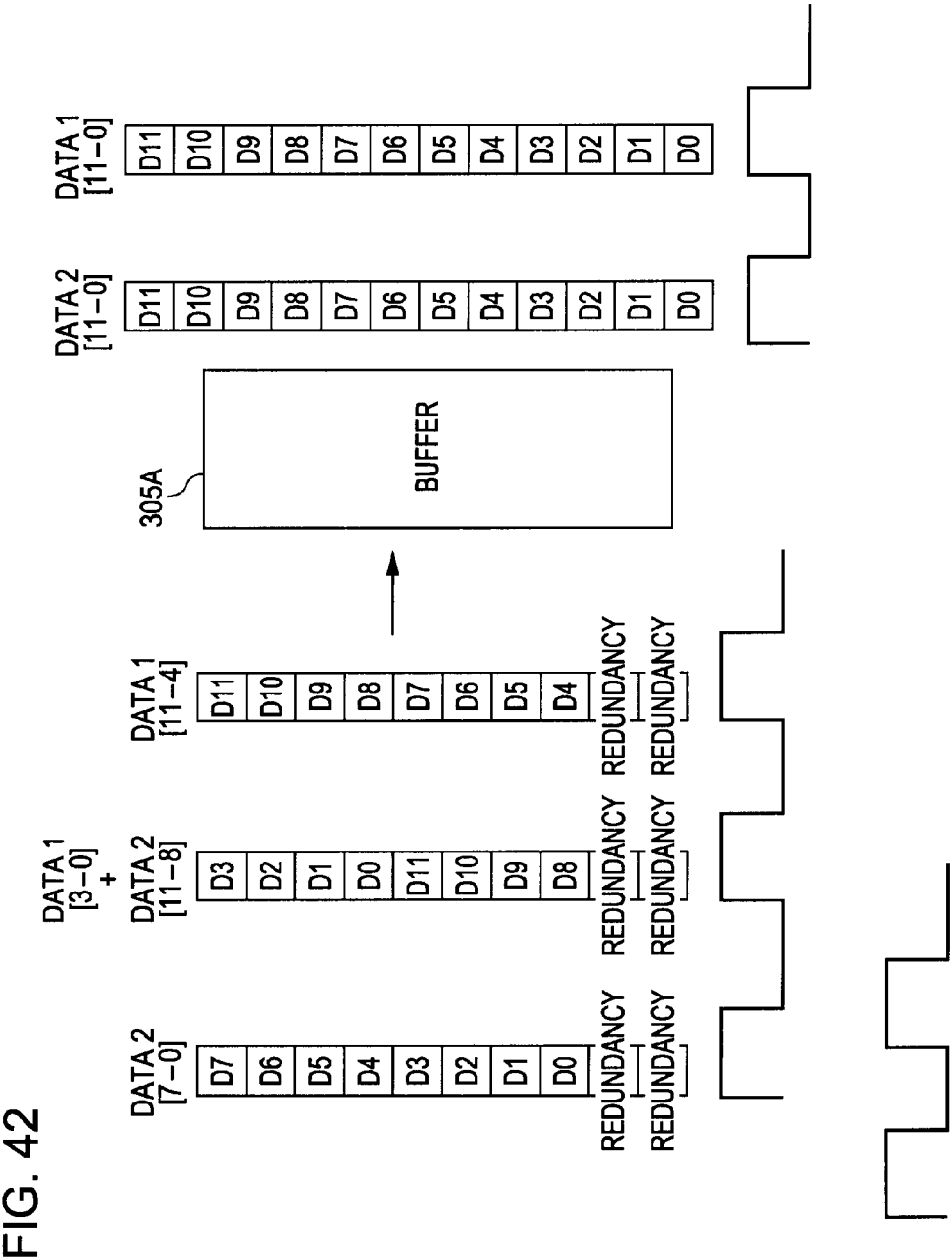
FIG. 42 is a diagram illustrating an exemplary operation for generating data output from a decoding unit of the signal processing apparatus.

FIGS. 40 to 42 are diagrams illustrating exemplary operations for generating data output from the decoding unit of the signal processing apparatus. A method for generating 12-bit data in the decoding unit 305 when the encoding unit 124 employs the 8b/10b method is described next. For example, the solid-state image pickup device divides original 12-bit data and outputs 8-bit data. Accordingly, it is necessary that the decoding unit 305 output the original 12-bit parallel signal to a bus. In the example shown in FIGS. 40 to 42, if data output from the decoding unit 305 is 8 bits or more, 8-bit data or 4-bit data is stored in a buffer 305A. Data for 12 bits is prepared, the data is output. As shown in FIG. 40, if 11th to 4th bits of data 1 are received, the decoding unit 305 stores the bits of the data 1 in the buffer 305A. As shown in FIG. 41, when the next 8-bit data is received, the remaining 3rd to 0th bits of the data 1 are received. Accordingly, the four bits of the data 1 are concatenated with the bits of the data 1 stored in the buffer 305A, and 12 bits of the data 1 are output. At the same time, since 11th to 8th bits of data 2 are received, the 4 bits are stored in the buffer 305A. As shown in FIG. 42, the next 8 bits are further received. Accordingly, the remaining 7th to 0th bits of the data 2 are received. These bits are concatenated with the bits stored in the buffer 305A. Thus, 12 bits of the data 2 are output. At that time, the buffer 305A stores no data.

Example of Advantage of Solid-State Image Pickup Device Including Optical Communication Unit Formed from Light Modulation Unit When the signal processing apparatus includes a light emitting unit and if a solid-state image pickup device includes an optical communication unit formed from a light modulation unit that modulates an externally input light beam and outputs the modulated light beam, the solid-state image pickup device can communicate with the signal processing apparatus through optical communication without including a light emitting element that emits light.

In light emitting elements that emit light, part of drive current is changed to heat, not light. The light modulation unit generates heat less than that generated by a light emitting element that emits light and, therefore, the consumption power is small. Accordingly, the solid-state image pickup device including an optical communication unit formed from a light modulation unit can reduce heat caused by a drive current and, therefore, the consumption power can be reduced. In addition, the occurrence of electromagnetic waves can be reduced. Furthermore, since an electromagnetic effect has a significantly quick response, the light modulation unit can reduce frequency chirping, as compared with a light emitting element that emits light. Accordingly, high-speed modulation can be realized, and high-speed readout per channel can be realized.

As described above, the solid-state image pickup device including an optical communication unit formed from a light modulation unit that modulates external light and outputs the modulated light can be achieved with a simplified configuration. Consequently, the cost, the consumption power, and the noise can be reduced.

Since any light source that emits light having a constant intensity can be used as a light source that outputs light input to the light modulation unit, the light source can be flexibly selected from among a variety of light sources. For example, the most suitable light source can be selected from a lineup ranging from a general-purpose and low-cost light source to a high-performance and high-cost light source. In addition, the signal processing apparatus including a light emitting unit has a large packaging space, as compared with the solid-state image pickup device. Accordingly, the size of the light source can be flexibly selected. For example, even a high-profile light source can be used.

Furthermore, the light receiving unit that receives the signal light modulated by the solid-state image pickup device can be formed from a light receiving element and an amplifying element that are suitable for the readout speed of the solid-state image pickup device (e.g., a high-speed light receiving element and a high-speed amplifying element). Alternatively, the light receiving unit can be formed from a light receiving element and an amplifying element that are suitable for the amount of modulated light. Thus, the type of light receiving unit can be flexibly selected, and the optimal configuration can be easily achieved.

Still furthermore, the layout of the light emitting unit and the light receiving unit and the layout among the light emitting unit, the light receiving unit, and the solid-state image pickup device can be freely determined. For example, a light beam can be emitted from a light emitting unit disposed at a remote point A to a light modulation unit of a solid-state image pickup device disposed at another remote point B. In addition, a light receiving unit disposed at another remote point c can read a signal. Furthermore, a light emitting unit including another light source can be disposed at another remote point d. A light beam emitted from the other light source may be input to the light modulation unit of the solid-state image pickup device, and the light receiving unit disposed at the remote point c may read the signal.

Application Example of Signal Processing System

Figure 43:
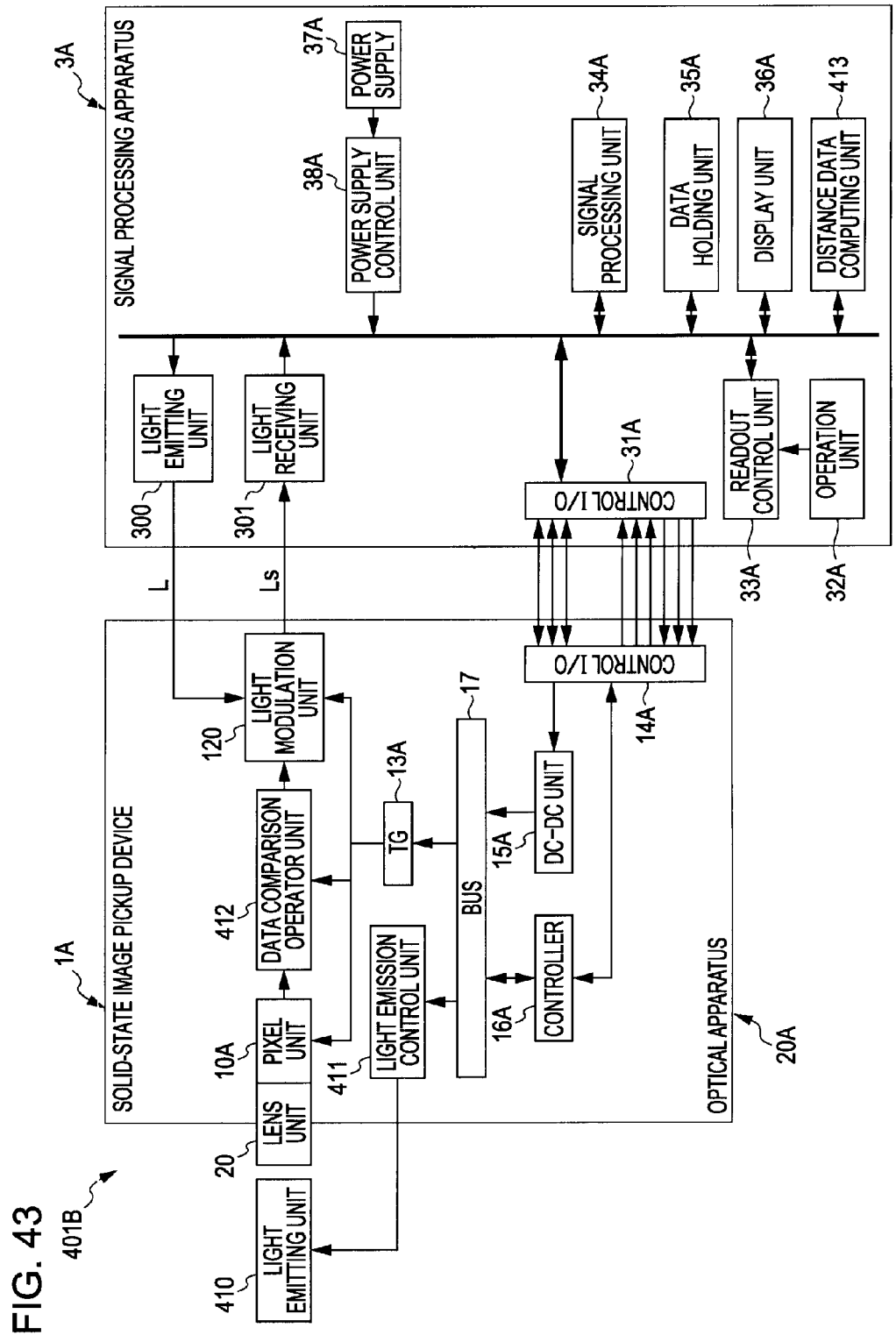
FIG. 43 is a functional block diagram illustrating an application of the signal processing system according to the first embodiment.
Figure 44:
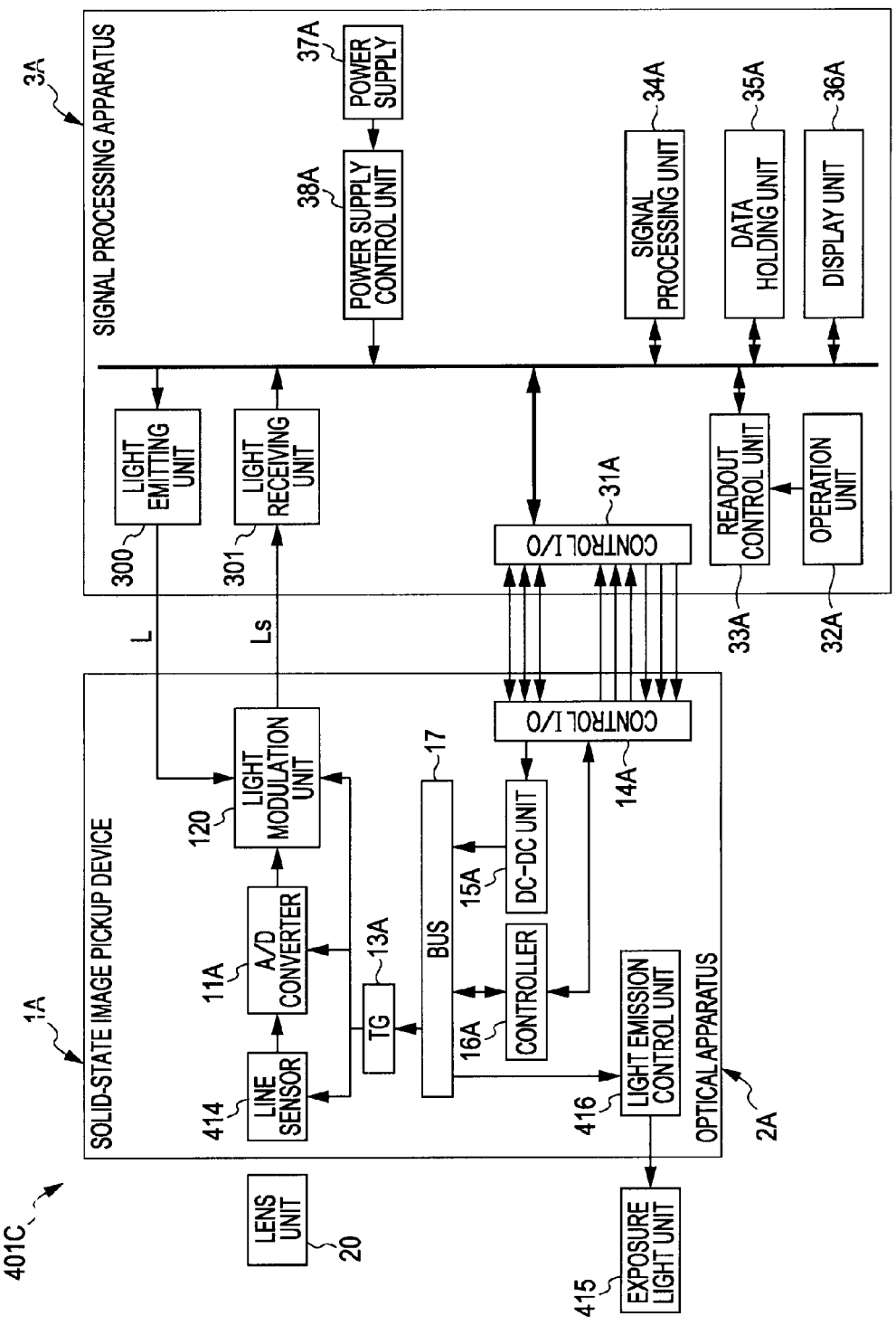
FIG. 44 is a functional block diagram illustrating an application of the signal processing system according to the first embodiment.
Figure 45:
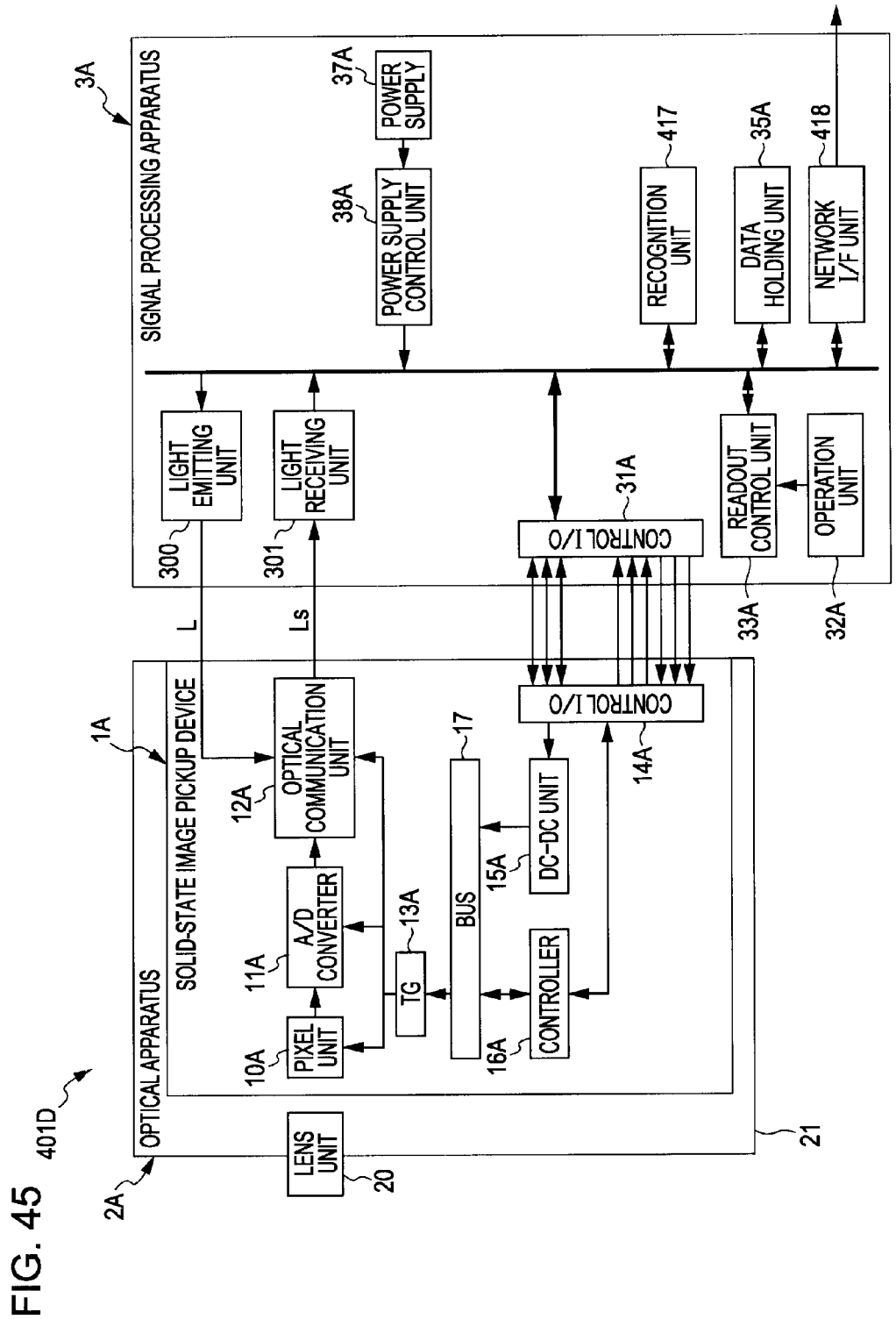
FIG. 45 is a functional block diagram illustrating an application of the signal processing system according to the first embodiment.

FIGS. 43 to 45 are functional block diagrams illustrating application examples of the signal processing system according to the first embodiment. In FIG. 43, a ranging apparatus 401B serving as the signal processing system is illustrated. The ranging apparatus 401B includes an optical apparatus 20A. The optical apparatus 20A includes a light emitting unit 410, a light emission control unit 411, and a data comparison operator unit 412. In addition, the signal processing apparatus 3A includes a distance data computing unit 413.

In the ranging apparatus 401B, the light emitting unit 410 emits light to an object to be distance-measured. The reflected light from the object is made incident on the pixel unit 10A. A phase change in accordance with a distance change is computed by the data comparison operator unit 412 using an electrical signal read from the pixel unit 10A. The computation result of the data comparison operator unit 412 is transmitted from the solid-state image pickup device 1A to the signal processing apparatus 3A through optical communication. Thereafter, the distance data computing unit 413 computes the distance.

In FIG. 44, an image forming apparatus 401C serving as the signal processing system is illustrated. The image forming apparatus 401C functions as a copy machine, a scanner, a facsimile machine, combinations thereof (a multi-function peripheral), or a networked multi-function peripheral connected to a network.

The image forming apparatus 401C includes a line sensor 414 serving as the pixel unit of the optical apparatus 2A. The line sensor 414 includes pixels that are one-dimensionally arranged. The image forming apparatus 401C further includes an exposure light unit 415 that exposes a photosensitive drum (not shown) to light and a light emission control unit 416.

In FIG. 45, a security camera 401D serving as the signal processing system is illustrated. The signal processing apparatus 3A of the security camera 401D includes a recognition unit 417 that recognizes an image transmitted from the solid-state image pickup device 1A and a network I/F unit 418 that transmits information to the outside.

The present application contains subject matter related to that; disclosed in Japanese Priority Patent Application JP 2008-264580 filed in the Japan Patent Office on Oct. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing system comprising:
an optical apparatus including a solid-state image pickup device configured to convert light incident thereon into an electrical signal and an optical element configured to allow light to be incident on the solid-state image pickup device; and
a signal processing apparatus to which the optical apparatus is connected;
wherein the solid-state image pickup device includes
a pixel unit configured to convert light into an electrical signal,
an A/D converter configured to convert a signal read from the pixel unit into a digital signal,
a light modulation unit configured to modulate an externally input light beam using the signal digitized by the A/D converter and output a signal light beam based on the signal read from the pixel unit, and
a timing generation unit configured to generate a synchronization signal used for synchronizing input and output of signals of the pixel unit, the A/D converter, and the light modulation unit, and a controller being configured to control readout of the signal, and
wherein the signal processing apparatus includes
a light emitting unit configured to output the light beam input to the light modulation unit of the solid-state image pickup device,
a light receiving unit configured to receive the signal light output from the light modulation unit of the solid-state image pickup device,
a readout control unit configured to control readout of the signal output from the pixel unit of the solid-state image pickup device, and
a signal processing unit configured to process the signal read from the pixel unit and input from the solid-state image pickup device through optical communication,
wherein, when the signal processing apparatus is turned on, power is supplied to the light receiving unit of the signal processing apparatus and, subsequently, power is supplied to the solid-state image pickup device, and wherein power is supplied to the light modulation unit of the solid-state image pickup device and, subsequently, is supplied to the pixel unit and, subsequently, is supplied to the light emitting unit of the signal processing apparatus, and wherein, when the signal processing apparatus is turned off, power supply to the light emitting unit of the signal processing apparatus is stopped and, subsequently, power supply to the pixel unit of the solid-state image pickup device is stopped and, subsequently, power supply to the light modulation unit is stopped, and wherein, after power supply to the solid-state image pickup device is stopped, power supply to the light receiving unit of the signal processing apparatus is stopped.

2. The signal processing system according to claim 1, wherein the pixel unit, the A/D converter, the light modulation unit, the timing generation unit, and the controller of the solid-state image pickup device are formed on the same substrate and are integrated into one chip.

3. The signal processing system according to claim 2, wherein, in the solid-state image pickup device, a length of an interconnection line used for supplying the synchronization signal from the timing generation unit to the pixel unit, a length of an interconnection line used for supplying the synchronization signal from the timing generation unit to the A/D converter, and a length of an interconnection line used for supplying the synchronization signal from the timing generation unit to the light modulation unit are made equal.

4. The signal processing system according to claim 3, wherein, in the solid-state image pickup device, the synchronization signal supplied to the light modulation unit is generated on the basis of at least one of a time delay of the signal read out from the pixel unit with respect to the synchronization signal supplied to the pixel unit and a time delay of the signal output from the A/D converter with respect to the synchronization signal supplied to the A/D converter.

5. The signal processing system according to claim 2, wherein, when power is turned on, the controller, in the solid-state image pickup device, supplies power to the light modulation unit and, subsequently, supplies power to the pixel unit, and wherein, when power is turned off, the controller stops supplying power to the pixel unit and, subsequently, stops supplying power to the light modulation unit.

6. The signal processing system according to claim 2, wherein, in the solid-state image pickup device, the pixel unit includes pixels arranged therein, and the pixels perform photoelectrical conversion, and wherein the pixel unit is switched between an operation mode in which predetermined pixels are selected from among all of the pixels of the pixel unit and signals are read from the selected pixels and an operation mode in which all of the pixels of the pixel unit are selected in a predetermined order and signals are read from the selected pixels.

7. The signal processing system according to claim 2, wherein the solid-state image pickup device further includes a serial interface configured to convert the signals read from the pixel unit and digitized by the A/D converter into serial data.

8. The signal processing system according to claim 2, wherein the pixel unit of the solid-state image pickup device includes a noise removing unit configured to remove a noise component from the signal read from each of the pixels.

9. The signal processing system according to claim 1, wherein the solid-state image pickup device is switched between an operation mode in which predetermined pixels are selected from among all of the pixels of the pixel unit and signals are read from the selected pixels and an operation mode in which all of the pixels of the pixel unit are selected in a predetermined order and signals are read from the selected pixels, and wherein the signal processing apparatus outputs an instruction for switching the operation mode performed by the solid-state image pickup device on the basis of an operation input to an operation unit of the signal processing apparatus.

10. The signal processing system according to claim 1, wherein the solid-state image pickup device further includes a serial interface configured to convert the signals read from the pixel unit and digitized by the A/D converter into serial data, and wherein the signal processing apparatus further includes a parallel interface configured to convert the serial data input from the solid-state image pickup device.

11. The signal processing system according to claim 1, wherein the light modulation unit of the solid-state image pickup device includes an input waveguide to receive the externally input light beam, a branching unit to bifurcate the externally input light beam received via the input waveguide into the two light beams, a first electrode to receive the signal digitized by the A/D converter, and a second electrode connected to a ground potential, wherein the branching unit is arranged between the first and the second electrode.

12. The signal processing system according to claim 11, wherein the branching unit of the light modulation unit of the solid-state image pickup device includes a first waveguide through which the one of the two light beams travels and a second waveguide through which the other of the two light beams travels.

13. The signal processing system according to claim 11, wherein the input waveguide and the branching unit of the light modulation unit of the solid-state image pickup device are formed on a substrate of lithium niobate.

* * * * *